US008422806B2

(12) United States Patent
Fukuhara et al.

(10) Patent No.: US 8,422,806 B2
(45) Date of Patent: Apr. 16, 2013

(54) INFORMATION PROCESSING APPARATUS AND INFORMATION PROCESSING METHOD FOR REDUCING THE PROCESSING LOAD INCURRED WHEN A REVERSIBLY ENCODED CODE STREAM IS TRANSFORMED INTO AN IRREVERSIBLY ENCODED CODE STREAM

(75) Inventors: Takahiro Fukuhara, Kanagawa (JP); Katsutoshi Ando, Kanagawa (JP); Junya Araki, Tokyo (JP)

(73) Assignee: Sony Corporation, Tokyo (JP)

( * ) Notice: Subject to any disclaimer, the term of this patent is extended or adjusted under 35 U.S.C. 154(b) by 997 days.

(21) Appl. No.: 12/405,302

(22) Filed: Mar. 17, 2009

(65) Prior Publication Data
US 2009/0245384 A1    Oct. 1, 2009

(30) Foreign Application Priority Data

Mar. 18, 2008 (JP) ................. P2008-068812
Jan. 20, 2009 (JP) ................. P2009-009566

(51) Int. Cl.
*G06K 9/46* (2006.01)
(52) U.S. Cl.
USPC .......................... 382/235; 382/240
(58) Field of Classification Search .......... 382/166, 382/232, 233, 240; 714/776
See application file for complete search history.

(56) References Cited

U.S. PATENT DOCUMENTS

| 6,539,056 | B1 | 3/2003 | Sato et al. | |
|---|---|---|---|---|
| 6,876,772 | B2* | 4/2005 | Fukuhara et al. | 382/240 |
| 6,987,890 | B2 | 1/2006 | Joshi et al. | |
| 7,106,366 | B2 | 9/2006 | Parker et al. | |
| 7,127,111 | B2* | 10/2006 | Fukuhara et al. | 382/232 |
| 7,142,722 | B2* | 11/2006 | Fukuhara et al. | 382/240 |
| 7,200,277 | B2 | 4/2007 | Joshi et al. | |
| 7,298,910 | B2 | 11/2007 | Fukuhara et al. | |
| 7,330,598 | B2* | 2/2008 | Fukuhara et al. | 382/240 |
| 7,483,575 | B2* | 1/2009 | Fukuhara et al. | 382/232 |
| 7,672,523 | B2* | 3/2010 | Yeung et al. | 382/239 |
| 2004/0179606 | A1* | 9/2004 | Zhou et al. | 375/240.25 |
| 2004/0216028 | A1* | 10/2004 | Fukuhara et al. | 714/776 |
| 2005/0047503 | A1* | 3/2005 | Han et al. | 375/240.01 |
| 2009/0274378 | A1* | 11/2009 | Fukuhara et al. | 382/232 |
| 2009/0304273 | A1* | 12/2009 | Fukuhara | 382/166 |
| 2010/0092097 | A1* | 4/2010 | Fukuhara et al. | 382/233 |
| 2010/0166057 | A1* | 7/2010 | Huchet et al. | 375/240.01 |

FOREIGN PATENT DOCUMENTS

| JP | 2004-80520 | 3/2004 |
|---|---|---|
| JP | 2004-165760 | 6/2004 |
| JP | 2007-251968 | 9/2007 |
| JP | 4016166 | 9/2007 |

* cited by examiner

*Primary Examiner* — Vu Le
*Assistant Examiner* — Xuemei Chen
(74) *Attorney, Agent, or Firm* — Frommer Lawrence & Haug LLP; William S. Frommer

(57) ABSTRACT

Disclosed herein is an information processing apparatus including: a partial decoding block configured to generate picture data by partially decoding a reversibly encoded picture code stream; an irreversible encoding block configured to encode irreversibly the picture data generated by the partial decoding block; and a control section configured to control the partial decoding block to determine the picture code stream part to be decoded in such a manner that a target compression rate of the picture data generated by the partial decoding block constitutes the compression rate corresponding to a target code quantity for the irreversible encoding block.

12 Claims, 55 Drawing Sheets

SLICE LEVEL COUNT = 3
(H: HIGH PASS, L: LOW PASS)

CODEBLOCK
(EX. 64×64)

FIG. 21

| BIT RATE DURING PARTIAL DECODING | CPU CYCLE COUNT | PSNR[dB] OF DECODED PICTURES IN IRREVERSIBLY ENCODED FILE | CPU CYCLE COUNT DURING IRREVERSIBLE ENCODING (250 Mbps) |
|---|---|---|---|
| REVERSIBLE RATE (3,469 Mbps) | 7,105 | | |
| 1,000 Mbps | 2,337 | 37.38 | 904 |
| 500 Mbps | 1,333 | 37.36 | 904 |
| 400 Mbps | 1,104 | 37.23 | 904 |
| 300 Mbps | 880 | 37.14 | 904 |
| 250 Mbps | 771 | 37.05 | 904 |
| | | 36.89 | |

FIG.41

| "ALL_NUM_BP" | "Target_Rate" |
|---|---|
| ~50 | 50 Mbps |
| 100 | 100 Mbps |
| 500 | 200 Mbps |
| 1000 (="Ref_ALL_NUM_BP") | 250 Mbps |
| 1500 | 275 Mbps |
| 1800 | 300 Mbps |
| 2000~ | 350 Mbps |

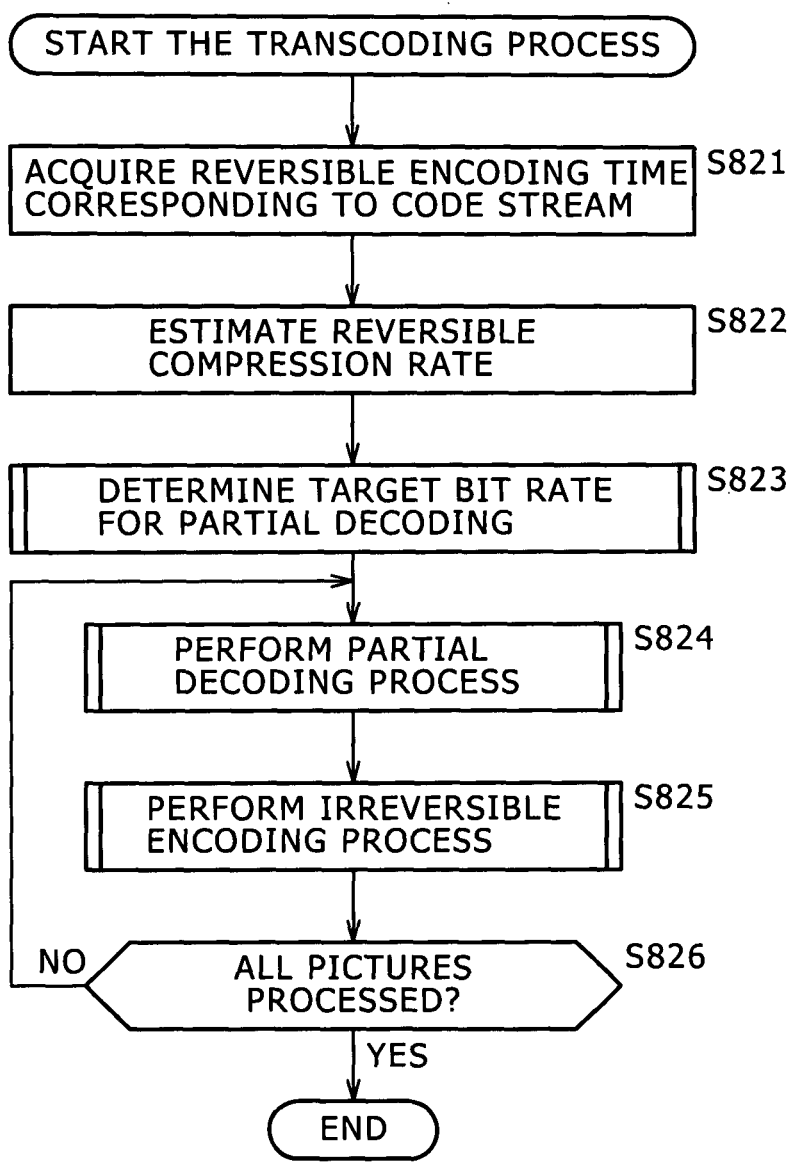

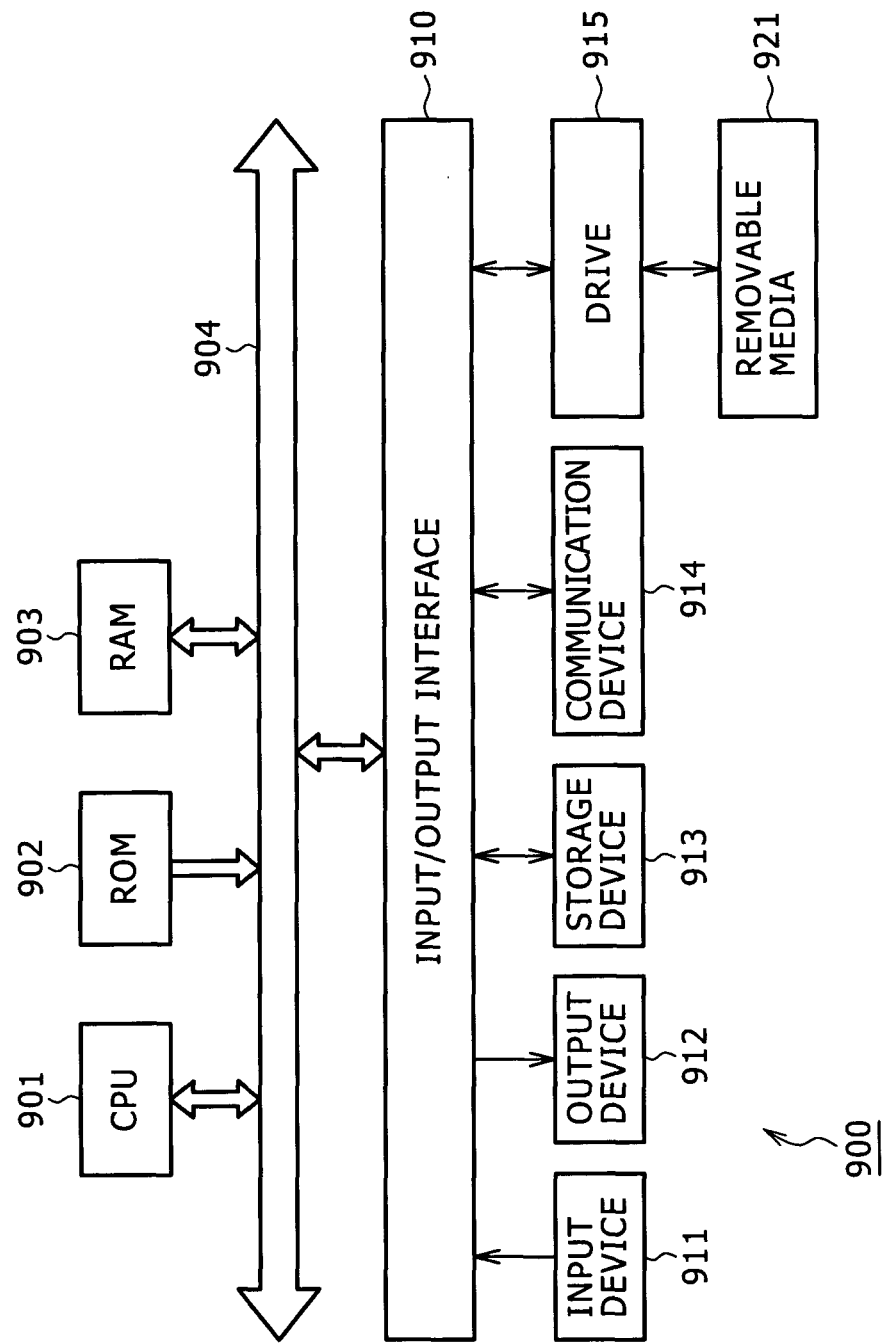

INFORMATION PROCESSING APPARATUS AND INFORMATION PROCESSING METHOD FOR REDUCING THE PROCESSING LOAD INCURRED WHEN A REVERSIBLY ENCODED CODE STREAM IS TRANSFORMED INTO AN IRREVERSIBLY ENCODED CODE STREAM

BACKGROUND OF THE INVENTION

1. Field of the Invention

The present invention relates to an information processing apparatus and an information processing method. More particularly, the invention relates to an information processing apparatus and an information processing method for reducing the processing load incurred when a reversibly encoded code stream is transformed into an irreversibly encoded code stream.

2. Description of the Related Art

Today, the use of digital picture data has spread to diverse fields including movie production, medical care services, and still picture photographing. Generally, uncompressed picture data constitutes master pictures that are compressed as needed. Compressed digital picture files are often distributed over networks or written to recording media.

Illustratively, the cinema in digital form is subject to a compression format for movie distribution based on the DCI (Digital Cinema Initiatives) standard. Under the DCI, JPEG 2000 (Joint Photographic Experts Group 2000) Part-1, as part of the ISO (International Organization for Standardization) standards, is utilized as the technique for compression and expansion. The bit rates involved peak at 250 Mbps for a moving picture sequence of XYZ 12 bits (24 Hz) in 4,096× 2,160 pixels. Uncompressed master pictures are thus compressed before being distributed or projected onto the screen.

Since the huge data size of uncompressed master pictures is disadvantageous to their storage, the master pictures are often compressed reversibly before being stored. In such cases, the data is not damaged when expanded to its original size.

For example, the resolution of pictures according to the DCI standard is 4,096 by 2,160 pixels, about four times as high as the resolution of HDTV (high definition television). That means the size of uncompressed picture data is enormous. As a result, master pictures are frequently stored after being compressed reversibly into files.

For use, the reversibly compressed files are transformed into JPEG 2000 files which are irreversibly compressed files as per the DCI standard. Because reversible compression and irreversible compression according to the JPEG 2000 utilize different wavelet transformation filters, the file data needs to be temporarily reverted to baseband pictures during the transformation.

Ordinary transcoders handling the above-outlined process decode all code streams of a given reversibly compressed file back into baseband pictures of the same data size as the original baseband master pictures.

Some down decoders decode the code streams into normal resolution images by performing inverse discrete cosine transform using only the coefficients of the low-frequency components in DCT blocks of high-resolution picture bit streams. This type of down decoder is disclosed illustratively in Japanese Patents Nos. 4016166 and 4026238.

SUMMARY OF THE INVENTION

The transform process carried out by the ordinary transcoder above involves decoding all code streams. This can lead to heavy decoding loads incurred particularly when the quantity of master picture data is very large as in the above cases.

Although the down decoders of the above-cited patents may be used to decode code streams, the decoding process deals with only low-frequency component coefficients, which inevitably results in reduced resolutions. For that reason, the down decoder scheme may not be suitable for applications of movie production which require transforming data without changing its resolution.

The present invention has been made in view of the above circumstances and provides an information processing apparatus and an information processing method for transforming reversibly encoded code streams into irreversibly encoded code streams in easier and more appropriate fashion than before.

In carrying out the present invention and according to a first embodiment thereof, there is provided an information processing apparatus including: partial decoding means for generating picture data by partially decoding a reversibly encoded picture code stream; irreversible encoding means for encoding irreversibly the picture data generated by the partial decoding means; and control means for controlling the partial decoding means to determine the picture code stream part to be decoded in such a manner that a target compression rate of the picture data generated by the partial decoding means constitutes the compression rate corresponding to a target code quantity for the irreversible encoding means.

Preferably, the control means may include: code quantity calculation means for selecting individually each of predetermined unit parts of the data constituting the code stream, as a code stream part candidate to be decoded starting from the most significant data part down to the least significant data part, the code quantity calculation means further calculating the code quantity of the candidate; and determination means configured such that if the compression rate of the picture data calculated based on the code quantity of the candidate calculated by the code quantity calculation means is lower than the target code quantity, then the determination means determines the data part making up the candidate as the data part to be decoded.

Preferably, the control means may include: code quantity calculation means for selecting individually each of predetermined unit parts of the data constituting the code stream, as a code stream part candidate to be truncated starting from the most significant data part down to the least significant data part, the code quantity calculation means further calculating the code quantity of the data parts not included in the candidate; and determination means configured such that if the compression rate of the picture data calculated based on the code quantity of the data parts not included in the candidate, the code quantity being calculated by the code quantity calculation means, is lower than the target code quantity, then the determination means determines the data parts not included in the candidate as the data parts to be decoded.

Preferably, the control means may include selection means for selecting a predetermined number of unit parts of the data constituting the code stream, as the data parts to be decoded starting from the most significant data part down to the least significant data part.

Preferably, the control means may include selection means for selecting a predetermined number of unit parts of the data constituting the code stream, as the data parts to be truncated starting from the least significant data part down to the most significant data part.

Preferably, the information processing apparatus of the embodiment may further include reversible encoding means for encoding reversibly the picture data, wherein the partial decoding means decodes the data parts of the code stream which are reversibly encoded by the reversible encoding means.

Preferably, the reversible encoding means may assign a weight to a coefficient of each of the picture data parts in accordance with the significance of the data part in question, before encoding each of the weighted data parts.

According to the first embodiment of the present invention, there is provided an information processing method including the steps of: causing partial decoding means to generate picture data by partially decoding a reversibly encoded picture code stream; causing irreversible encoding means to encode irreversibly the picture data generated by the partial decoding means; and causing control means to control the partial decoding means to determine the picture code stream part to be decoded in such a manner that a target compression rate of the picture data generated by the partial decoding means constitutes the compression rate corresponding to a target code quantity for the irreversible encoding means.

According to a second embodiment of the present invention, there is provided an information processing apparatus including: determination means for determining a decoding target bit rate constituting a target bit rate for picture data to be generated through a partial decoding process for partially decoding a reversibly encoded picture code stream using an encoding parameter acquired during the reversible encoding; partial decoding means for generating the picture data by performing the partial decoding process on the code stream using the decoding target bit rate determined by the determination means; and irreversible encoding means for irreversibly encoding the picture data generated by the partial decoding means.

Preferably, the determination means may determine the decoding target bit rate in accordance with the relative ratio of the encoding parameter to a predetermined reference value.

Preferably, the determination means may calculate a total sum of effective bit-planes per picture as the encoding parameter and calculate the decoding target bit rate in accordance with the relative ratio of the calculated total sum to the reference value.

Preferably, the determination means may calculate the decoding target bit rate by multiplying by the relative ratio an irreversible encoding target bit rate constituting a target bit rate for the encoded data to be generated through the irreversible encoding by the irreversible encoding means.

Preferably, the determination means may calculate a total sum of encoding passes per picture as the encoding parameter and calculate the decoding target bit rate in accordance with the relative ratio of the calculated total sum to the reference value.

Preferably, the determination means may calculate the decoding target bit rate by multiplying by the relative ratio an irreversible encoding target bit rate constituting a target bit rate for the encoded data to be generated through the irreversible encoding by the irreversible encoding means.

Preferably, the determination means may calculate a total sum of non-zero bit-planes per picture as the encoding parameter and calculate the decoding target bit rate in accordance with the relative ratio of the calculated total sum to the reference value.

Preferably, the determination means may calculate the decoding target bit rate by multiplying by the relative ratio an irreversible encoding target bit rate constituting a target bit rate for the encoded data to be generated through the irreversible encoding by the irreversible encoding means.

Preferably, the determination means may calculate a total sum of effective bit-planes per picture as the encoding parameter and acquire the decoding target bit rate from the total sum in reference to table information indicating relations of correspondence between the total sum and the decoding target bit rate.

Preferably, the determination means may calculate a total sum of encoding passes per picture as the encoding parameter and acquire the decoding target bit rate from the total sum in reference to table information indicating relations of correspondence between the total sum and the decoding target bit rate.

Preferably, the determination means may calculate a total sum of non-zero bit-planes per picture as the encoding parameter and acquire the decoding target bit rate from the total sum in reference to table information indicating relations of correspondence between the total sum and the decoding target bit rate.

According to the second embodiment of the present invention, there is provided an information processing method including the steps of: determining a decoding target bit rate constituting a target bit rate for picture data to be generated by a partial decoding process for partially decoding a reversibly encoded picture code stream using an encoding parameter acquired during the reversible encoding; generating the picture data by performing the partial decoding process on the code stream using the determined decoding target bit rate; and irreversibly encoding the generated picture data.

According to a third embodiment of the present invention, there is provided an information processing apparatus including: determination means for determining a decoding target bit rate constituting a target bit rate for picture data to be generated through a partial decoding process for partially decoding a reversibly encoded picture code stream using either the data size of the code stream or a system parameter; partial decoding means for generating the picture data by performing the partial decoding process on the code stream using the decoding target bit rate determined by the determination means; and irreversible encoding means for irreversibly encoding the picture data generated by the partial decoding means.

Preferably, the determination means may include: reversible compression rate calculation means for calculating a reversible compression rate constituting the compression rate for the reversible encoding using the data size of the code stream and the data size of the picture data yet to be reversibly encoded; and decoding target bit rate calculation means for calculating the decoding target bit rate using the reversible compression rate calculated by the reversible compression rate calculation means.

Preferably, the decoding target bit rate calculation means may calculate the decoding target bit rate by multiplying the inverse of the relative ratio of the reversible compression rate to a predetermined reference value by an irreversible encoding target bit rate constituting a target bit rate for the encoded data to be generated through the irreversible encoding by the irreversible encoding means.

Preferably, the determination means may include: measurement means for measuring a reversible encoding time constituted by the time required to perform the reversible encoding; estimation means for estimating a reversible compression rate constituting the compression rate for the reversible encoding in accordance with the length of the reversible encoding time measured by the measurement means; and decoding target bit rate calculation means for calculating the decoding target bit rate using the reversible compression rate estimated by the estimation means.

Preferably, the decoding target bit rate calculation means may calculate the decoding target bit rate by multiplying the inverse of the relative ratio of the reversible compression rate to a predetermined reference value by an irreversible encoding target bit rate constituting a target bit rate for the encoded data to be generated through the irreversible encoding by the irreversible encoding means.

According to the embodiment of the present invention, there is provided an information processing method including the steps of: determining a decoding target bit rate constituting a target bit rate for picture data to be generated through a partial decoding process for partially decoding a reversibly encoded picture code stream using either the data size of the code stream or a system parameter; generating the picture data by performing the partial decoding process on the code stream using the determined decoding target bit rate; and irreversibly encoding the generated picture data.

According to the present invention embodied as outlined above as the first embodiment, picture data is first generated by partially decoding a reversibly encoded picture code stream. The picture data generated by the partial decoding process is then encoded irreversibly. Control is exercised to determine the picture code stream part to be decoded in such a manner that a target compression rate of the generated picture data constitutes the compression rate corresponding to a target code quantity for the irreversible encoding process.

Also according to the present invention embodied as outlined above as the second embodiment, a decoding target bit rate constituting a target bit rate for picture data to be generated by a partial decoding process for partially decoding a reversibly encoded picture code stream is first determined using an encoding parameter acquired during the reversible encoding. The picture data is generated by performing the partial decoding process on the code stream using the determined decoding target bit rate. The generated picture data is then irreversibly encoded.

Also according to the present invention, as outlined above, a decoding target bit rate constituting a target bit rate for picture data to be generated through a partial decoding process for partially decoding a reversibly encoded picture code stream is first determined using either the data size of the code stream or a system parameter. The picture data is generated by performing the partial decoding process on the code stream using the determined decoding target bit rate. The generated picture data is then irreversibly encoded.

The information processing apparatus or method of the embodiments thus makes it possible to generate irreversibly encoded code streams in easier and more appropriate fashion than before. In particular, the inventive apparatus or method can transform a reversibly encoded code stream into an irreversibly encoded code stream more expediently than ordinary apparatuses or methods.

BRIEF DESCRIPTION OF THE DRAWINGS

FIG. 21 is a tabular view showing the relations between bit rates and PSNR (peak signal-to-noise ratios) during partial decoding;

FIG. 41 is a schematic view explanatory of how table information is typically structured;

FIG. 54 is a flowchart of steps constituting another transcoding process; and

FIG. 55 is a block diagram showing a typical structure of a personal computer to which an embodiment of the present invention is applied.

DETAILED DESCRIPTION OF THE PREFERRED EMBODIMENTS

The preferred embodiments of the present invention will now be described in reference to the accompanying drawings. First of all, a typical picture data transforming process for transforming a reversibly encoded code stream into an irreversibly encoded code stream is explained below.

Figure 1:
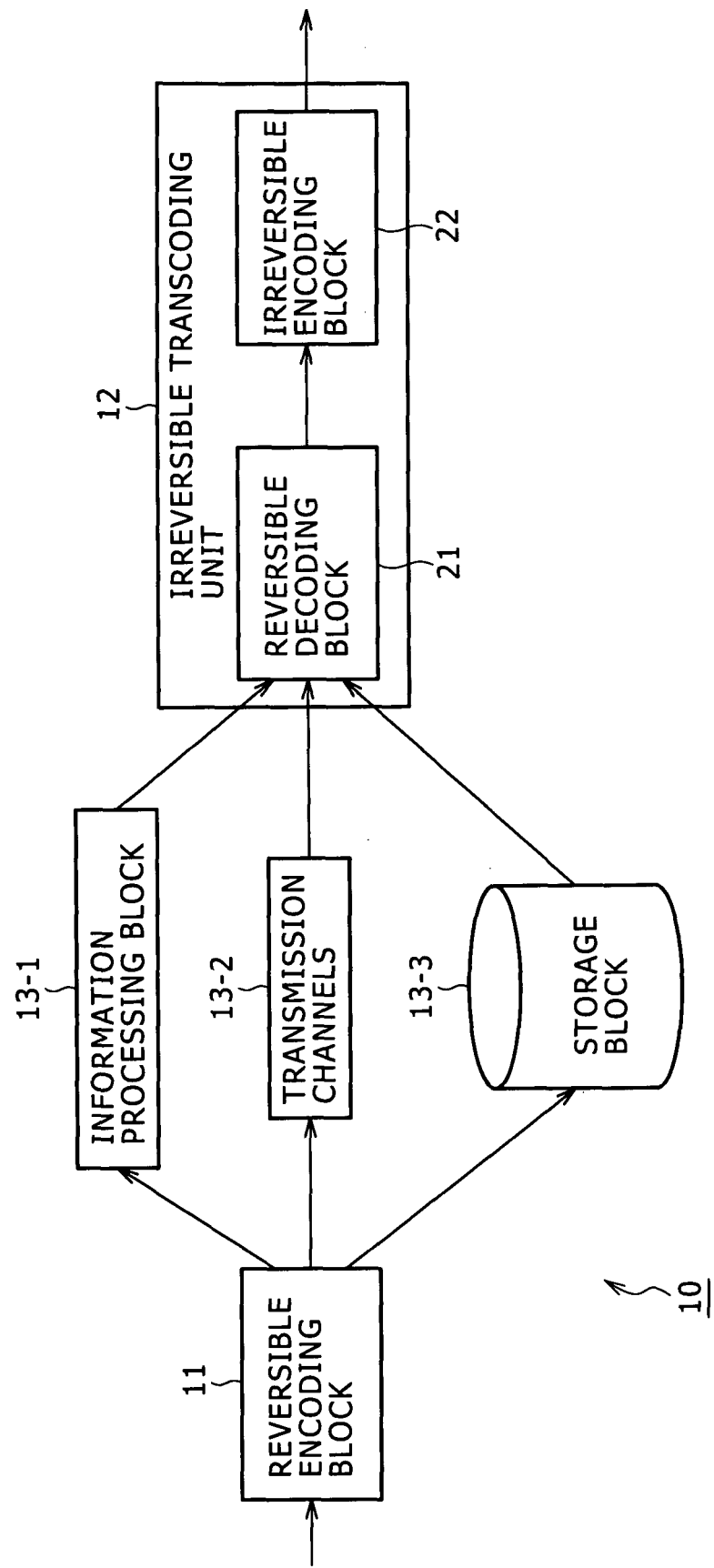
FIG. 1 is a block diagram showing a typical structure of an ordinary encoding apparatus.

FIG. 1 schematically shows a typical structure of an ordinary encoding apparatus 10 that carries out the above type of transforming process. The encoding apparatus 10 in FIG. 1 first encodes input baseband picture data reversibly into a compressed code stream at a predetermined compression rate. The encoding apparatus 10 then decodes the entire compressed code stream back to baseband picture data using an expansion technique corresponding to the reversible compression method in use. The encoding apparatus 10 further compresses the baseband picture data into an irreversibly encoded code stream at a desired compression rate before outputting the resulting code stream.

In order to alleviate its processing loads, the encoding apparatus 10 first causes a reversible encoding block 11 to encode the input baseband picture data (master picture) reversibly into a compressed code stream in compliance with the JPEG 2000 standard.

Illustratively, the encoding apparatus 10 may cause an information processing block 13-1 to perform predetermined processes on the code stream such as addition of meta information. The encoding apparatus 10 may alternatively transmit the code stream over transmission channels 13-2 such as a predetermined bus or a network. As another alternative, the encoding apparatus 10 may store the code stream temporarily into a storage block 13-3 such as a hard disk drive or a semiconductor memory before retrieving the stored code stream in a suitably timed manner for output.

The encoding apparatus 10 proceeds to let an irreversible transcoding unit 12 transform the code stream irreversibly into a compressed code stream in accordance with the JPEG 2000 standard. In the irreversible transcoding unit 12, a reversible decoding block 21 decodes the entire code stream supplied from the information processing block 13-1, transmission channels 13-2, or storage block 13-3 using an expansion technique corresponding to the reversible compression method in accordance with the JPEG 2000. Theoretically, the decoding process performed by the reversible decoding block 21 provides the baseband picture data of the same size as that of the data input earlier to the encoding apparatus 10. An irreversible encoding block 22 in the irreversible transcoding unit 12 compresses the picture data irreversibly at a desired compression rate according to the JPEG 2000 standard and sends the acquired code stream outside of the encoding apparatus 10.

In the ordinary encoding apparatus 10, as described, the reversible decoding block 21 of the irreversible transcoding unit 12 decodes the entire code stream. If the master picture has a large data size, the load of the decoding process becomes so onerous that transcoding efficiency is reduced significantly.

The encoding apparatus 10 was described above as an embodiment of a series of processes whereby baseband picture data is reversibly compressed before being irreversibly transformed through compression into a code stream. The same principle of operation also applies to a system made up of a plurality of apparatuses each performing the same processing.

Figure 2:
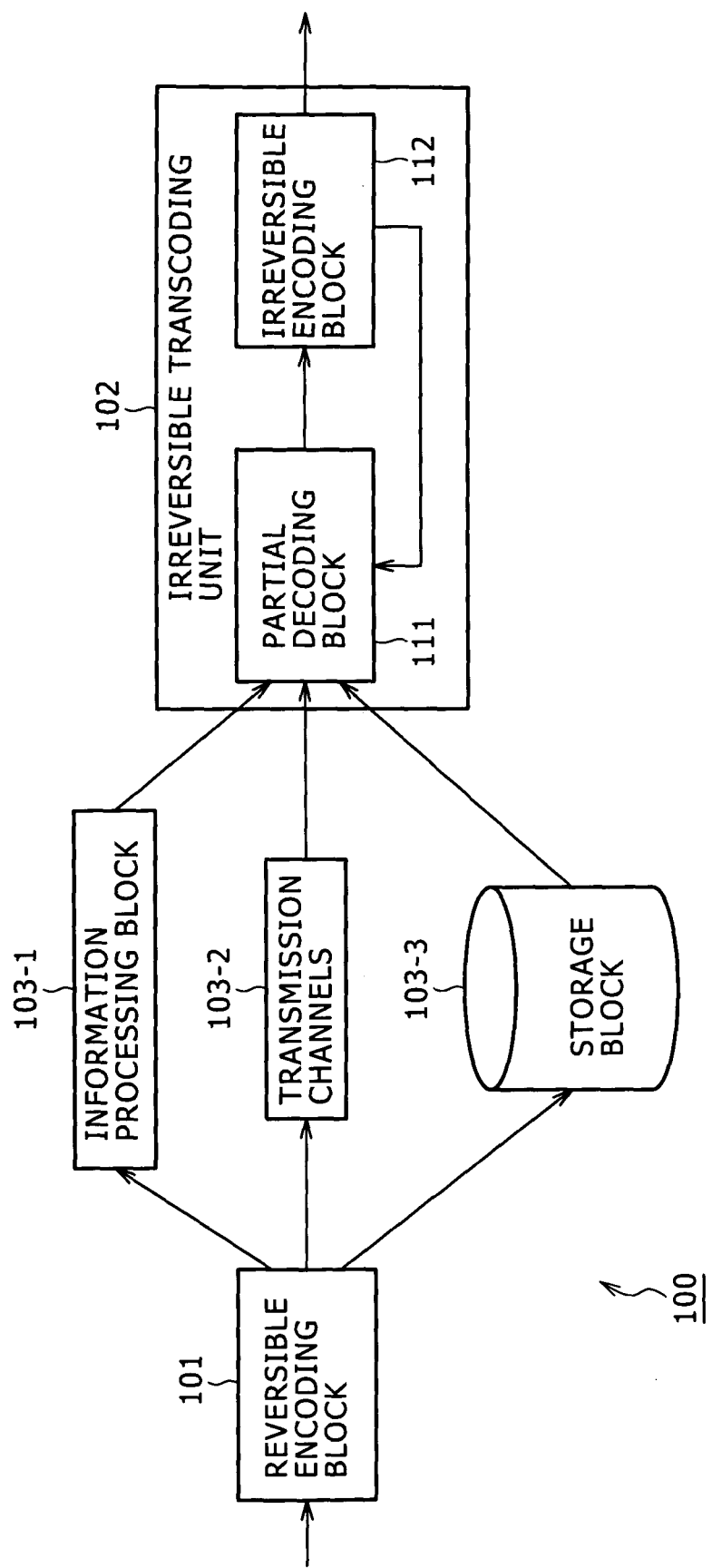
FIG. 2 is a block diagram showing an overall structure of an encoding apparatus embodying the present invention.

FIG. 2 is a block diagram showing an overall structure of an encoding apparatus 100 embodying the present invention. The encoding apparatus 100 in FIG. 2, like the encoding apparatus 10 in FIG. 1, first encodes input baseband picture data reversibly at a predetermined compression rate in accordance with the JPEG 2000 standard. The encoding apparatus 100 then encodes the compressed code stream irreversibly at a desired compression rate into a code stream based on the JPEG 2000 standard, before outputting the acquired code stream.

As shown in FIG. 2, the encoding apparatus 100 has a reversible encoding block 101 and an irreversible transcoding unit 102. The reversible encoding block 101, like the reversible encoding block 11 discussed above, encodes the input baseband picture data reversibly at a predetermined compression rate into a reversibly compressed file of a compressed code stream according to the JPEG 2000 standard. At this time, the reversible encoding block 101 assigns weights to wavelet coefficients generated during encoding in order of significance. The reversible encoding block 101 will be discussed later in more detail.

As in the case of the encoding apparatus 10 above, the encoding apparatus 100 may cause an information processing block 103-1 to perform predetermined processes on the reversibly compressed file such as addition of meta information. The encoding apparatus 100 may alternatively transmit the reversibly compressed file over transmission channels 103-2 such as a predetermined bus or a network. As another alternative, the encoding apparatus 100 may store the reversibly compressed file temporarily into a storage block 103-3 such as a hard disk drive or a semiconductor memory before retrieving the stored file in a suitably timed manner for output.

The irreversible transcoding unit 102 includes a partial decoding block 111 and an irreversible encoding block 112.

The partial decoding block 111 partially decodes the code stream in the reversibly compressed file that was processed by the information processing block 103-1, supplied over the transmission channels 103-2, or retrieved from the storage block 103-3, whereby baseband picture data is generated. The irreversible encoding block 112 irreversibly encodes the baseband picture data at a desired compression rate into a code stream in accordance with the JPEG 2000 standard, and outputs the generated code stream.

At this point, based on a target code quantity of the code stream to be generated, the irreversible encoding block 112 calculates the compression rate of the baseband picture data subject to the compression encoding of the block 112 with regard to the master picture (original picture). The calculated compression rate is sent to the partial decoding block 111 as a target compression rate. That is, the irreversible encoding block 112 expresses the code quantity of the baseband picture data necessary for attaining the target code quantity in terms of the compression rate for the picture data of the master picture (original picture), and forwards the code quantity thus determined to the partial decoding block 111.

The partial decoding block 111 regards the received compression rate as the target compression rate, and partially decodes the code stream of the reversibly compressed file accordingly into baseband picture data. As will be discussed later, the larger the code quantity of the baseband picture data to be generated (i.e., the higher the compression rate with regard to the picture data of the master picture (original picture)), the smaller the part of the code stream to be decoded by the partial decoding block 111 thus profiting from the reduced throughput of its decoding process. However, the lower the code quantity of the baseband picture data to be generated by the partial decoding block 111, the less likely the irreversible encoding block 112 can attain the target code quantity.

In order to bypass the above bottleneck, the partial decoding block 111 selects the part of the code stream to be decoded in such a manner that the compression rate of the baseband picture data to be generated with regard to the picture data of the master picture (original picture) becomes equal to or slightly lower than the target compression rate acquired from the irreversible encoding block 112; the partial decoding block 111 decodes only the code stream part thus selected. In other words, to such an extent that the irreversible encoding block 112 can attain the target code quantity, the partial decoding block 111 partially decodes the code stream of the reversibly compressed file so as to reduce the throughput of the decoding process. The partial decoding block 111 determines that extent based on the target compression rate supplied by the irreversible encoding block 112.

In the description that follows, the process in which the code stream is partially decoded as discussed above will be referred to as the partial decoding process. By carrying out the partial decoding process, the partial decoding block 111 can decode the reversibly compressed file easily and appropriately even if the master picture (original picture) has a huge data size.

As mentioned above, the reversible encoding block 101 may assign weights to wavelet coefficients in order of significance. In this manner, the partial decoding block 111 may let the significance of each coefficient be reflected in the selection of that part of the code stream which is to be decoded (i.e., code stream parts may be selected in order of significance).

The reversible encoding block 101, partial decoding block 111, and irreversible encoding block 112 carry out their processing in units of bit-planes obtained by slicing bits of wavelet coefficients by digit place. The partial decoding block 111 can perform the partial decoding process without lowering the resolution of the picture. Obviously, the partial decoding block 111 may be arranged to reduce the resolution.

The partial decoding block 111 and irreversible encoding block 112 will be discussed later in more detail.

Figure 3:
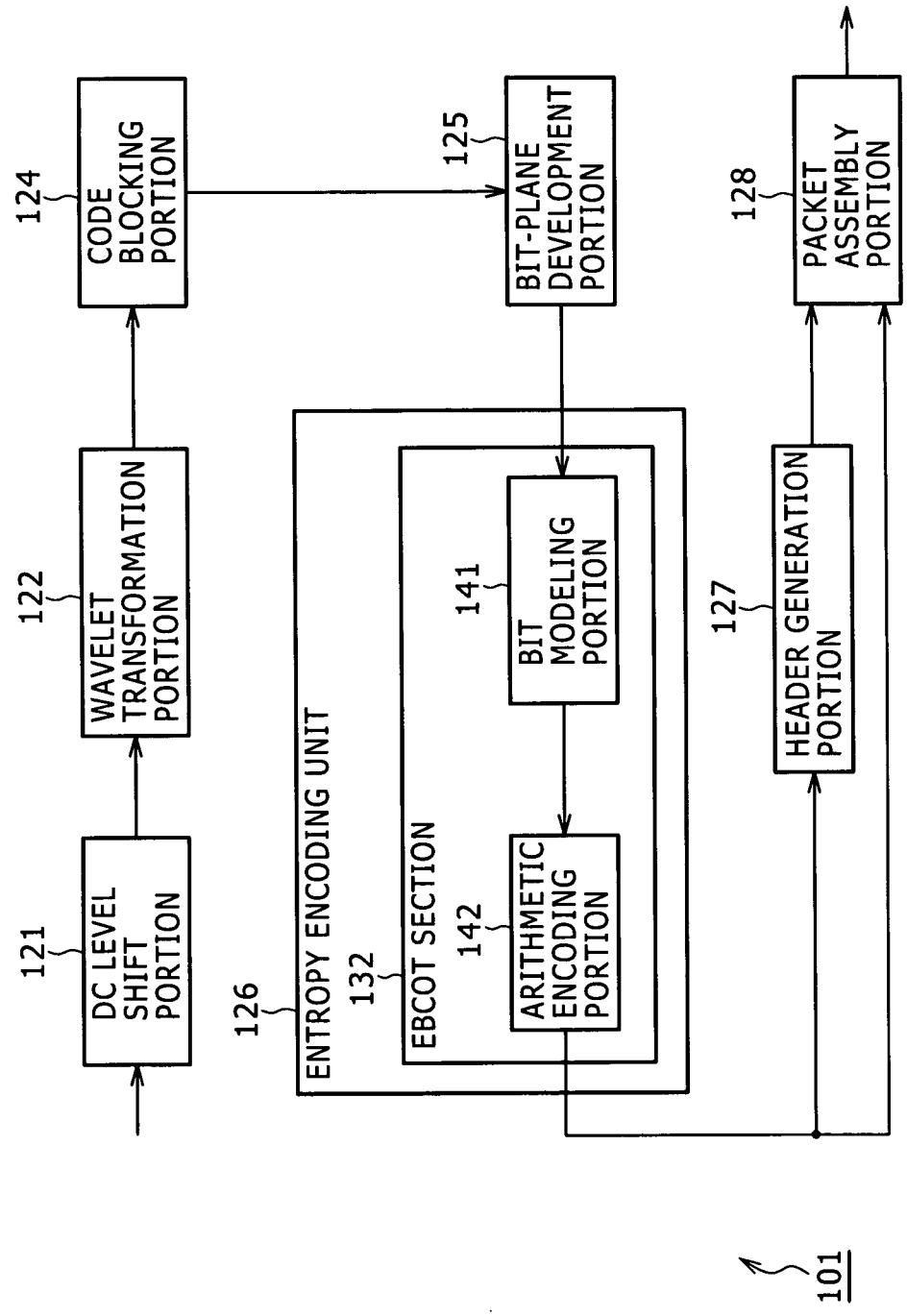
FIG. 3 is a block diagram showing a detailed structure of a reversible encoding block as part of the structure in FIG. 2.

A more detailed structure of the encoding apparatus 100 in FIG. 2 will now be described. FIG. 3 is a block diagram showing a typical detailed structure of the reversible encoding block 101 as part of the structure in FIG. 2. As illustrated in FIG. 3, the reversible encoding block 101 includes a DC level shift portion 121, a wavelet transformation portion 122, a code blocking portion 124, a bit-plane development portion 125, an entropy encoding unit 126, a header generation portion 127, and a packet assembly portion 128.

The DC level shift portion 121 shifts DC component levels in picture data so as to carry out downstream wavelet transformation efficiently. Illustratively, the fact that the RGB signal has a positive value (i.e., unsigned integer) is taken advantage of by the DC level shift portion 121 which shifts levels to halve the dynamic range of the original signal for enhanced compression efficiency. If the original signal has a signed (positive or negative) integer value, such as Cb or Cr (color difference signal) in the YCbCr signal, then the shifting of levels is not carried out.

The wavelet transformation portion 122 is implemented in the form of a filter bank usually made up of low-pass and high-pass filters. Since digital filters generally have an impulse response (i.e., filter coefficient) of a multiple tap length each, the wavelet transformation portion 122 possesses a buffer that buffers a sufficient amount of input picture data for filtering execution.

The wavelet transformation portion 122 acquires at least a minimum amount of picture data necessary for filtering purposes, the picture data being output by the DC level shift portion 121. The wavelet transformation portion 122 generates wavelet coefficients by getting a 5×3 wavelet transformation filter to filter the acquired picture data having undergone the DC level shift. The wavelet transformation portion 122 separates the picture data into low-pass and high-pass components through the filtering process in the vertical and horizontal directions of the picture.

Figure 4:
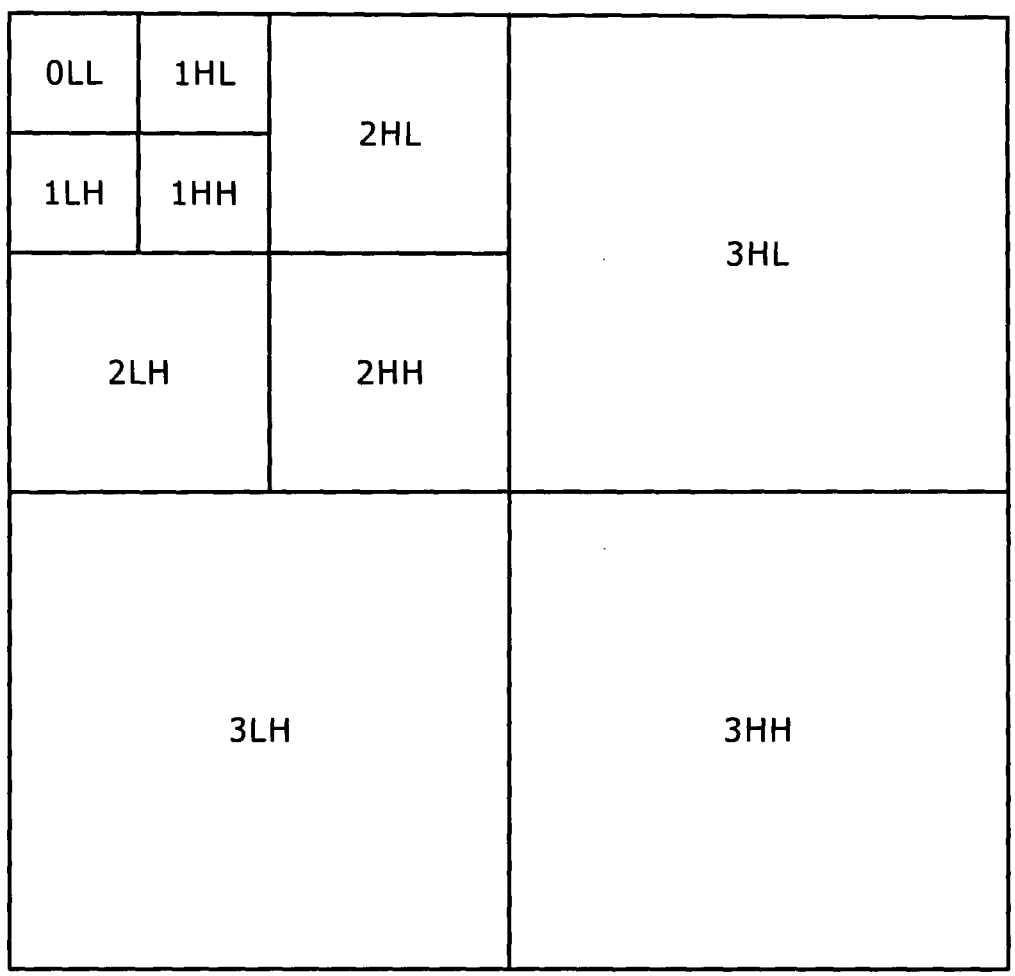
FIG. 4 is a schematic view showing a typical sub-band structure.

As shown in FIG. 4, the wavelet transformation portion 122 performs recursively the filtering process a predetermined number of times on the sub-bands separated as low-pass components in the vertical and horizontal directions of the picture. The filtering is performed recursively to deal with the energy of the picture being concentrated on the low-pass components as shown in FIG. 5.

FIG. 4 schematically shows a typical structure of sub-bands generated by the wavelet transforming process with a slice level count of 3. In this case, the wavelet transformation portion 122 initially filters the entire picture and thereby generates sub-bands 3LL (not shown), 3HL, 3LH, and 3HH. The wavelet transformation portion 122 again performs the filtering process on the generated sub-band 3LL, thus generating sub-bands 2LL (no shown), 2HL, 2LH, and 2HH. The wavelet transformation portion 122 yet again performs the filtering process on the generated sub-band 2LL, generating sub-bands 0LL, 1HL, 1LH, and 1HH.

Figure 5:
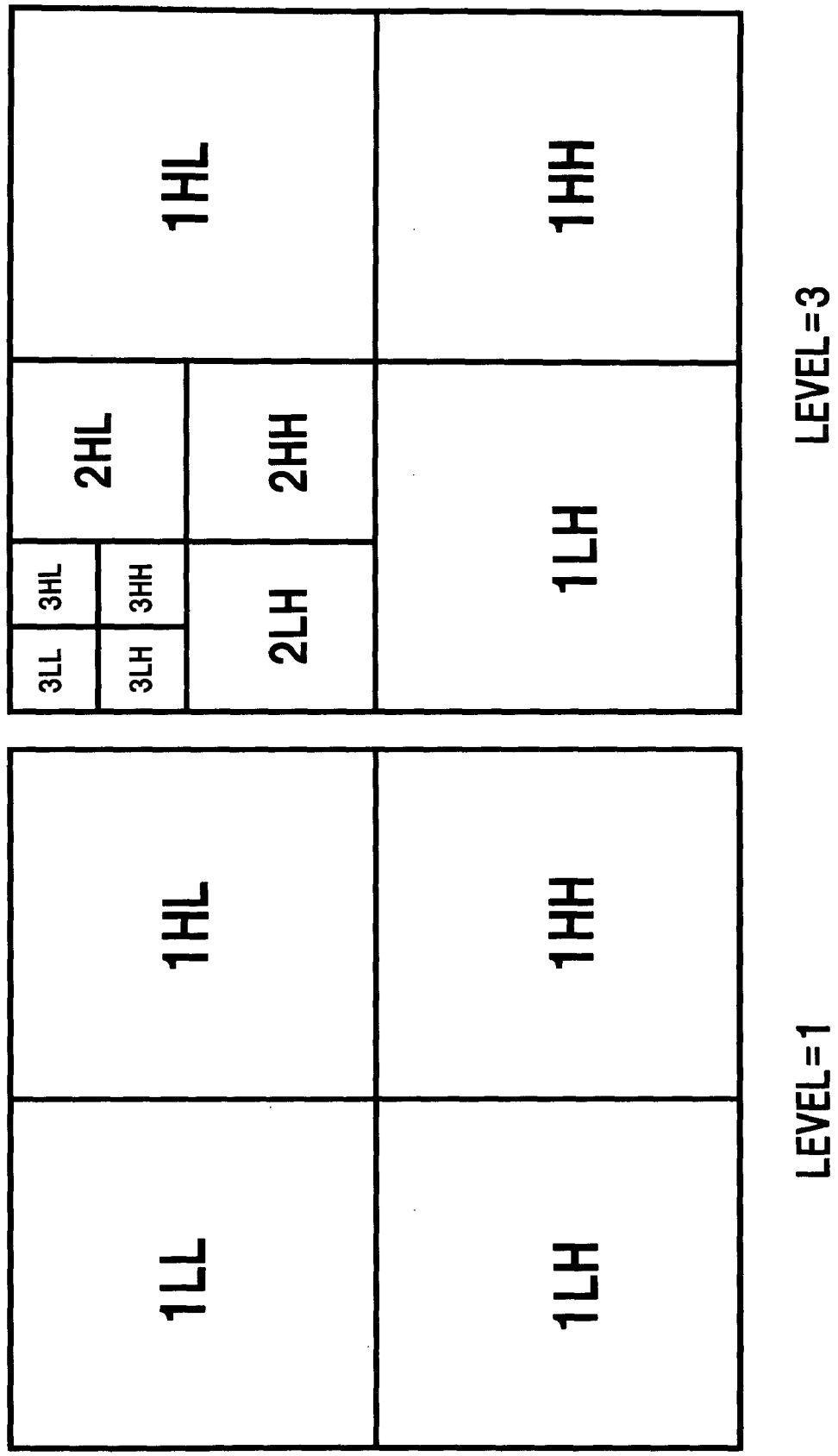
FIG. 5 is a schematic view showing another typical sub-band structure.

FIG. 5 schematically shows how sub-bands are being formed as the slice level is advanced. The left-hand half of FIG. 5 depicts pictures of the sub-bands obtained by the wavelet transforming process in which the slice level is 1; the right-hand half of FIG. 5 illustrates pictures of the sub-bands acquired by the wavelet transforming process in which the slice level is 3. That is, the right-hand half of FIG. 5 shows the pictures of the sub-bands indicated in FIG. 4.

The wavelet transformation portion 122 supplies the code blocking portion 124 with wavelet coefficients obtained through filtering with regard to each sub-band. At this point, the wavelet transformation portion 122 feeds the code blocking portion 124 with the sub-bands in descending order of significance (i.e., starting from the most significant sub-band down to the least significant sub-band). Generally, the wavelet transformation portion 122 supplies the code blocking portion 124 with sub-bands in ascending order in which low-pass components are followed progressively by high-pass components.

The JPEG 2000 standard requires that a 5×3 wavelet transformation filter be used for reversible wavelet transformation. In this case, quantization is not carried out; all encoding passes or bit-planes, to be discussed later, are encoded.

Figure 6:
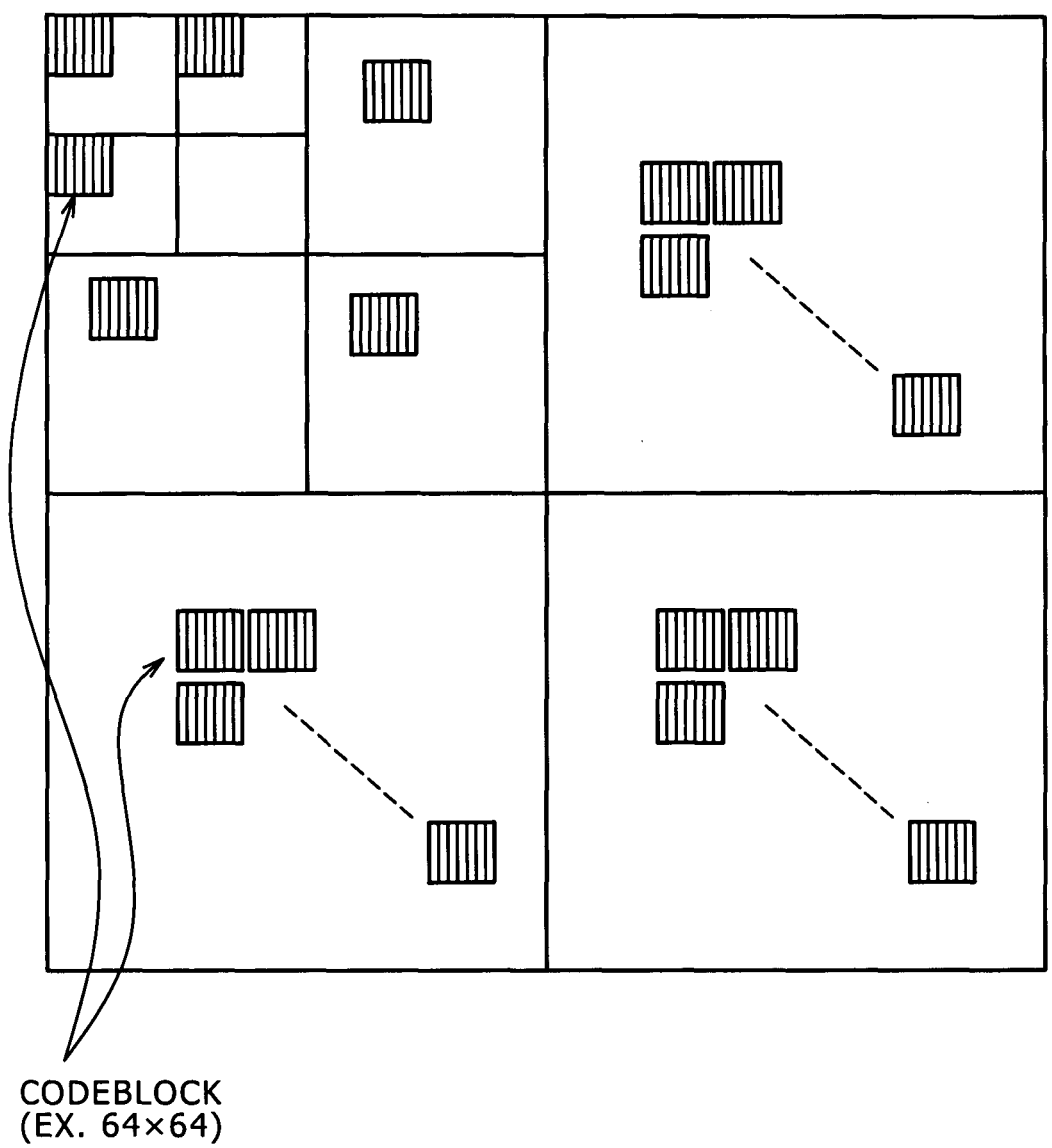
FIG. 6 is a schematic view showing typical positional relations between code blocks in different sub-bands.

Wavelet coefficients are sliced by the code blocking portion 124 into code blocks of a predetermined size each, the blocks being processing units for entropy encoding. FIG. 6 schematically shows typical positional relations between code blocks in different sub-bands. Illustratively, code blocks with a size of about 64 by 64 pixels each are generated in all sub-bands resulting from the slicing process. Suppose that in the example of FIG. 4, the sub-band 3HH at the lowest slice level has a size of 640 by 320 pixels. In that case, there exist a total of 50 code blocks of 64 by 64 pixels each. Downstream processing portions perform their processing in units of these code blocks.

The code blocking portion 124 supplies the bit-plane development portion 125 with code blocks in descending order of significance (i.e., starting from the most significant code block down to the least significant code block). The bit-plane development portion 125 develops coefficient data into bit-planes by bit digit place and forwards the bit-planes to the entropy encoding unit 126.

Bit-planes are obtained by slicing a group of a predetermined number of wavelet coefficients bit by bit (i.e., by digit place). That is, each bit-plane is a set of bits (coefficient bits) in the same digit place within the group of coefficients in question.

Figure 7:
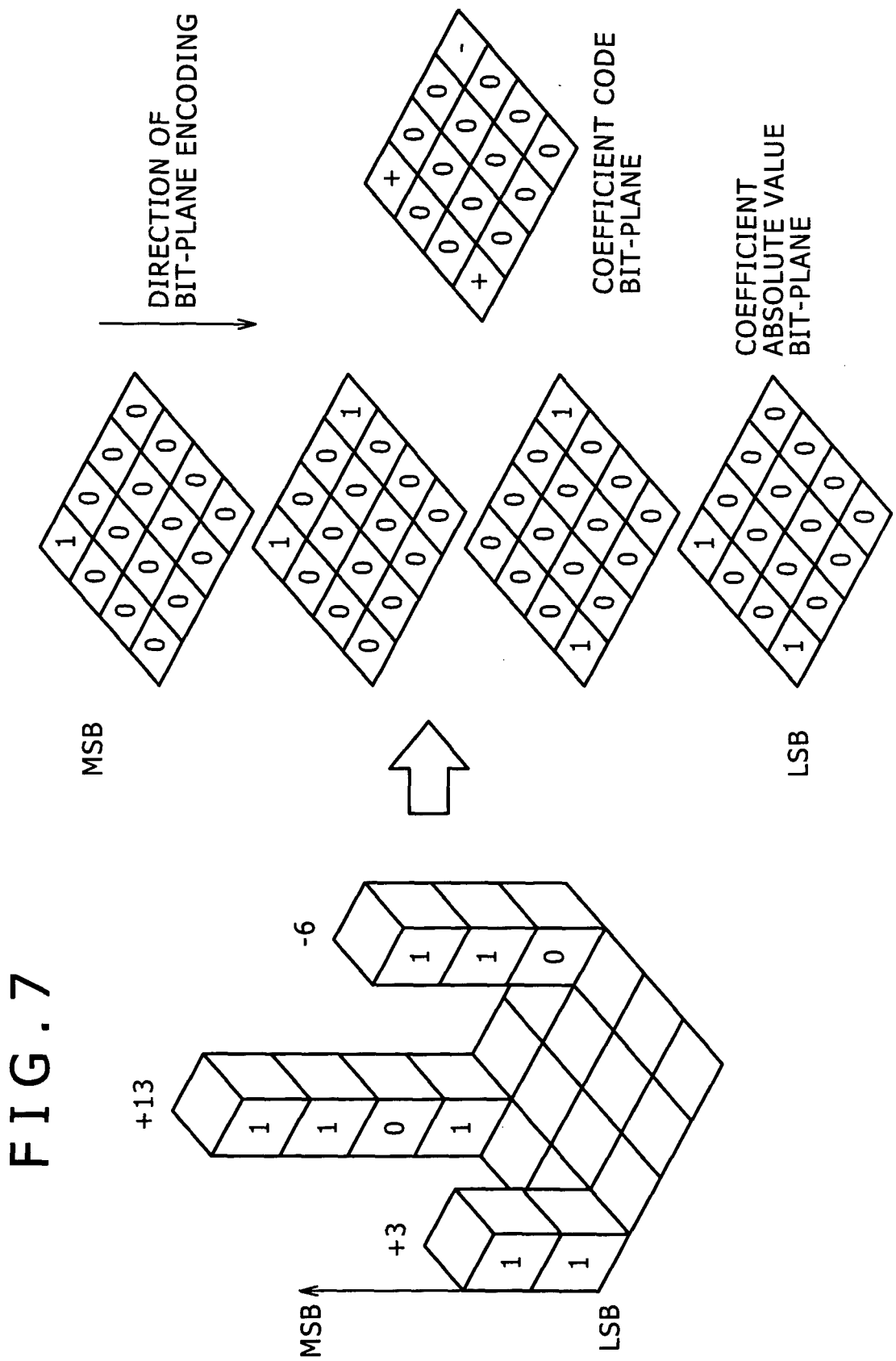
FIG. 7 is a schematic view explanatory of typical bit-planes.

FIG. 7 shows examples of bit-planes. The left-hand half of FIG. 7 indicates a total of 16 coefficients (4 by 4 crosswise and longwise). Of the 16 coefficients, the one with the largest absolute value is 13, or "1101" in binary notation. The bit-plane development portion 125 develops such a group of coefficients into four bit-planes each representing an absolute value (absolute-value bit-planes) and one bit-plane indicative of a sign (sign bit-plane). That is, the coefficient group shown on the left of FIG. 7 is developed into four absolute-value bit-planes and one sign bit-plane as indicated on the right. Each of the elements constituting the absolute-value bit-planes takes on either 1 or 0. The elements making up the sign bit-plane take on values indicating that each of the coefficient values is positive, zero, or negative.

The bit-plane development portion 125 supplies the entropy encoding unit 126 with the developed bit-planes in descending order of significance (i.e., starting from the most significant bit-plane down to the least significant bit-plane).

The entropy encoding unit 126 in turn encodes the coefficient data bit-planes in the order in which they have arrived (i.e., in descending order of significance). For example, the entropy encoding unit 126 encodes each bit-plane successively starting from the most significant bit (MSB) of the coefficient in question down to the least significant bit (LSB).

As shown in FIG. 3, the entropy encoding unit 126 includes an EBCOT (Embedded Coding with Optimized Truncation) section 132. The EBCOT section 132 performs an entropy encoding process called EBCOT, defined by the JPEG 2000 standard, on the input coefficient data. EBCOT is a technique for encoding each block of data of a predetermined size while measuring the statistical quantity of coefficients within the block in question.

The EBCOT section 132 includes a bit modeling portion 141 and an arithmetic encoding portion 142. The bit modeling portion 141 performs bit modeling on coefficient data in the steps defined by the JPEG 2000 standard and outputs the resulting "context" to the arithmetic encoding portion 142. The arithmetic encoding portion 142 arithmetically encodes the bit-planes of coefficients.

The size of code blocks range from 4 to 256 (powers of 2) crosswise and lengthwise. Typically, code blocks have a size of 32 by 32, 64 by 64, or 128 by 32. The coefficient value is usually expressed by an n-bit signed binary number, with bits 0 through (n−2) representing the bits ranging from LSB to MSB and with the remaining one bit indicating a sign. Code blocks are encoded successively starting from the bit-plane on the MSB side, by use of the following three kinds of encoding passes:

(1) Significance Propagation Pass

A significance propagation pass is used to encode a given bit-plane in such a manner as to arithmetically encode the value of a non-significant coefficient bit-plane where at least one out of eight nearby coefficients is significant. If the value of the encoded bit-plane is 1, then the arithmetic encoding process is continued to determine if the sign is positive or negative.

The word "significance" in this connection has the following meaning: what is significant means a given coefficient being set to 1 when encoded and staying 1 thereafter. In that sense, significance can be interpreted as a flag indicating whether or not significant-digit information has been encoded. Once a coefficient on a given bit-plane becomes significant, that coefficient remains significant on all subsequent bit-planes.

(2) Magnitude Refinement Pass

A magnitude refinement pass is used to arithmetically encode the value of a significant coefficient bit-plane that has yet to be encoded through the significance propagation pass for encoding bit-planes.

(3) Cleanup Pass

A cleanup pass is used to arithmetically encode the value of a non-significant coefficient bit-plane that has yet to be encoded through the significance propagation pass. If the value of the encoded bit-plane is 1, then the arithmetic encoding process is performed continuously to determine if the sign is positive or negative.

The arithmetic encoding process using the above three passes may selectively utilize diverse techniques such as (1) ZC (zero coding), (2) RLC (run-length coding), (3) SC (sign coding), or (4) MR (magnitude refinement) depending on what needs to be processed. It is assumed that this embodiment of the invention employs an arithmetic encoding technique known as MQ coding. MQ coding constitutes a learning type binary arithmetic code defined by the JBIG2 (Joint Bi-level Image Experts Group 2). Under the JPEG 2000 standard, a total of 19 contexts exist for all encoding passes.

Figure 8:
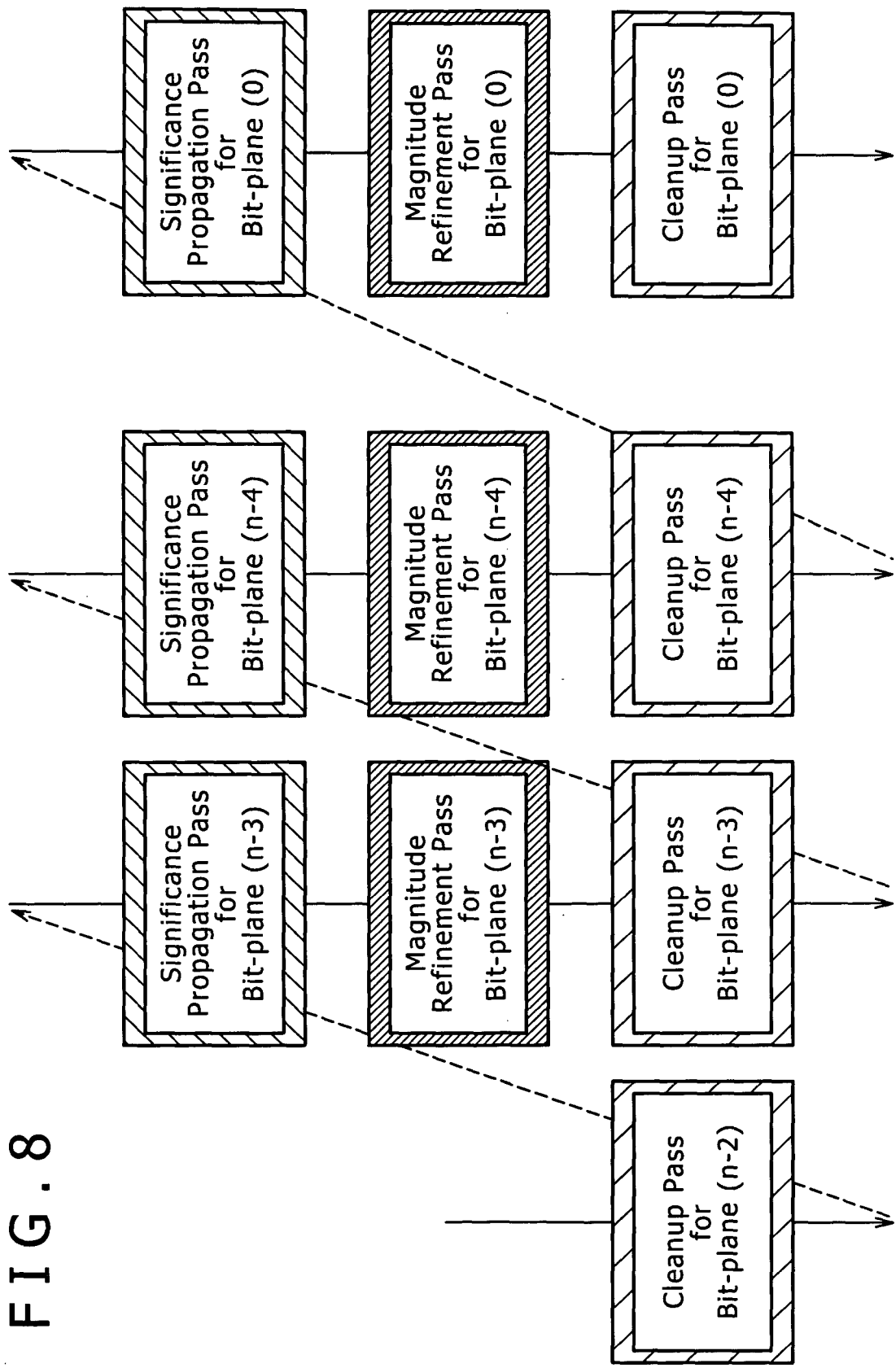
FIG. 8 is a schematic view explanatory of typical encoding passes.

A typical sequence in which these three encoding passes are used is shown in FIG. 8. The most significant bit (MSB) bit-plane (n−2){bit-plane (n−2)} is first encoded by a cleanup pass. Thereafter, the bit-planes are encoded one by one, in descending order of significance, until the LSB bit-plane is reached using the above-described significance propagation pass, magnitude refinement pass, and cleanup pass, in that order.

In practice, the EBCOT section 132 writes to the header the ordinal position of the bit-plane where 1 first appears as counted from the MSB bit-plane. The bit-planes where all coefficients are zero (called zero bit-planes) are not encoded.

Figure 9:
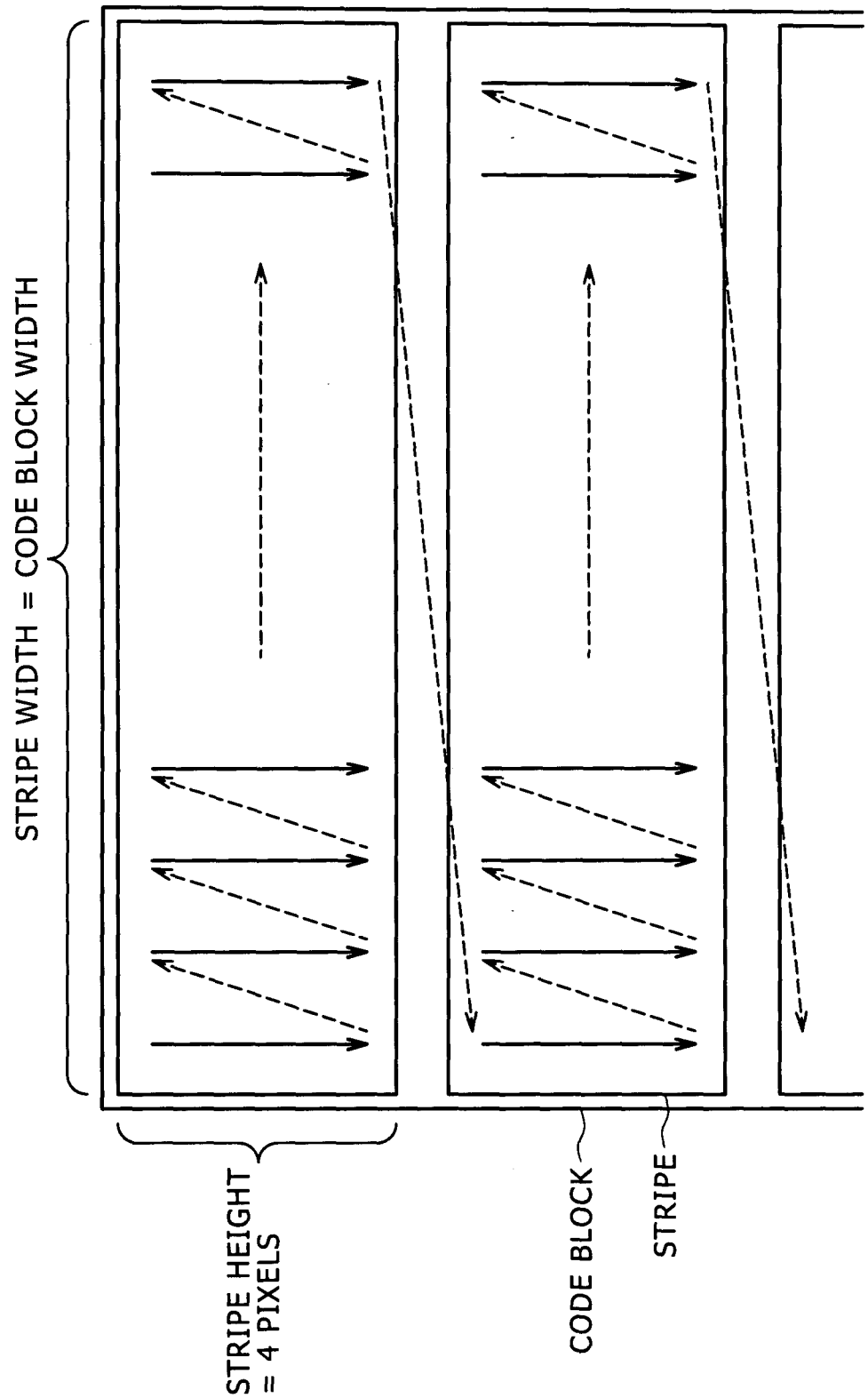
FIG. 9 is a schematic view explanatory of typical scanning of coefficients.

The scanning of coefficients will now be explained in reference to FIG. 9. The height of each code block is divided into four stripes each made up of four coefficients. The stripe width is equal to the code block width. Scanning takes place in a sequence that traces all coefficients in a single code block from the topmost stripe to the bottommost stripe, from the leftmost column to the rightmost column in each stripe, and from top to bottom in each column. Through each encoding pass, all coefficients in the code block are processed in that scanning sequence.

The sequence of the encoding of sub-bands and the entire picture will be described later in detail. Basically, the entropy encoding unit 126 encodes coefficient bits in descending order of significance.

Returning to FIG. 3, the entropy encoding unit 126 (i.e., arithmetic encoding portion 142 in the EBCOT section 132) supplies all of the encoded code stream to the header generation portion 127 and packet assembly portion 128.

The packet assembly portion 128 packetizes the encoded code stream that has been supplied. The header generation portion 127 generates header information about the packets to be assembled and sends the generated header information to the packet assembly portion 128. Using the header information, the packet assembly portion 128 assembles the packets.

Figure 10:
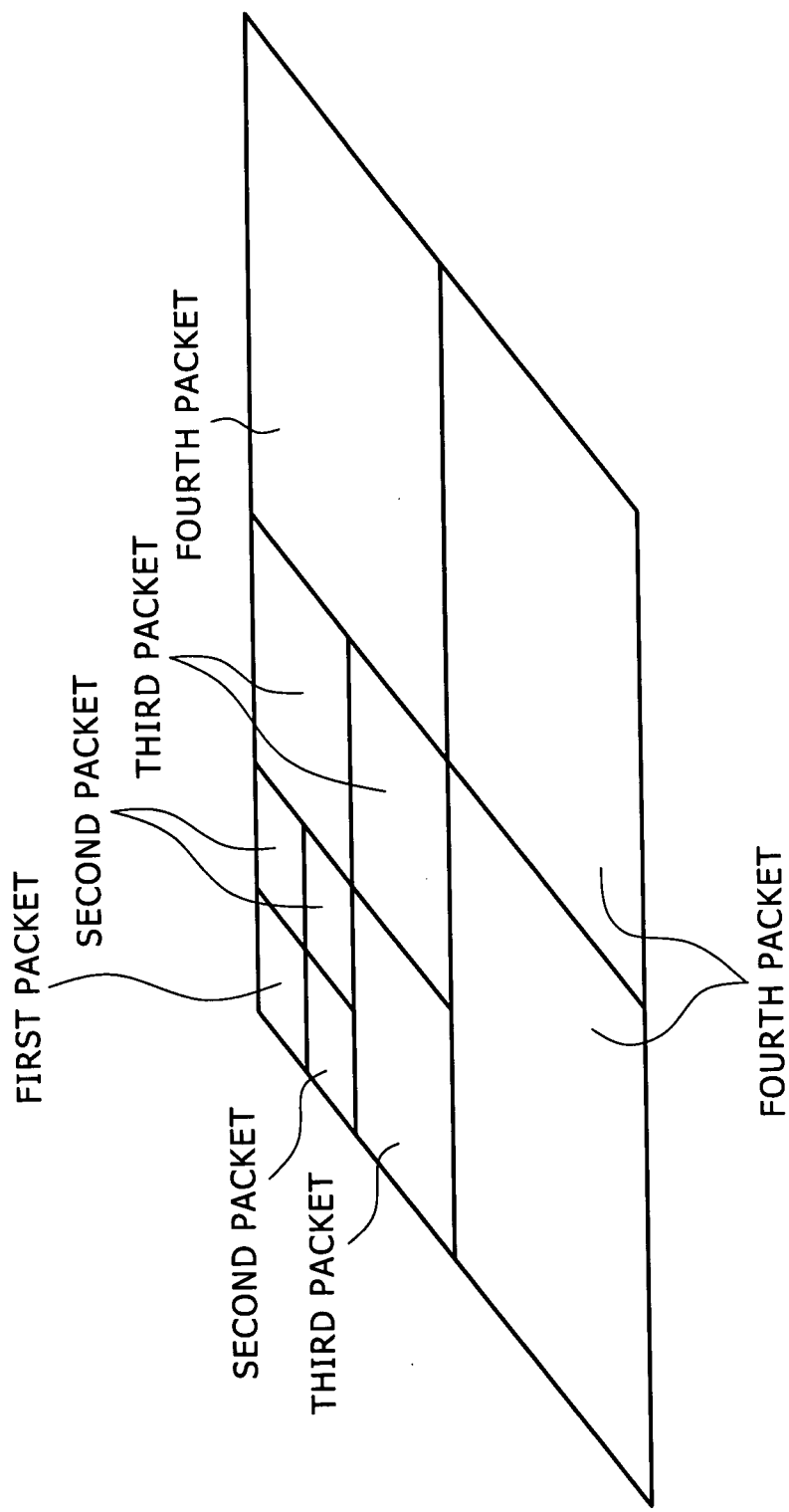
FIG. 10 is a schematic view explanatory of the concept of packets.

Under the JPEG 2000 standard, the encoded code stream when expressed is assembled into units called packets. FIG. 10 schematically shows the concept of such packets. In the example of FIG. 10, as in FIG. 4, wavelet transformation is performed three times. As shown in FIG. 10, four packets are assembled, the first packet being in the lowest pass and the fourth packet in the highest pass. The encoded code stream constituted by all code blocks that exist in the sub-bands within the individual packets is thus assembled into packets by the packet assembly portion 128. The packets assembled in this manner are output by the reversible encoding block 101.

Figure 11:
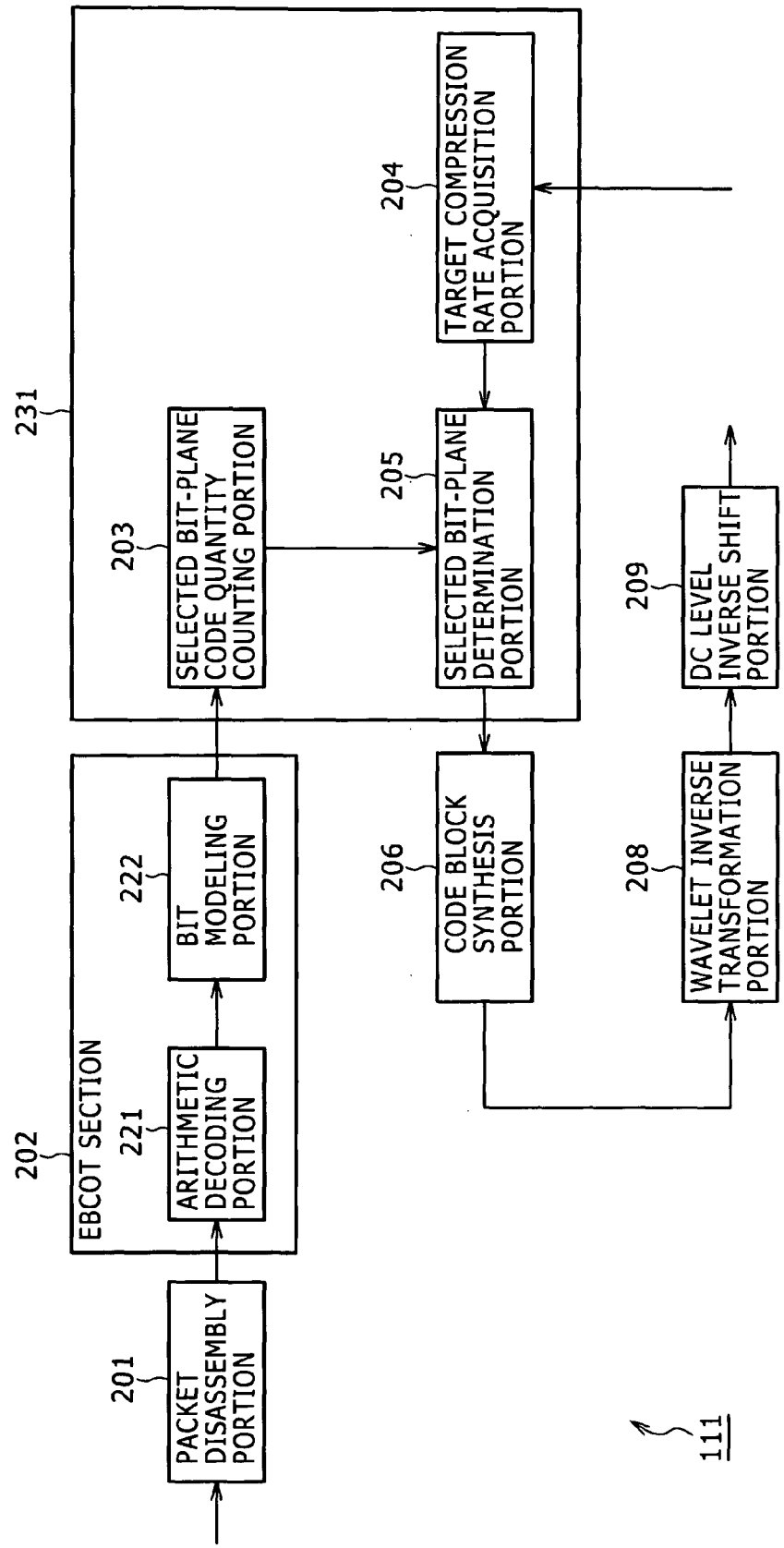
FIG. 11 is a block diagram showing a detailed structure of a partial decoding block as part of the structure in FIG. 2.

FIG. 11 is a block diagram showing a detailed structure of the partial decoding block 111 as part of the structure in FIG. 2. As indicated in FIG. 11, the partial decoding block 111 includes a packet disassembly portion 201, an EBCOT section 202, a control section 231, a code block synthesis portion 206, a wavelet inverse transformation portion 208, and a DC level inverse shift portion 209.

The packet disassembly portion 201 disassembles the packets assembled earlier by the packet assembly portion 128 in the reversible encoding block 101 into an encoded code stream, and forwards the encoded code stream thus obtained to the EBCOT section 202. The EBCOT section 202 decodes the code stream using the technique corresponding to the EBCOT section 132 in the above-described reversible encoding block 101, whereby the wavelet coefficients developed in bit-planes are generated. The EBCOT section 202 has an arithmetic decoding portion 221 and a bit modeling portion 222. The arithmetic decoding portion 221 decodes the code stream using the technique corresponding to the arithmetic encoding portion 142. The bit modeling portion 222 generates the wavelet coefficients developed into bit-planes using the technique corresponding to the bit modeling portion 141. The EBCOT section 202 feeds coefficient data about each generated bit-plane to a selected bit-plane code quantity counting portion 203 of the control section 231.

The control section 231 controls the compression rate of the picture data constituting the master picture (original picture) out of the baseband picture data generated by the decoding process. The control section 231 includes the selected bit-plane code quantity counting portion 203, a target compression rate acquisition portion 204, and a selected bit-plane determination portion 205.

The selected bit-plane code quantity counting portion 203 accumulates supplied bit-planes. From the accumulated bit-planes, the selected bit-plane code quantity counting portion 203 selects a bit-plane candidate to be forwarded selectively to downstream processing portions (for use as the result of decoding). The selected bit-plane code quantity counting portion 203 proceeds to count the code quantity of the candidate and sends the count value (code quantity information) to the selected bit-plane determination portion 205. The target compression rate acquisition portion 204 acquires a target compression rate from the irreversible encoding block 112 and supplies the obtained target compression rate to the selected bit-plane determination portion 205. As mentioned earlier, the target compression rate constitutes the baseband picture data code quantity necessary for the irreversible encoding block 112 to attain a target code quantity, in terms of the compression rate for the picture data of the master picture (original picture).

The selected bit-plane determination portion 205 calculates the compression rate of the selected bit-plane candidate with regard to the picture data of the master picture (original picture), using the code quantity of the selected bit-plane candidate supplied by the selected bit-plane code quantity counting portion 203. The selected bit-plane determination portion 205 checks to determine whether the calculated compression rate is lower than the target compression rate supplied by the target compression rate acquisition portion 204. When the target compression rate is attained, the selected bit-plane determination portion 205 acquires the selected bit-plane candidates from the selected bit-plane code quantity counting portion 203, determines these candidates definitively as the selected bit-planes, and supplies the determined candidates to the downstream code block synthesis portion 206.

As described, the selected bit-plane determination portion 205 selects some of all bit-planes resulting from the decoding of the reversibly encoded code stream in accordance with the target compression rate acquired from the irreversible encoding block 112. In subsequent processing, the selected bit-planes are used to generate the baseband picture data. In this manner, the partial decoding block 111 may generate an amount of baseband picture data that is equal to or slightly larger than the amount of data needed by the irreversible encoding block 112.

That is, the partial decoding block 111 generates the baseband picture by utilizing only part of the reversibly compressed code stream. As described above, when the partial decoding process is carried out in accordance with the target compression rate supplied by the irreversible encoding block 112, at least the amount of data needed by the irreversible encoding block 112 for its encoding process (i.e., code quantity necessary for attaining the target code quantity) is provided. This allows the irreversible encoding block 112 to generate a code stream of the code quantity equal or close to the target code quantity of irreversibly compressed data, without entailing unnecessary deterioration of picture quality. In performing the partial decoding process in the manner described above, the partial decoding block 111 has no need to generate baseband picture data of unnecessarily high picture quality. Even where the data quantity of the master picture is enormous, it is thus possible to reduce the unnecessary load of processing (i.e., for easy decoding) without unnecessarily degrading picture quality (i.e., in suitably balanced fashion).

The selected bit-plane code quantity counting portion 203 preferentially selects bit-planes of high significance as selected bit-plane candidates. Specifically, the selected bit-plane code quantity counting portion 203 selects the accumulated bit-plates one by one in descending order of significance as selected bit-plane candidates. Every time a bit-plane candidate is selected, the selected bit-plane code quantity counting portion 203 calculates the code quantity of the candidate and feeds the code quantity information to the selected bit-plane determination portion 205.

In other words, the partial decoding block 111 generates baseband picture data by decoding the data earlier the higher its significance. By carrying out the partial decoding process in this manner, the partial decoding block 111 can suitably decode data with a minimum of picture quality deterioration.

The code block synthesis portion 206 generates coefficient data in units of code blocks using the supplied bit-planes, synthesizes the generated coefficient data into coefficient data per sub-band, and supplies the synthesized coefficient data to the wavelet inverse transformation portion 208. The wavelet inverse transformation portion 208 submits the supplied wavelet coefficients to wavelet inverse transformation, thereby generating baseband picture data. The DC level inverse shift portion 209 may perform a DC level inverse shifting process as needed on the DC components of the picture data by the amount equivalent to that which was shifted earlier by the DC level shift portion 121. Following the DC level inverse shifting process, the DC level inverse shift portion 209 sends the processed picture data to the irreversible encoding block 112.

Figure 12:
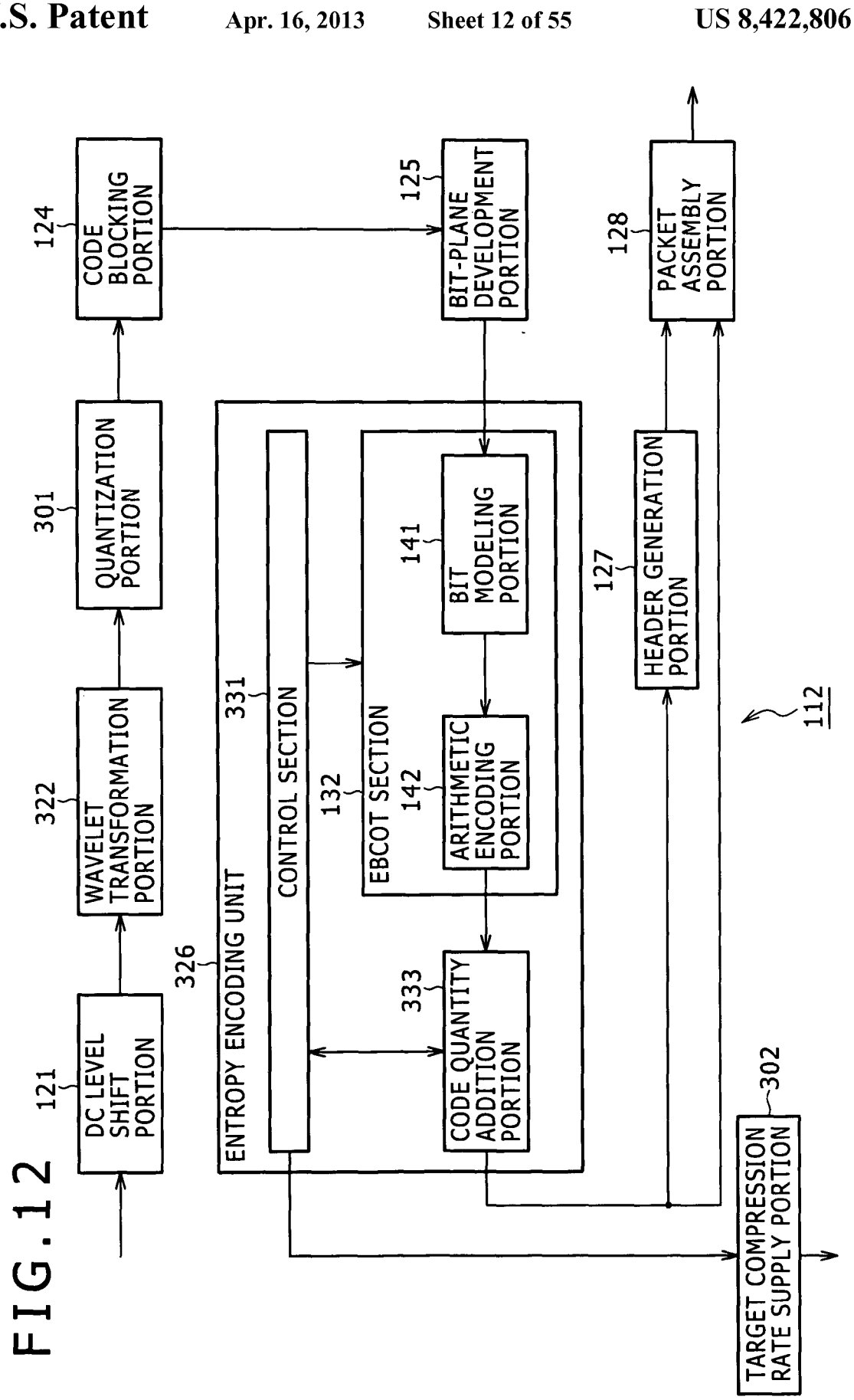
FIG. 12 is a block diagram showing a detailed structure of an irreversible encoding block as part of the structure in FIG. 2.

FIG. 12 is a block diagram showing a detailed structure of the irreversible encoding block 112 as part of the structure in FIG. 2. As shown in FIG. 12, the irreversible encoding block 112 has basically the same structure as the reversible encoding block 101 (FIG. 3), except that the wavelet transformation portion 122 is replaced by a wavelet transformation portion 322 and the entropy encoding unit 126 by an entropy encoding unit 326 and that a quantization portion 301 and a target compression rate supply portion 302 are additionally provided.

Like the wavelet transformation portion 122, the wavelet transformation portion 322 is implemented in the form of a filter bank usually made up of low-pass and high-pass filters. The wavelet transformation portion 322 possesses a buffer that buffers a sufficient amount of input picture data for filtering execution.

The wavelet transformation portion 322, like the wavelet transformation portion 122, acquires at least a minimum amount of picture data necessary for filtering execution, the picture data being output by the DC level shift portion 121. The wavelet transformation portion 322 generates wavelet coefficients by filtering the acquired picture data having undergone the DC level shift, the filtering process separating the picture data into low-pass and high-pass components in the vertical and horizontal directions of the picture.

Whereas the wavelet transformation portion 122 utilizes the 5×3 wavelet transformation filter for filtering, the wavelet transformation portion 322 uses a 9×7 wavelet transformation filter for the purpose.

The wavelet transformation portion 322 performs recursively the filtering process a predetermined number of times on the sub-bands separated as low-pass components in the vertical and horizontal directions of the picture. The wavelet coefficients acquired per sub-band through the recursive filtering process are supplied to the quantization portion 301.

The quantization portion 301 quantizes the supplied wavelet coefficients. Although quantization may be carried out by any suitable method, what has been generally adopted is scalar quantization involving division by quantization step size. The quantization portion 301 supplies the code blocking portion 124 with quantized coefficients obtained through the quantizing process. In subsequent processes, the quantized coefficients will be supplied instead of the wavelet coefficients. The quantized coefficients are treated in basically the same manner as the wavelet coefficients. For this reason, the quantized coefficients will be simply referred to as the coefficients or coefficient data in the ensuing description, and their explanations will be omitted unless deemed specifically necessary.

The entropy encoding unit 326 entropy-encodes the coefficient data supplied by the bit-plane development portion 125 after being developed thereby into bit-planes. Like the entropy encoding unit 126, the entropy encoding unit 326 includes the EBCOT section 132 and basically carries out a similar entropy encoding process. However, the entropy encoding unit 326 may or may not encode all of the supplied bit-planes; the entropy encoding unit 326 terminates its encoding process the moment a target code quantity is attained by the encoded data. That is, the entropy encoding unit 326 performs the entropy encoding process while adjusting the code quantity.

The target code quantity may be determined in advance, or may be established on the basis of suitable factors such as traffic status on the output side (and may also be varied chronologically).

As shown in FIG. 12, the entropy encoding unit 326 includes a control section 331 and a code quantity addition portion 333 besides the EBCOT section 132. The EBCOT section 132 encodes each bit-plane and supplies the resulting code word to the code quantity addition portion 333. The code quantity addition portion 333 counts the code quantity of the code word cumulatively, sends the code word to the header generation portion 127 and packet assembly portion 128, and feeds the accumulated code quantity to the control section 331. The control section 331 compares the accumulated code quantity thus supplied with the target code quantity. If the accumulated quantity is found smaller than the target code quantity, the control section 331 controls the EBCOT section 132 to encode the next bit-plane. Under control of the control section 331, the EBCOT section 132 encodes the next most significant bit-plane and sends the generated code word to the code quantity addition portion 333. The code quantity addition portion 333 counts the code word quantity cumulatively and supplies the accumulated code quantity to the control section 331.

The above process is repeated until the accumulated quantity reaches the target code quantity. When the accumulated quantity has attained the target code quantity, the control section 331 controls the EBCOT section 132 to terminate the encoding process.

The control section 331 controls the EBCOT section 132 based on the accumulated code quantity calculated by the code quantity addition portion 333 as described above. With the EBCOT section 132 under control of the control section 331, the entropy encoding unit 326 performs its entropy encoding process while suitably adjusting the code quantity.

The target compression rate supply portion 302 supplies the partial decoding block 111 (target compression rate acquisition portion 204) with the target compression rate calculated based on the target code quantity set by the control section 331 and on the data quantity of the master picture. The partial decoding block 111 performs its decoding process in keeping with the target compression rate so that even if the master picture has a huge data quantity, any unnecessary increase in the processing load can be suitably suppressed.

The significance of coefficients will now be explained. In the encoding apparatus 100, the reversible encoding block 101, partial decoding block 111 and irreversible encoding block 112 encode or decode coefficient bits basically in descending order of significance. This is a distinct departure from ordinary rate control methods utilizing the RD (rate-distortion) characteristic.

Figure 13:
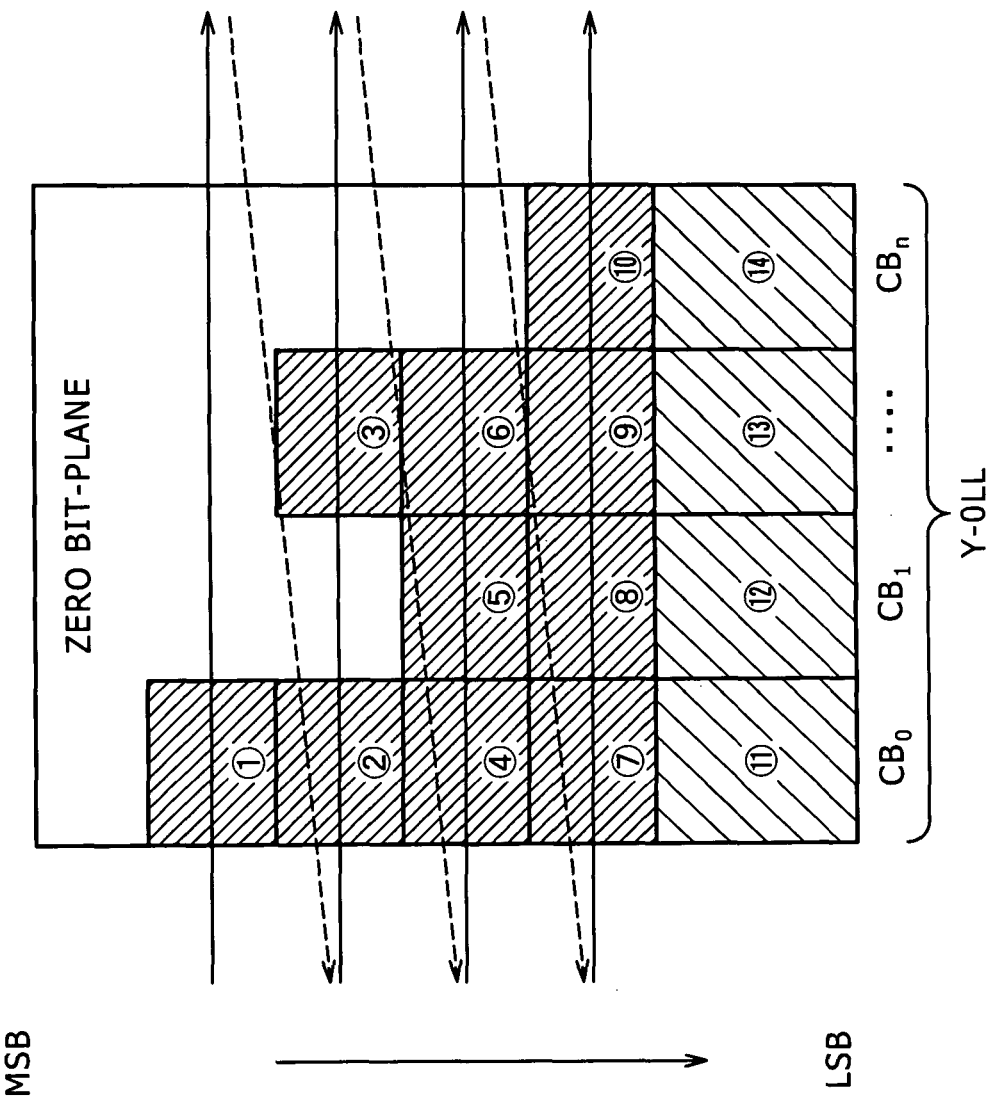
FIG. 13 is a schematic view explanatory of a typical sequence in which each sub-band is scanned.

FIG. 13 is a schematic view explanatory of a typical sequence in which a sub-band Y-0LL is encoded (or decoded). In the sub-band notation Y-0LL, "Y" stands for brightness and "0LL" for the lowest pass. The notation Y-0LL indicates that there exist as many as (n+1) code blocks ranging from a code block $CB_0$ to a code block $CB_n$. The shaded portions in FIG. 13 represent a group of bit-planes in each code block.

In the sub-band, as shown in FIG. 13, the EBCOT section 132 and EBCOT section 202 encode or decode the bit-planes in each of the code blocks in order of descending priorities, starting from the code block of the highest priority down to the code block of the lowest priority. In FIG. 13, the code block $CB_0$ is the code block of the highest priority (i.e., most significant code block), and the code block $CB_n$ denotes the code block of the lowest priority (least significant code block). Since the bits of each bit-plane are encoded or decoded in descending order of significance (i.e., from MSB to LSB), the encoding or decoding sequence in the sub-band Y-0LL in the example of FIG. 13 takes place as indicated by arrows.

Because the zero bit-plane that has only zero coefficient is not processed in practice, the bit-planes are processed in ascending order of their numbers in FIG. 13 (from (1) to (14)). Whereas these numbers are shown encircled in FIG. 13, the numbers are given in parentheses in this specification. The first bit-plane to undergo EBCOT is the bit-plane number (1) having the highest bit position. In this bit position, there exists only the bit-plane (1) subject to EBCOT. Then the next bit position is reached (as indicated by dotted line in FIG. 13). In the next bit position, the bit-planes (2) and (3) are subject to EBCOT.

How the quantity of data is adjusted will now be described.

In the case of the entropy encoding unit 326 in the irreversible encoding block 112, the above-mentioned scanning process is carried out repeatedly to add up the code quantity generated by the EBCOT process performed on each bit-plane as described above. When the accumulated code quantity has reached the target code quantity, the EBCOT process is terminated. Suppose that in the example of FIG. 13, the target code quantity is attained when the bit-plane (9) is encoded. In such a case, the control section 331 causes the EBCOT section 132 to terminate its encoding process at that point. In this case, the bit-plane (10) located in the same bit position as the bit-plane (9) will not be included in the encoded code stream output by the entropy encoding unit 326 (irreversible encoding block 112).

The reversible encoding block 101, by contrast, performs the same scanning process to encode all bit-planes (1) through (14). That means the reversibly compressed file output by the reversible encoding block 101 includes all bit-planes (1) through (14).

In the case of the partial decoding block 111, the EBCOT section 202 decodes the supplied code word in the same sequence as that of the scanning process. The selected bit-plane code quantity counting portion 203 takes one by one the bit-planes output by the EBCOT section 202 as a selected bit-plane candidate and counts the code quantity of each candidate. That is, the code quantity of each of the bit-planes (1) through (14) is counted successively in that order. Based on the code quantity supplied by the selected bit-plane code quantity counting portion 203, the selected bit-plane determination portion 205 calculates the compression rate of the selected bit-plane candidate with regard to the picture data of the master picture (original picture). The selected bit-plane determination portion 205 proceeds to compare the calculated compression rate with the target compression rate sent from the target compression rate acquisition portion 204.

When the compression rate of the selected bit-plane candidate has attained the target compression rate (e.g., when the expressions given below hold for the example of FIG. 12), the selected bit-plane determination portion 205 determines the selected bit-plane candidate definitively as the selected bit-plane. The expressions that should hold are as follows:

(target compression rate)≦(total sum of code quantities of bit-planes(1)through(9))/(data size of master picture)

(target compression rate)≧(total sum of code quantities of bit-planes(1)through(10))/(data size of master picture)

In the manner described above, the control section 231 of the partial decoding block 111 adjusts the data quantity of decoded data.

The reversible encoding block 101, partial decoding block 111, and irreversible encoding block 112 first encode or decode the coefficient data or code words in descending order of significance. The partial decoding block 111 and irreversible encoding block 112 then process or truncate the resulting data selectively in descending order of significance so as to adjust the data quantity.

The preceding paragraphs explained the method for scanning within a single sub-band. In this case, the sub-bands making up the entire picture are processed on a one-by-one basis in a predetermined sequence (i.e., one sub-band at a time).

Figure 14:
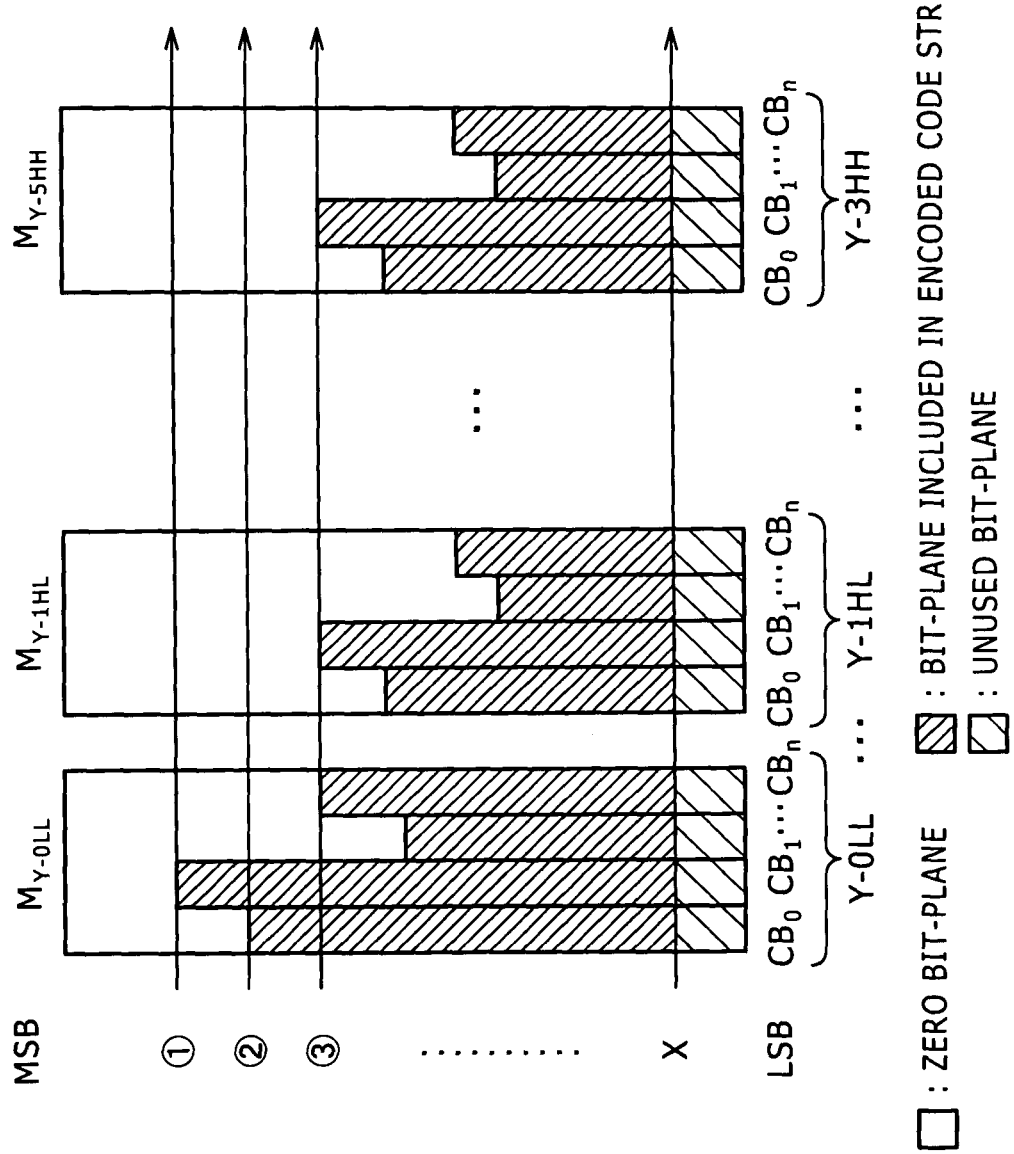
FIG. 14 is a schematic view explanatory of a typical sequence in which components are scanned.

The scanning sequence for encoding and decoding is not limited to what has been discussed above. Alternatively, the picture may be scanned component by component, as illustrated in FIG. 14. FIG. 14 shows how each bit position is scanned throughout all sub-bands of the Y component (i.e., brightness component).

Figure 15:
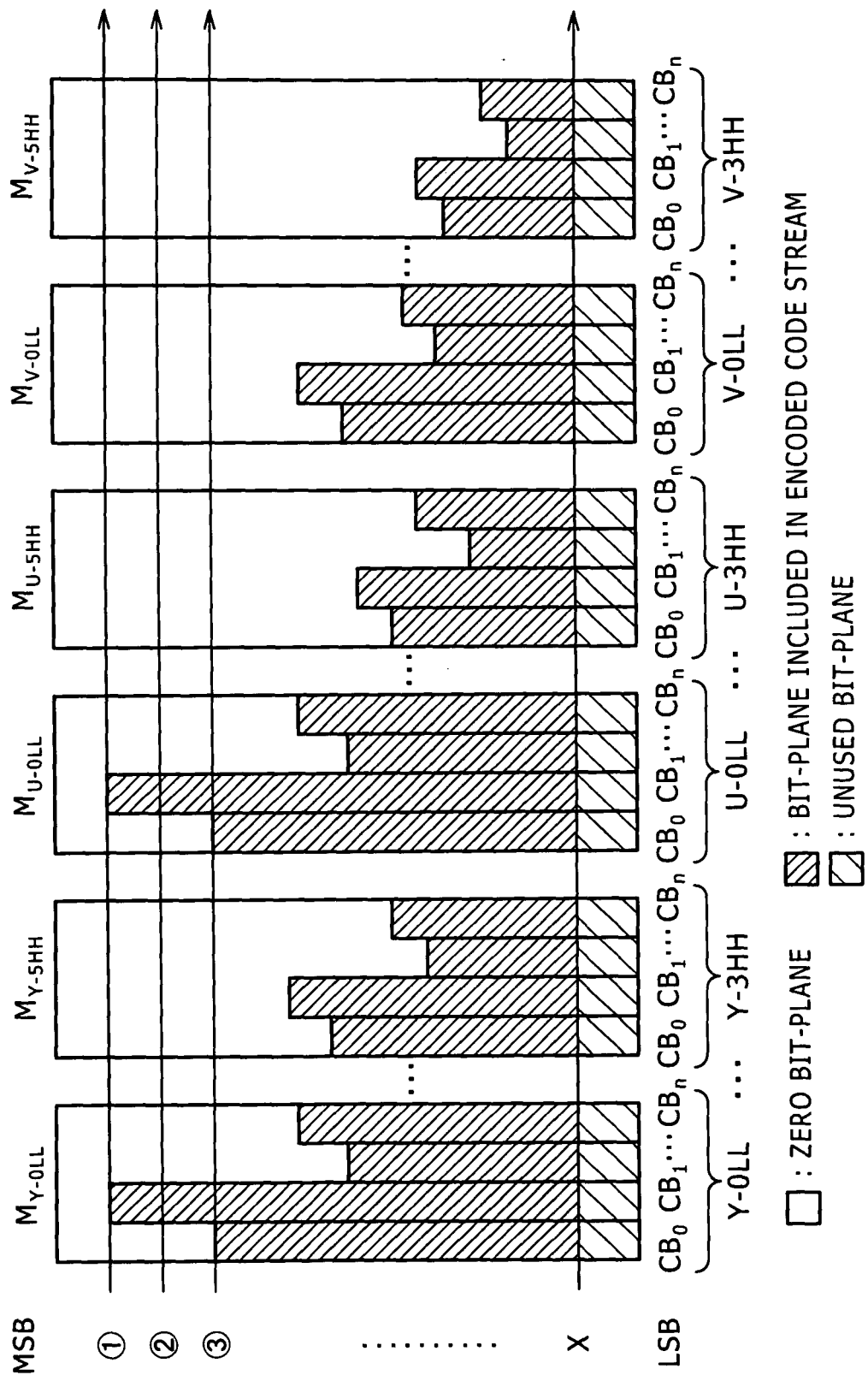
FIG. 15 is a schematic view explanatory of a typical sequence in which an entire picture is scanned.

In the example of FIG. 14, the sub-bands involved are arrayed in order of significance (from low pass (0LL) to high pass (3HH) in this case). Within each sub-band, the code blocks are arrayed also in order of significance (from $CB_0$ to $CB_n$ in this case). The bit-planes arrayed in this manner are processed per bit position, starting from the MSB position down to the LSB position as indicated by arrows. It follows that in this example, the bit-planes are processed in a third scanning pass regarding not only Y-0LL but also Y-1HL and Y-3HH.

Where the picture is made up of a plurality of components, all components may be scanned as depicted in FIG. 15. FIG. 15 shows how the Y, U and V components are all scanned per bit position.

In the example of FIG. 15, the Y component (brightness component), U component (color different component), and V component (color difference component) are arrayed in order of significance (from the Y component to the U component, followed by the V component in this case). Within each component, the sub-bands are arrayed in order of significance (from low pass (0LL) to high pass (3HH) in this case). Within each sub-band, the code blocks are arrayed also in order of significance (from $CB_0$ to $CB_n$ in this case). The bit-planes arrayed in this manner are processed per bit position, starting from the MSB position down to the LSB position as indicated by arrows. It follows that in this example, the bit-planes are processed in a first scanning pass regarding not only Y-0LL but also U-0LL.

More specifically, the EBCOT section 132 initially scans all code-blocks within all sub-bands (from 0LL to 3HH) of the Y component in the bit position in which a bit-plane other than zero bit-plane exists and which is closest to the MSB. If a bit-plane other than zero bit-plane is found to exist, that bit-plane is encoded. The EBCOT section 132 then scans all code blocks within all sub-bands (from 0LL to 3HH) of the U component in the same bit position. If a bit-plane other than zero bit-plane is found to exist, that bit-plane is encoded. Furthermore, the EBCOT section 132 scans all code blocks within all sub-bands (from 0LL to 3HH) of the V component in the same bit position. If a bit-plane other than zero bit-plane is found to exist, that bit-plane is encoded.

On completing scanning up to V-3HH, the EBCOT section 132 moves one bit position lower. The EBCOT section 132 then continues its scanning process in the same sequence as described above in that bit position.

It was explained above in reference to FIG. 14 that each bit position is scanned component by component. If the picture is made up of a plurality of components, then the components are scanned in descending order of significance. For example, where the picture is constituted by the Y component, U component, and V component as in the example of FIG. 15 and the order of significance descends in this order, the most significant Y component is first processed, followed by the U component which in turn is followed by the least significant V component.

Figure 16:
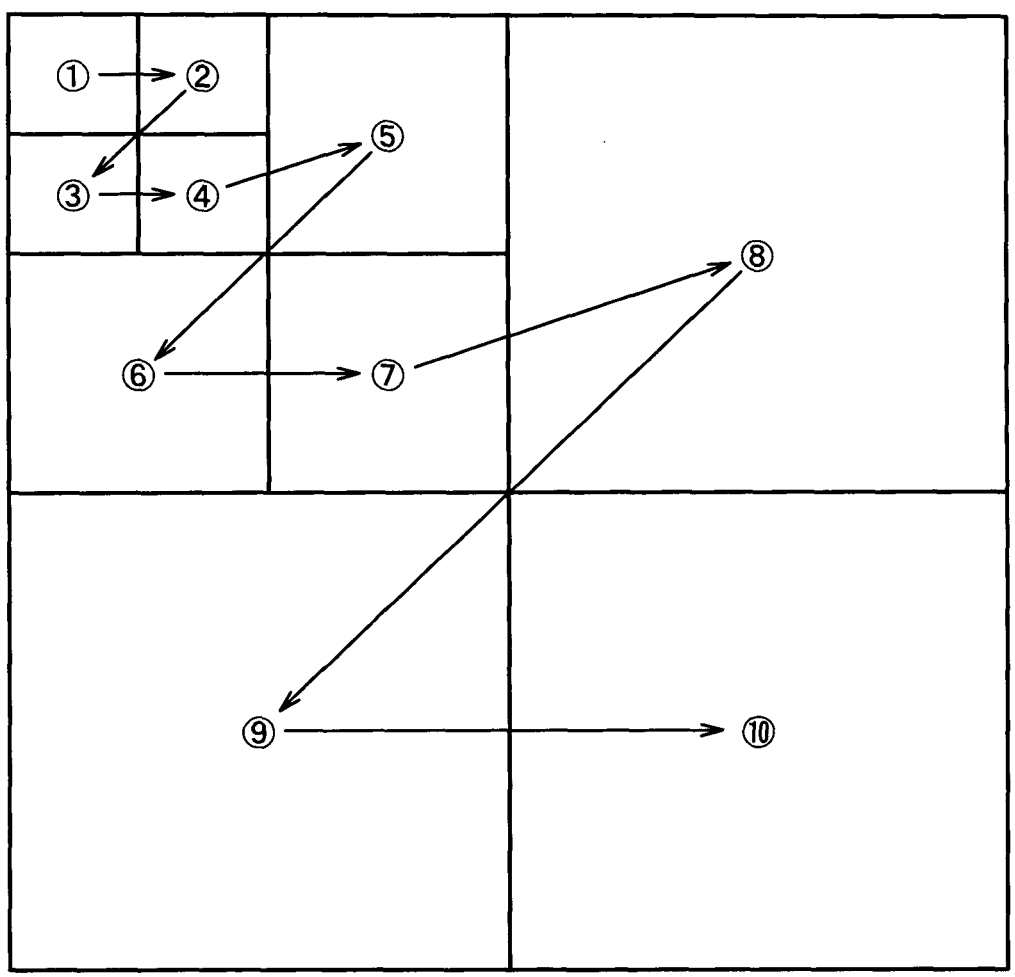
FIG. 16 is a schematic view explanatory of a typical sequence in which blocks are processed individually.

It was explained above in reference to FIG. 13 that each bit position is scanned sub-band by sub-band. In this case, the sub-bands are scanned in descending order of significance. In the example of FIG. 14 where the picture is made up of the sub-bands 0LL through 3HH which are significant in descending order, the most significant sub-band 0LL is first processed, followed by the next most significant sub-band 1LH, and so on. The least significant sub-band 3HH is last processed. Illustratively, the sub-bands are processed in a predetermined sequence such as done depicted in FIG. 16.

The scanning sequence is determined in advance. That is, the significance of each of the bit-planes involved is predetermined and is recognized commonly by the reversible encoding block 101, partial decoding block 111, and irreversible encoding block 112.

Typical flows of the encoding and decoding processes discussed above will now be explained.

Figure 17:
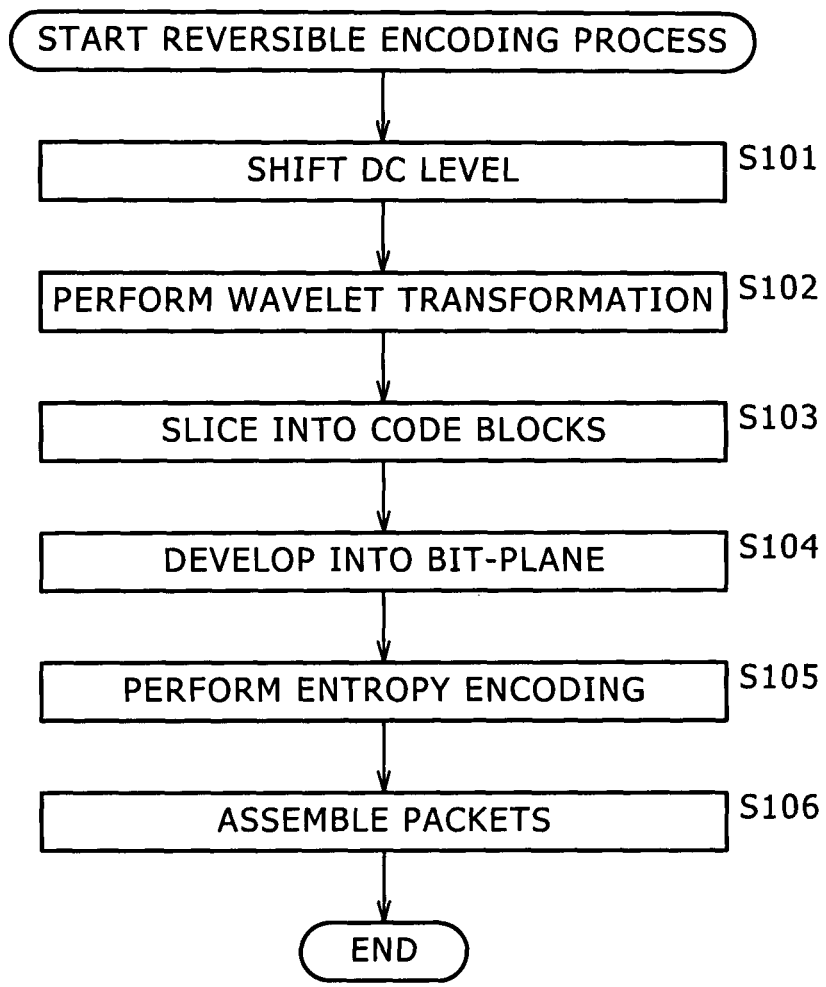
FIG. 17 is a flowchart of steps constituting a reversible encoding process.

A typical flow of the reversible encoding process performed by the reversible encoding block 101 is first described below in reference to the flowchart of FIG. 17.

When the reversible encoding process is started, the DC level shift portion 121 goes to step S101 and shifts DC levels of the input picture data. In step S102, the wavelet transformation portion 122 submits the picture data to wavelet transformation. In step S103, the code blocking portion 124 slices the weighted wavelet coefficients in units of code blocks. In step S104, the bit-plane development portion 125 develops the coefficient data into bit-planes per code block. In step S105, the entropy encoding unit 126 entropy-encodes the bit-planes in descending order of significance. In step S106, the header generation portion 127 and packet assembly portion 128 assemble the encoded code word into packets, and bring the reversible encoding process to an end.

Figure 18:
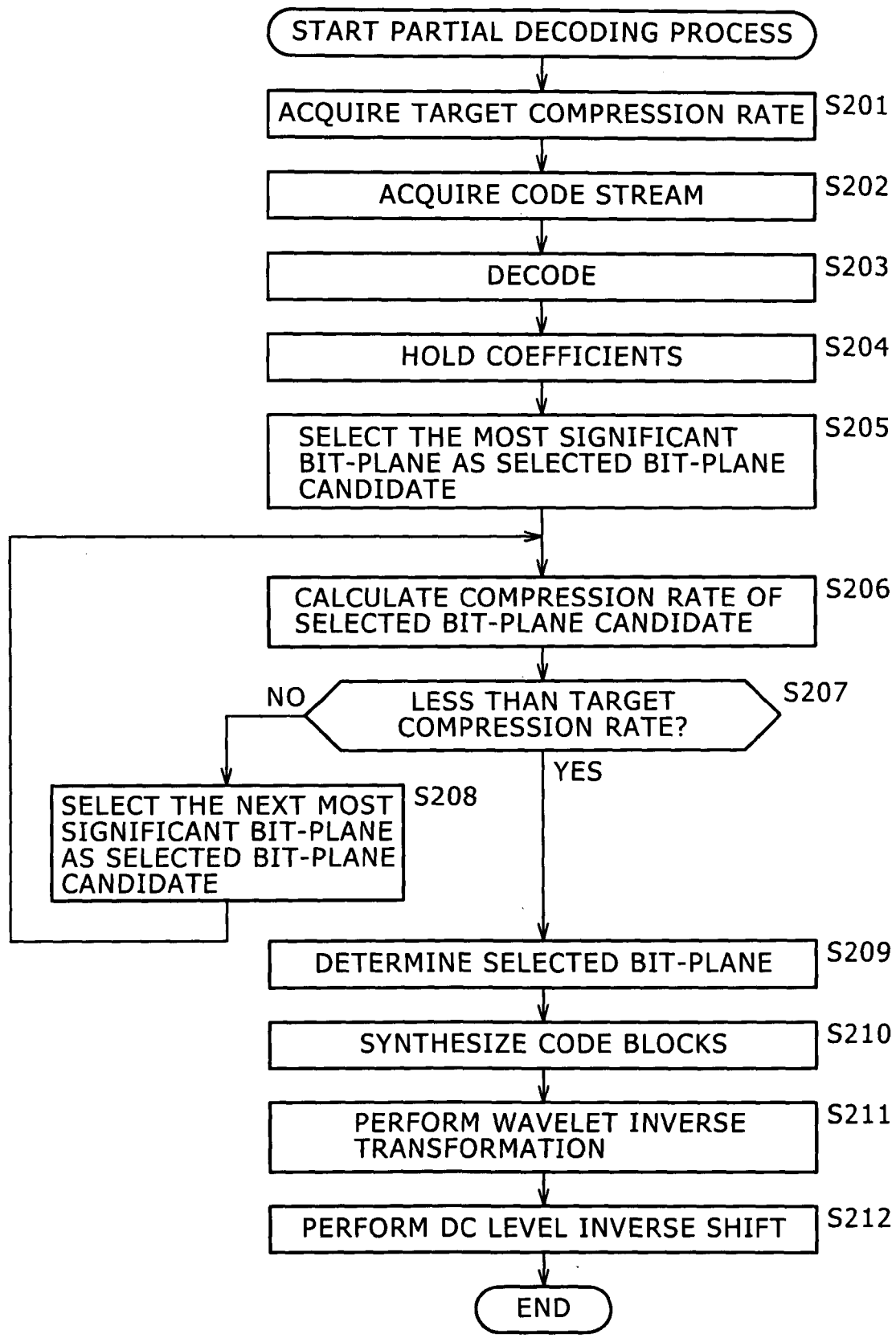
FIG. 18 is a flowchart of steps constituting a partial decoding process.

Described below in reference to the flowchart of FIG. 18 is a typical flow of the partial decoding process carried out by the partial decoding block 111.

When the partial decoding process is started, the target compression rate acquisition portion 204 goes to step S201 and acquires a target compression rate from the irreversible encoding block 112. In step S202, the packet disassembly portion 201 acquires a code stream by disassembling the packets of the irreversibly compressed file that has been input. In step S203, the EBCOT section 202 decodes the code stream. In step S204, the selected bit-plane code quantity counting portion 203 holds the coefficients (bit-planes) acquired by the decoding process. In step S205, the selected bit-plane code quantity counting portion 203 selects the most significant bit-plane of the bit-planes being held as a selected bit-plane candidate, and calculates the code quantity of the candidate. In step S206, the selected bit-plane determination portion 205 calculates the compression rate of the selected bit-plane candidate with regard to the picture data of the master picture (original picture) on the basis of the code quantity counted by the selected bit-plane code quantity counting portion 203. In step S207, the selected bit-plane determination portion 205 checks to determine whether the calculated compression rate is lower than the target compression rate acquired in step S201.

If the compression rate of the selected bit-plane candidate is found to be higher than the target compression rate (i.e., if the code quantity of the selected bit-plane candidate is sufficiently small), then the selected bit-plane determination portion 205 goes to step S208. In step S208, the selected bit-plane code quantity counting portion 203 selects the next most significant bit-plane of the bit-planes being held as a selected bit-plane candidate, calculates the code quantity of the candidate, and returns to step S206 to repeat the subsequent steps. That is, the control section 231 (selected bit-plane code quantity counting portion 203 and selected bit-plane determination portion 205) repeats steps S206 through S208 until the compression rate of the selected bit-plane candidate becomes lower than the target compression rate, thereby increasing the code quantity of the selected bit-plane candidates.

If in step S207 the compression rate of the selected bit-plane candidate is found to be lower than the target compression rate, then the selected bit-plane determination portion 205 goes to step S209 to determine the selected bit-plane. In step S210, the code block synthesis portion 206 synthesizes code blocks using the selected bit-plane. In step S211, the wavelet inverse transformation portion 208 subjects the coefficient data to wavelet inverse transformation. In step S212, the DC level inverse shift portion 209 performs DC level inverse shifts of the picture data and terminates the partial decoding process.

Figure 19:
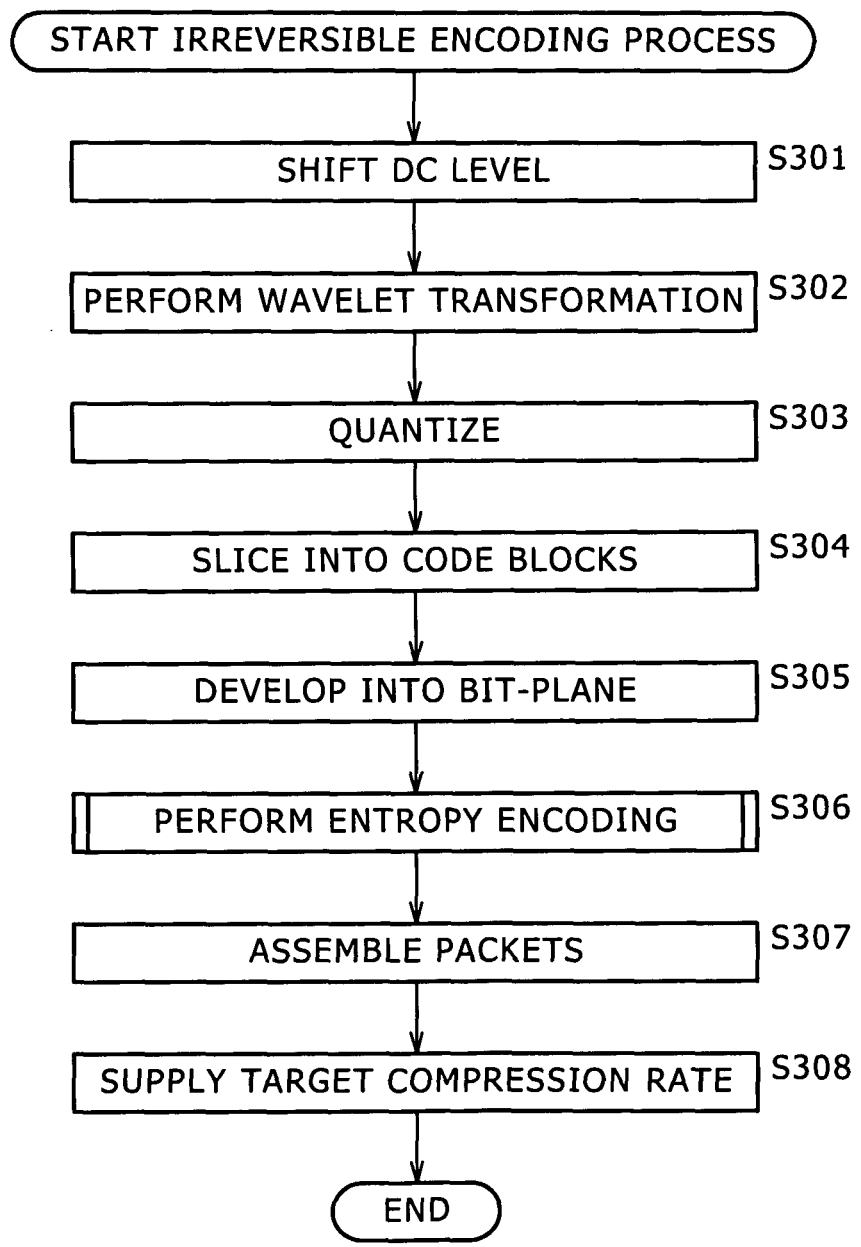
FIG. 19 is a flowchart of steps constituting an irreversible encoding process.

Described below in reference to the flowchart of FIG. 19 is a typical flow of the irreversible encoding process.

When the irreversible encoding process is started, the DC level shift portion 121 goes to step S301 and shifts DC levels of the input picture data. In step S302, the wavelet transformation portion 322 subjects the picture data to wavelet transformation. In step S303, the quantization portion 301 quantizes the wavelet coefficients. In step S304, the code blocking portion 124 slices the quantized coefficients in units of code blocks.

In step S305, the bit-plane development portion 125 develops the coefficient data of each code block into bit-planes per code block. In step S306, the entropy encoding unit 326 entropy-encodes each of the bit-planes in descending order of significance. The entropy encoding process will be discussed later in detail. In step S307, the header generation portion 127 and packet assembly portion 128 assemble the encoded code word into packets. In step S308, the target compression rate supply portion 302 supplies the partial decoding block 111 with the target compression rate corresponding to the target code quantity established by the entropy encoding unit 326, and brings the irreversible encoding process to an end.

Figure 20:
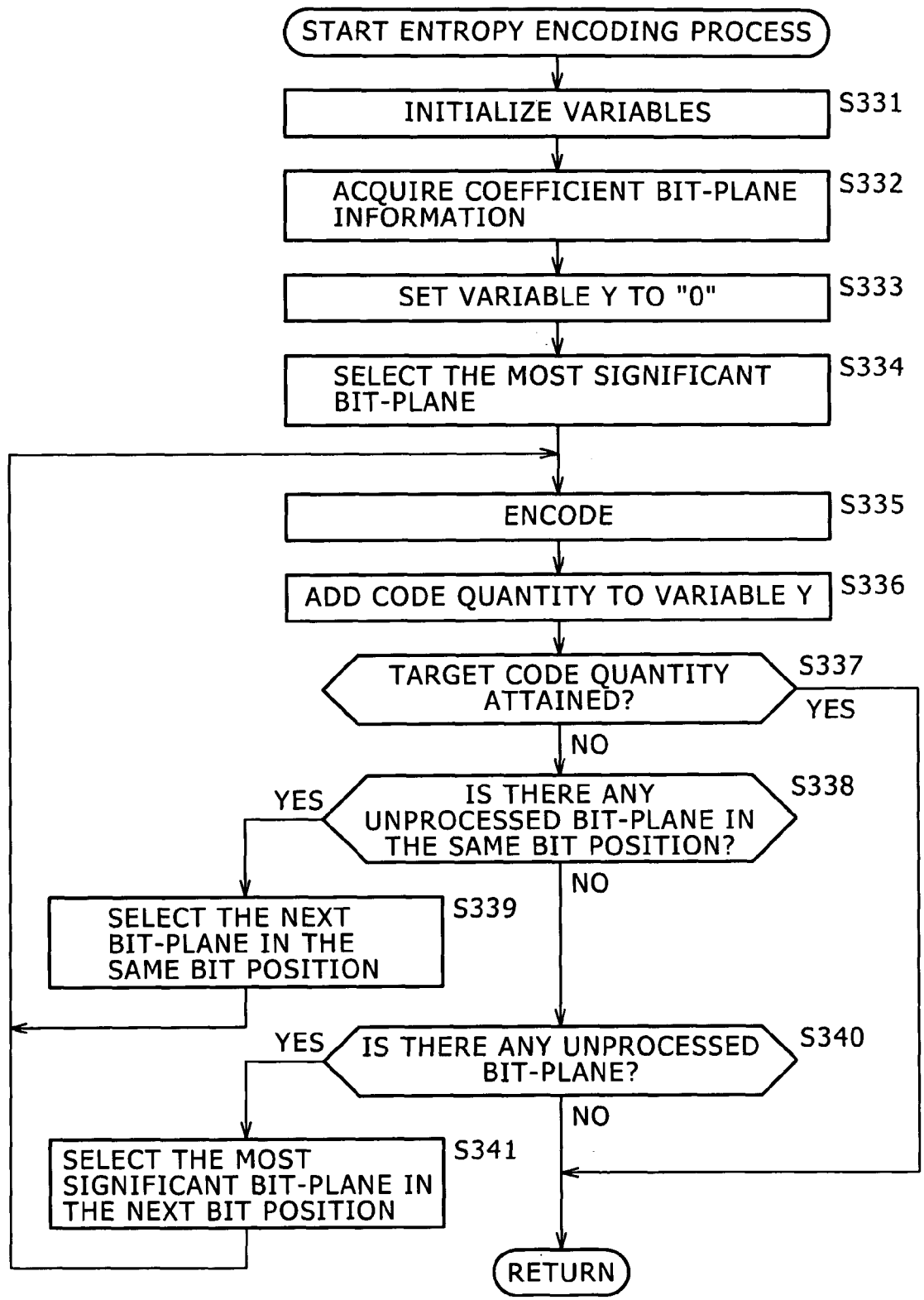
FIG. 20 is a flowchart of steps constituting an entropy encoding process.

Described below in reference to the flowchart of FIG. 20 is a typical detailed flow of the entropy encoding process performed in step S306 of FIG. 19.

When the entropy encoding process is started, the control section 331 goes to step S331 and initializes variables. Illustratively, the variables include encode-bound components $N_C=\{(1, 2, \ldots, L_C)$, sub-bands $N_S=\{1, 2, \ldots, L_S\}$, code blocks B, bit-planes C, a code quantity T (B, C, $N_C$, $N_S$), and a cumulatively added code quantity Y.

In step S332, the EBCOT section 132 acquires coefficient bit-plane information (including zero bit-plane information). In step S333, the control section 331 sets the variable Y to 0. In step S334, the EBCOT section 132 selects the most significant bit-plane.

In step S335, the EBCOT section 132 encodes the selected bit-plane. In step S336, the code quantity addition portion 333 calculates the code quantity T (B, C, $N_C$, $N_S$) of the code word, and adds the calculated code quantity T (B, C, $N_C$, $N_S$) to the variable Y. The operation involved is:

$$Y=Y+T(B,C,N_C,N_S)$$

In step S337, the control section 331 references the variable Y to see if the cumulative value of the encoded code quantity has reached the target code quantity. If the value (cumulative value) of the variable Y is not found to have reached the target code quantity, the control section 331 goes to step S338.

In step S338, the EBCOT section 132 checks to determine whether any unprocessed bit-plane still exists in the same bit position. If such an unprocessed bit-plane is found to exist, the EBCOT section 132 goes to step S339 and selects the next most significant bit-plane in the same bit position. After selecting the bit-plane, the EBCOT section 132 returns to step S335 and repeats the subsequent steps.

If in step S338 no unprocessed bit-plane is found to exist in the same bit position, the EBCOT section 132 goes to step S340. In step S340, the EBCOT section 132 checks to determine whether there still exists any unprocessed bit-plane. If such a bit-plane is found to exist, the EBCOT section 132 goes to step S341. In step S341, the EBCOT section 132 selects the most significant bit-plane in the next bit position. After step S341, the EBCOT section 132 returns to step S335 and repeats the subsequent steps.

If in step S337 the value (cumulative value) of the variable Y is found to have reached the target code quantity, the control section 331 terminates the entropy encoding process, returns to step S306 of FIG. 19, and allows step S307 and the subsequent steps to proceed. If in step S340 no unprocessed bit-plane is found to exist, the EBCOT section 132 brings the entropy encoding process to and end, returns to step S306 of FIG. 19, and allows step S307 and the subsequent steps to proceed.

The table of FIG. 21 lists the results obtained from experimenting on actual pictures with the above-described procedures. The conditions for the experiments were as follows:
  Original picture data: 4,096×2,160 pixels×10 bits×3 (RGB)×24 fps=6,370 Mbps
  Test sequence: Movie
  Reversibly compressed results (JPEG reversible mode): 3,469 Mbps (about 54% of the original picture)
  Decoded picture: picture obtained by decoding irreversibly encoded code streams using an ordinary JPEG 2000 irreversible decoder
  Bit rate following irreversible encoding: 250 Mbps The table of FIG. 21 shows relations between bit rates and PSNR (peak signal-to-noise ratios in dB) in effect during partial decoding.

As shown in FIG. 21, when the bit rate for partial decoding is gradually lowered from the reversible bit rate (3,469 Mbps), the cycle count of the CPU is reduced correspondingly. That is, the lower the bit rate for partial decoding, the lower the load of the decoding process.

At the same time, the lower the bit rate for partial decoding, the lower the PSNR of the decoded picture of the irreversibly encoded file. That is, the picture quality of the decoded picture in the irreversibly encoded file is degraded.

Between the case where the bit rate for partial decoding remains at the reversible rate of 3,469 and the case where the bit rate is set to 250 Mbps, the same bit rate as that for the downstream irreversible encoding process, there is very little difference in terms of PSNR for the decoded picture of the irreversibly encoded file (i.e., 36.89−37.38=0.49 [dB]). By contrast, the CPU cycle count is reduced by about nine-tenths between the above two cases (i.e., 771/7105=0.108). The CPU cycle count for the downstream irreversible encoding process (250 Mbps) stays constant (at 907 cycles) regardless of changes in the upstream bit rate for the decoded picture.

As described, the partial decoding block 111 can reduce the load incurred during decoding of the reversibly compressed file while minimizing picture quality degradation. In other words, the irreversible transcoding unit 102 can transform the reversibly compressed file into the irreversibly compressed file easily and appropriately. That means the encoding apparatus 100 can encode picture data simply and properly even where the master picture has a huge data size.

Figure 22:
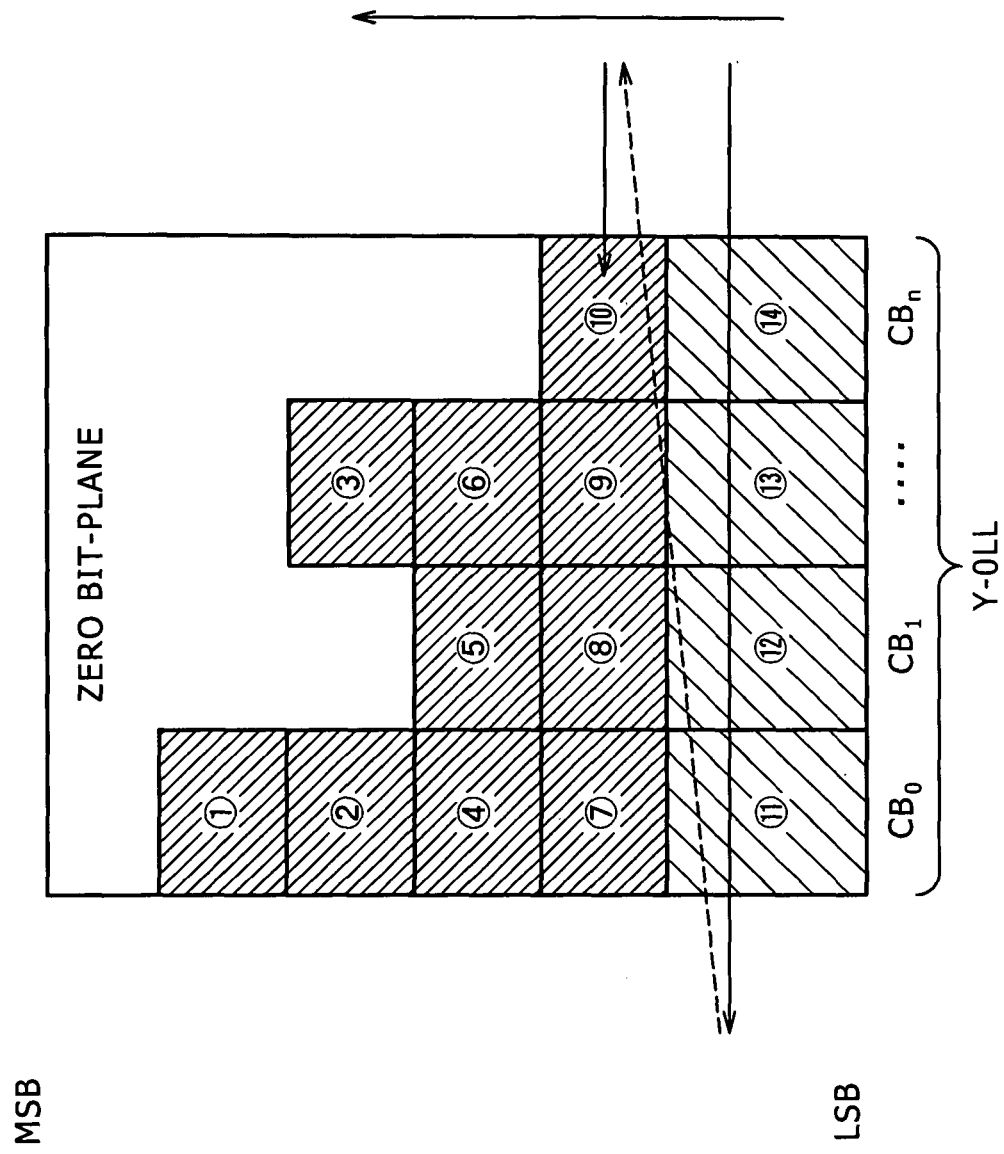
FIG. 22 is a schematic view explanatory of a typical sequence in which the bit-planes to be truncated are scanned for selection.

The foregoing paragraphs explained that the partial decoding block 111 selects the bit-planes to be used in the decoded picture. Alternatively, since the data size of the master picture (original picture) is known in advance, the bit-planes to be truncated (i.e., bit-planes other than the selected bit-planes) may be selected as shown in FIG. 22. In this case, the partial decoding block 111 selects the bit-planes to be truncated (called the truncated bit-planes hereunder) in ascending order of significance.

FIG. 22 is a schematic view explanatory of a typical sequence in which the bit-planes to be truncated are scanned for selection. The selecting sequence is indicated by arrows in FIG. 22. In the example of FIG. 22, truncated bit-planes are selected starting from the LSB position down to the MSB position. A bit-plane (14) is initially selected, followed by a bit-plane (13). After all bit-planes in the LSB position have been selected, the least significant bit-plane one bit position higher (i.e., bit-plane (10)) is selected, and the scanning is continued in like manner.

The partial decoding block 111 adds up the code quantities of the truncated bit-planes selected as described above, and subtracts the obtained quantities from the data size of the picture data making up the master picture (original picture). This allows the partial decoding block 111 to calculate the code quantity of the bit-planes not to be truncated (i.e., selected bit-planes)(as well as the compression rate with regard to the picture data of the master picture (original picture)). That is, the partial decoding block 111 in this case can also control the data quantity in the same manner as when setting aside the selected bit-planes.

Figure 23:
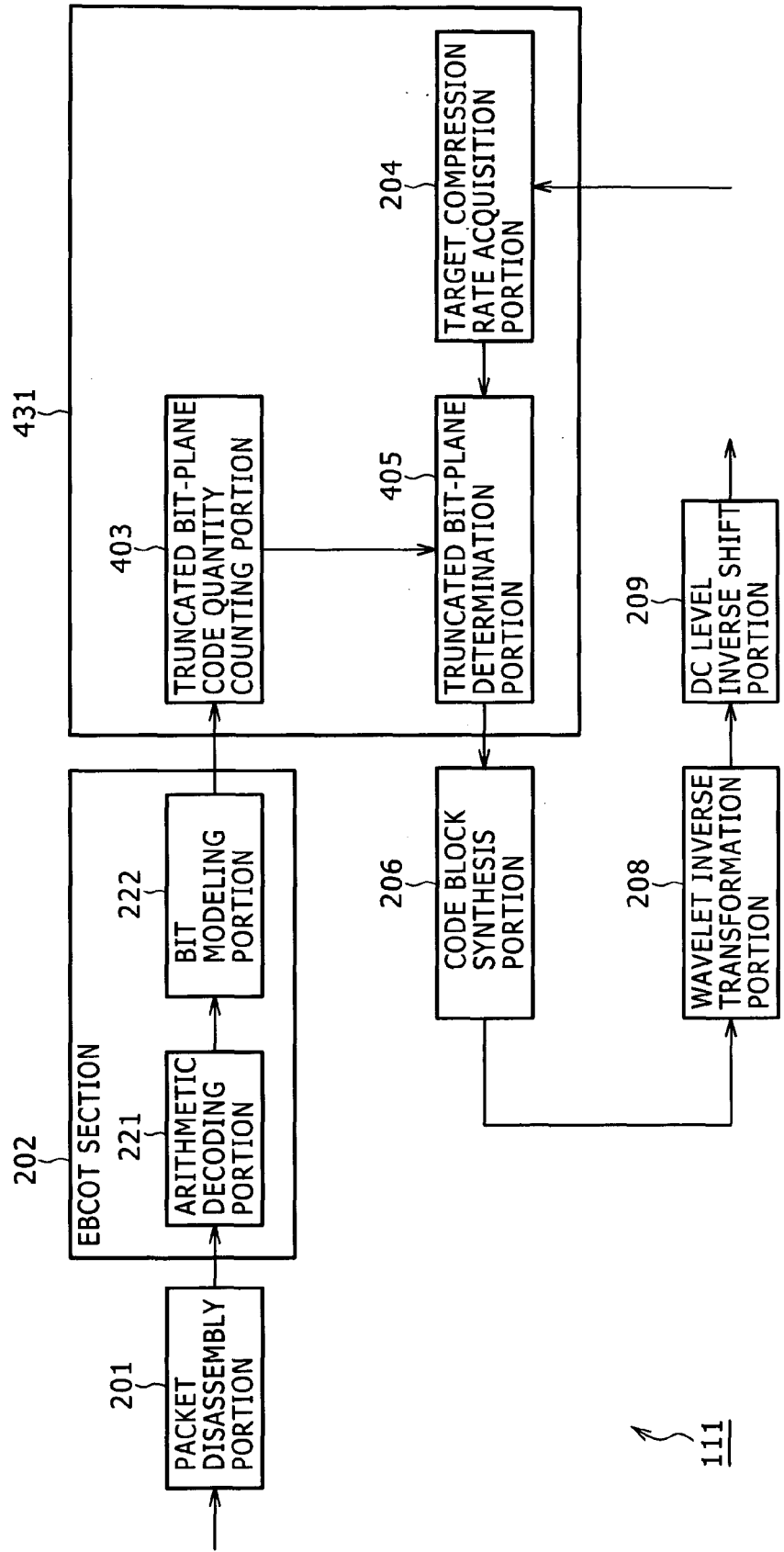
FIG. 23 is a block diagram showing another detailed structure of the partial decoding block as part of the structure in FIG. 2.

FIG. 23 is a block diagram showing a detailed structure of the partial decoding block 111 involved in the above-described process. The block diagram of FIG. 23 corresponds to that of FIG. 11. As shown in FIG. 23, the partial decoding block 111 has basically the same structure as its counterpart in FIG. 11, except that a control section 431 in the partial decoding block 111 of FIG. 23 replaces the control section 231 in FIG. 11.

The control section 431 controls the compression rate of the baseband picture data generated by the decoding process with regard to the picture data of the master picture (original picture). The control section 431 includes a truncated bit-plane code quantity counting portion 403, a target compression rate acquisition portion 204, and a truncated bit-plane determination portion 405.

The truncated bit-plane code quantity counting portion 403 accumulates the bit-planes being supplied by the EBCOT section 202, selects truncated bit-plane candidates one by one in ascending order of significance, counts the code quantity of each truncated bit-plane candidate thus selected, and feeds the count value to the truncated bit-plane determination portion 405.

Based on the code quantity supplied by the truncated bit-plane code quantity counting portion 403, the truncated bit-plane determination portion 405 calculates the compression rate of the bit-planes not to be truncated (i.e., selected bit-planes) with regard to the picture data of the master picture (original picture). The truncated bit-plane determination portion 405 compares the compression rate with the target compression rate acquired by the target compression rate acquisition portion 204, so as to see if the expressions given below are met. If the expressions are found to be met, then the truncated bit-plane determination portion 405 determines the truncated bit-plane candidates definitively as the truncated bit-planes and truncates the candidates accordingly (the remaining bit-planes are forwarded as the selected bit-planes to downstream processing portions). The expressions to be met are as follows:

(target compression rate)≦(reversibly compressed code quantity−total sum of code quantities of bit-planes(14)through(11))/(data size of master picture)

(target compression rate)≧(reversibly compressed code quantity−total sum of code quantities of bit-planes(14)through(10))/(data size of master picture)

The example of FIG. 22 shows that the selection starts from the bit-plane (14) and proceeds up to the bit-plane (10). At this point, the compression rate for the bit-planes not to be truncated (called the remaining bit-planes hereunder) is seen having dropped below the target compression rate.

The truncated bit-plane determination portion 405 determines the remaining bit-planes as the selected bit-planes and feeds them to the code block synthesis portion 206.

A typical flow of the partial decoding process in the preceding case is explained below in reference to the flowchart of FIG. 24. The flowchart of FIG. 24 corresponds to that of FIG. 18.

Figure 24:
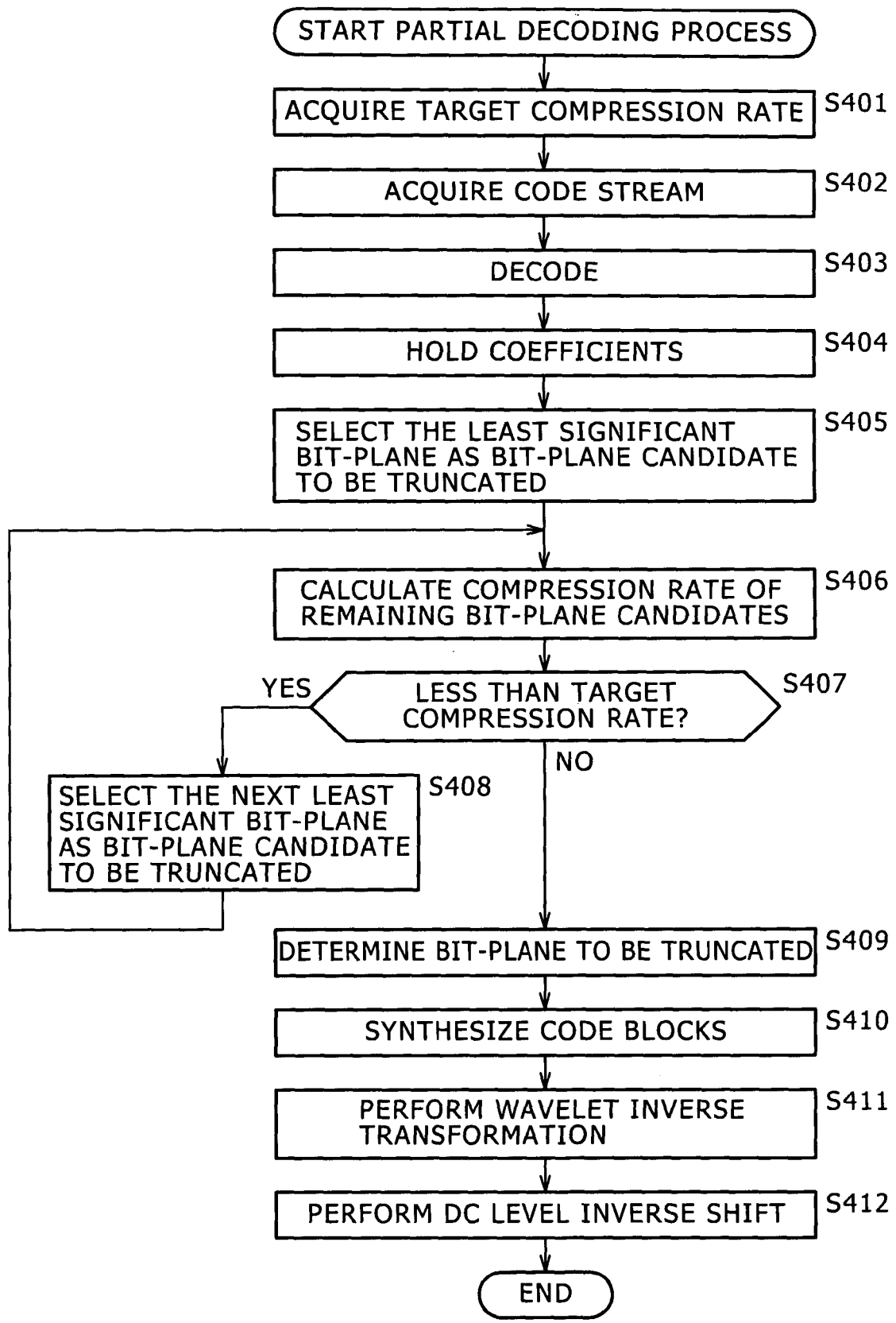
FIG. 24 is a flowchart of steps constituting another partial decoding process.

In FIG. 24, steps S401 through S404 are carried out in the same manner as steps S201 through S204 of FIG. 18.

In step S405, the truncated bit-plane code quantity counting portion 403 selects the least significant bit-plane of the bit-planes being held as a truncated bit-plane candidate and calculates the code quantity of the candidate. In step S406, based on the code quantity counted by the truncated bit-plane code quantity counting portion 403, the truncated bit-plane determination portion 405 calculates the compression rate of the remaining bit-plane candidate (i.e., selected bit-plane candidate) with regard to the picture data of the master picture (original picture). In step S407, the truncated bit-plane determination portion 405 checks to determine whether the calculated compression rate is lower than the target compression rate acquired in step S401.

If in step S407 the compression rate of the remaining bit-plane candidate is found to be lower than the target compression rate, then the truncated bit-plane determination portion 405 goes to step S408. In step S408, the truncated bit-plane code quantity counting portion 403 selects the next least significant of the bit-planes being held as a truncated bit-plane candidate and calculates the code quantity of the candidate. After step S408, the truncated bit-plane code quantity counting portion 403 returns to step S406 and repeats the subsequent steps. That is, the truncated bit-plane code quantity counting portion 403 repeats steps S406 through S408 until the compression rate of the remaining bit-plane candidate becomes higher than the target compression rate, thereby counting the code quantity of the truncated bit-plane candidates.

If in step S407 the compression rate of the remaining bit-plane candidate is found to be higher than the target compression rate, then the truncated bit-plane determination portion 405 goes to step S409 and determines the truncated bit-planes. Steps S410 through S412 are carried out in the same manner as steps S210 through S212 in FIG. 18.

When the partial decoding block 111 selects bit-planes of low significance as described above, it is possible to select bit-planes of high significance as the remaining bit-planes (selected bit-planes). This scheme provides substantially the same effects as those in effect when the bit-planes of high significance are directly selected as discussed earlier.

In the foregoing description, the code quantity of the selected bit-planes was shown counted directly or indirectly. As an alternative, the number of selected bit-planes may be determined in advance so as to further simplify the decoding process. In this case, the predetermined number of bit-planes will always be set aside as the selected bit-planes regardless of the code quantity of each bit-plane or the target compression rate in effect.

Figure 25:
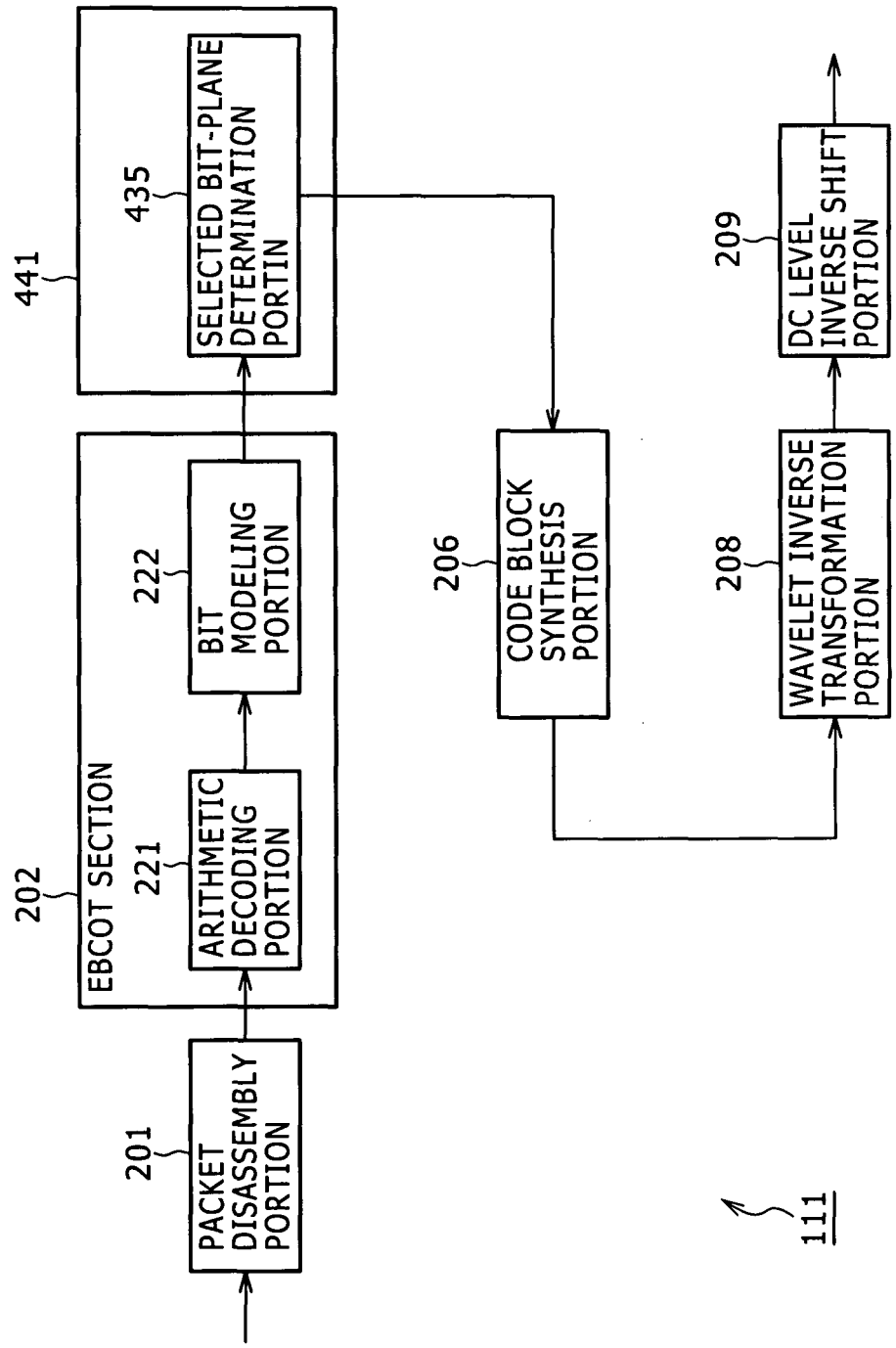
FIG. 25 is a block diagram showing a further detailed structure of the partial decoding block as part of the structure in FIG. 2.

FIG. 25 is a block diagram showing a typical structure of the partial decoding block 111 in effect when a predetermined number of bit-planes are to be selected as outlined above. As shown in FIG. 25, the partial decoding block 111 has basically the same structure as its counterpart in FIG. 11, except that a control section 441 replaces the control section 231 in FIG. 11. In the setup of FIG. 25, a selected bit-plane determination portion 435 replaces the selected bit-plane code quantity counting portion 203, target compression rate acquisition portion 204, and selected bit-plane determination portion 205 in FIG. 11.

The selected bit-plane determination portion 435 in the control section 441 accumulates the bit-planes being supplied by the EBCOT section 202, selects a predetermined number of the supplied bit-planes in descending order of significance (from the most significant bit-plane down), and sends the selected bit-planes to the code block synthesis portion 206.

The selected bit-plane determination portion 435 discards the remaining bit-planes not set aside as the selected bit-planes.

Figure 26:
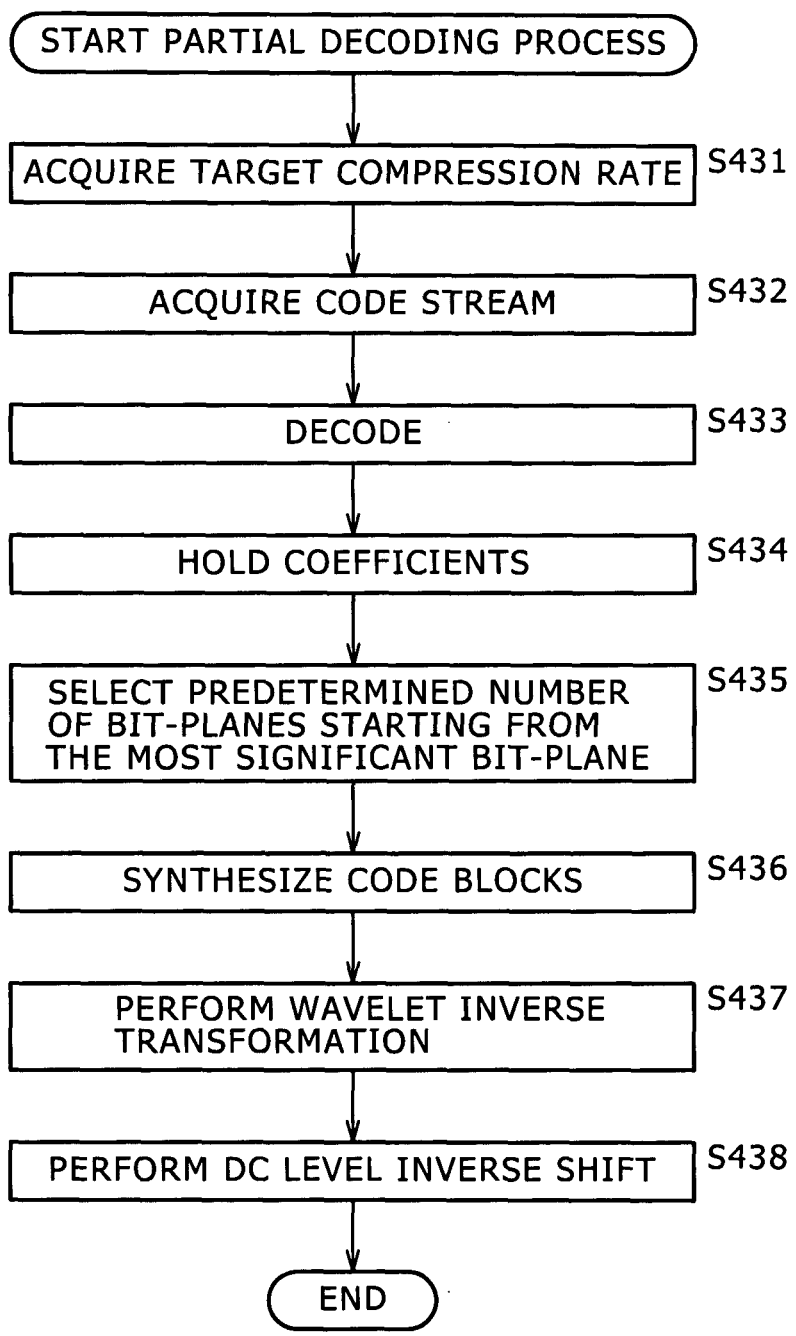
FIG. 26 is a flowchart of steps constituting a further partial decoding process.

A typical flow of the partial decoding process in the preceding case is explained blow in reference to the flowchart of FIG. 26. The flowchart of FIG. 26 corresponds to that of FIG. 18.

In FIG. 26, steps S431 through S434 are carried out in the same manner as steps S201 through S204 in FIG. 18. In step S435, the selected bit-plane determination portion 435 selects a predetermined number of bit-planes in descending order of significance and determines them as the definitively selected bit-planes. Steps S436 through S438 are performed in the same manner as steps S210 through S213 in FIG. 18.

As described, the partial decoding block 111 of this case can perform its decoding process more easily than when counting the code quantity of the selected bit-planes. It should be noted that since the number of the selected bit-planes remains constant regardless of the content of the picture, there could be a lowered level of flexibility to deal with varying difficulties in encoding the input picture. For example, it might happen that the predetermined number of selected bit-planes is excessively large for a picture that can be encoded easily or exceedingly small for a picture that is highly difficult to encode. Still, if such errors fall within tolerance limits, then that method is effective in further reducing the load of the decoding process.

Likewise, where truncated bit-planes are to be determined, they may not be selected on the basis of the code quantity; a predetermined number of truncated bit-planes may be selected instead.

Figure 27:
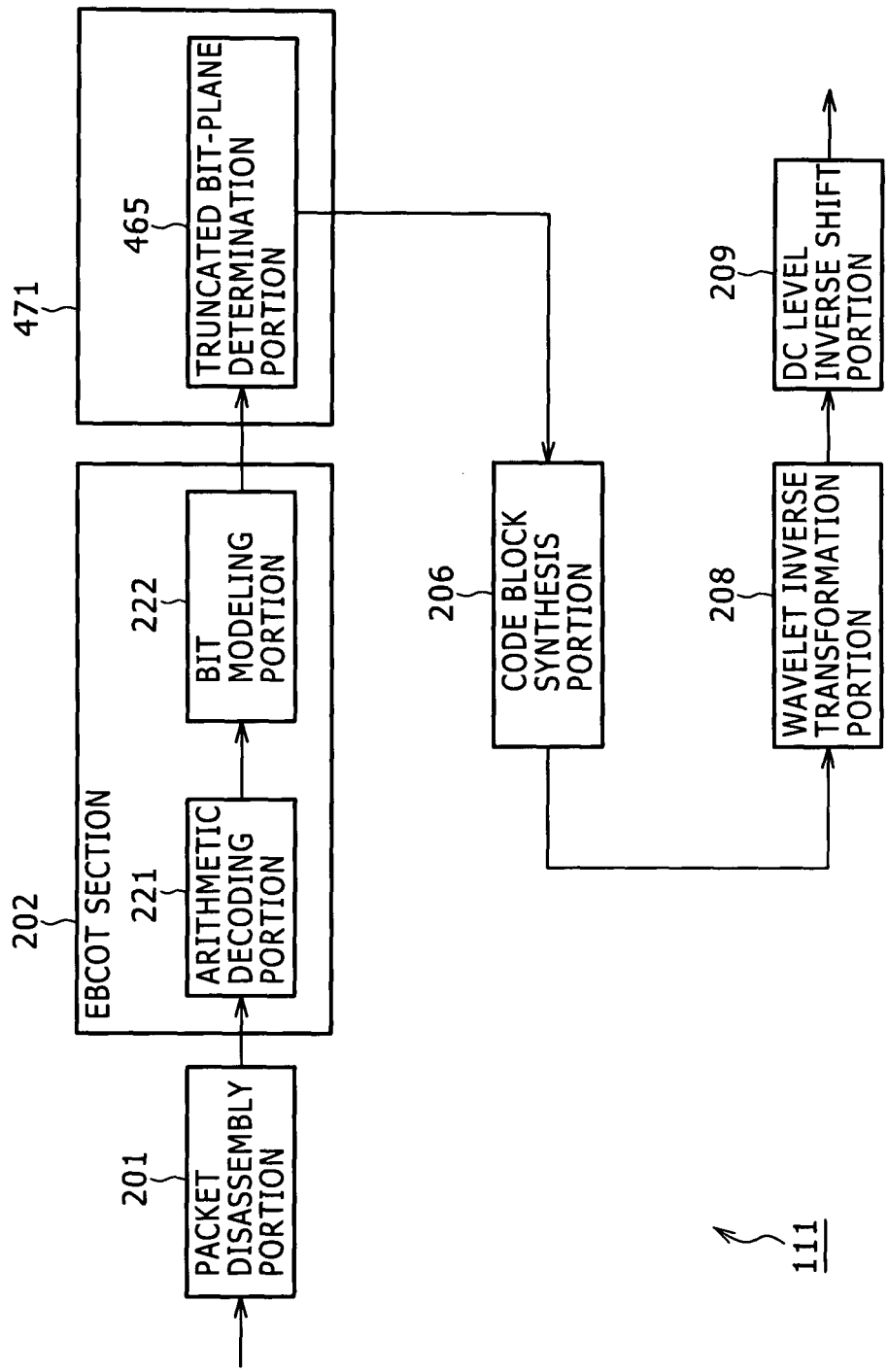
FIG. 27 is a block diagram showing an even further detailed structure of the partial decoding block as part of the structure in FIG. 2.

FIG. 27 is a block diagram showing a typical structure of the partial decoding block 111 in effect when a predetermined number of bit-planes are selected to be truncated. As shown in FIG. 27, the partial decoding block 111 has basically the same structure as its counterpart in FIG. 23, except that a control section 471 replaces the control section 431 in FIG. 23. That is, the partial decoding block 111 in FIG. 27 has a truncated bit-plane determination portion 465 replacing the truncated bit-plane code quantity counting portion 403, target compression rate acquisition portion 204, and truncated bit-plane determination portion 405 in FIG. 23.

The truncated bit-plane determination portion 465 selects a predetermined number of bit-planes being supplied by the EBCOT 202 (i.e., from the least significant bit-plane down), truncates the selected bit-planes, and sends the remaining bit-planes to the code block synthesis portion 206.

A typical flow of the partial decoding process in the preceding case is explained below in reference to the flowchart of FIG. 28. The flowchart of FIG. 28 corresponds to that of FIG. 24.

Figure 28:
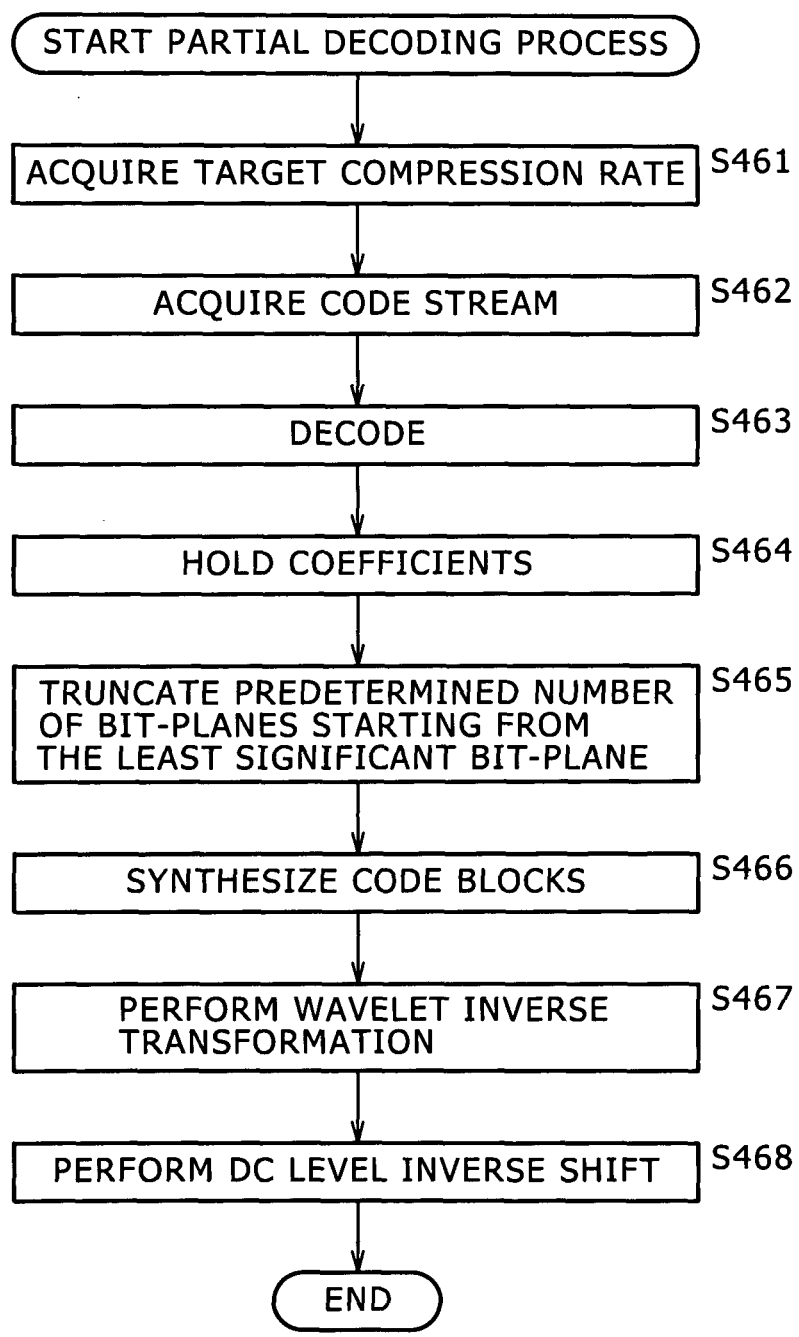
FIG. 28 is a flowchart of steps constituting an even further partial decoding process.

Steps S461 through S464 in FIG. 28 are carried out in the same manner as steps S401 through S404 in FIG. 24. In step S465, the truncated bit-plane determination portion 465 truncates a predetermined number of bit-planes in ascending order of significance. Steps S466 through S468 are performed in the same manner as steps S410 through S412 in FIG. 24.

As described, the partial decoding block 111 in this case can perform its decoding process more easily than when counting the code quantity of the truncated bit-planes. It should be noted that since the number of the truncated bit-planes remains constant regardless of the content of the picture, there could be a lowered level of flexibility to deal with varying difficulties in encoding the input picture. Illustratively, it might happen that the predetermined number of truncated bit-planes is excessively small for a picture that can be encoded easily or exceedingly large for a picture that is highly difficult to encode. However, if such errors fall within tolerance limits, then that method is effective in further reducing the load of the decoding process.

In the foregoing description, the irreversible transcoding unit was shown irreversibly to encode moving pictures using the constant bit rate (CBR) scheme. Alternatively, the irreversible transcoding unit may be arranged irreversibly to encode moving pictures using the variable bit rate (VBR) scheme based on the definitions of the DCI standards. Generally, movies involve varieties of pictures ranging from CG (computer graphics) and pictures of detailed textures on the one hand to pictures against substantially black backgrounds on the other hand. Obviously, the former category of pictures is characterized by high bit rates and the latter by low bit rates. What follows is a description of how the inventive encoding apparatus performs its transcoding process through irreversible encoding using the variable bit rate scheme in compliance with the DCI standards.

Figure 29:
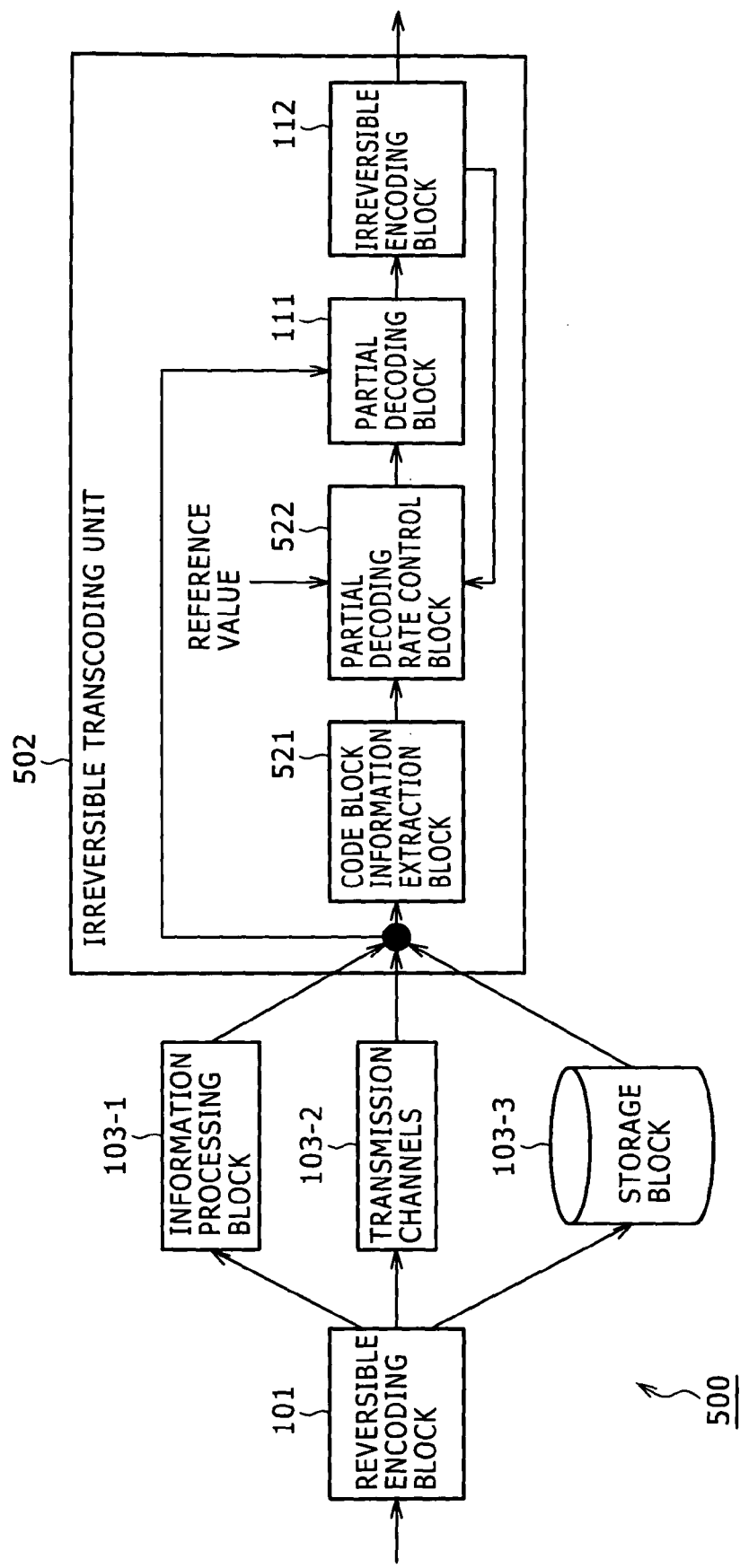
FIG. 29 is a block diagram showing a typical structure of another encoding apparatus embodying the present invention.

FIG. 29 is a block diagram showing a typical structure of another encoding apparatus 500 embodying the present invention. Like the encoding apparatus 100 in FIG. 2, the encoding apparatus 500 in FIG. 29 first encodes input baseband picture data at a predetermined compression rate reversibly in accordance with the JPEG 2000 standard. The encoding apparatus 500 then encodes the compressed code stream irreversibly at a desired compression rate into a code stream based on the JPEG 2000 standard, before outputting the compressed code stream thus acquired. The encoding apparatus 500 performs irreversible encoding using the variable bit rate scheme whereby the encoding bit rate is varied depending on the type of picture.

As shown in FIG. 29, the encoding apparatus 500 has a reversible encoding block 101 and an irreversible transcoding unit 502.

The reversible encoding block 101, as discussed above, encodes the input baseband picture data reversibly at a predetermined compression rate into a reversibly compressed file of a compressed code stream with a reduced data size according to the JPEG 2000 standard. At this time, the reversible encoding block 101 assigns weights to wavelet coefficients generated during encoding in order of significance.

As in the case of the encoding apparatus 100 above, the encoding apparatus 500 may cause the information processing block 103-1 to perform predetermined processes on the reversibly compressed file such as the addition of meta information. The encoding apparatus 500 may alternatively transmit the reversibly compressed file over transmission channels 103-2 such as a predetermined bus or a network. As another alternative, the encoding apparatus 500 may store the reversibly compressed file temporarily into the storage block 103-3 such as a hard disk drive or a semiconductor memory before retrieving the stored file in a suitably timed manner for output.

The encoding apparatus 500 may carry out a combination of the above-mentioned processes. Illustratively, the encoding apparatus 500 may transmit the reversibly compressed file over such transmission channels 103-2 as the predetermined bus or network while storing the file in question into the storage block 103-3 at the same time.

The irreversible transcoding unit 502 determines a partial decoding rate (Target_Rate), i.e., an appropriate target compression rate in reference to the result of the reversible encoding done by the reversible encoding block 101.

In order to perform this process, the irreversible transcoding unit 502 has a code block information extraction block 521 and a partial decoding rate control block 522 in addition to the above-mentioned partial decoding block 111 and irreversible encoding block 112.

The code block information extraction block 521 extracts an encoding parameter from the picture code stream reversibly encoded by the reversible encoding block 101. The encoding parameter denotes metadata regarding encoded picture data and is constituted by information about encoding. Illustratively, the code block information extraction block 521 extracts from the code stream the encoding parameter made up of code block information for each code block.

The partial decoding rate control block 522 determines a decoding target bit rate for use by the partial decoding block 111 during its decoding process on the basis of the code block information and relevant information.

Below is a description of how the decoding target bit rate is determined using the code block information as the encoding parameter added per code block to the code stream. The encoding parameter is not limited to anything specific; it may be constituted by information other than what is defined per code block.

The irreversible transcoding unit 502 determines the decoding target bit rate illustratively based on the number of effective bit-planes in the picture code stream encoded reversibly by the reversible encoding block 101. That is, the irreversible transcoding unit 502 utilizes the number of effective bit-planes as the encoding parameter (code block information).

As described above, each of the coefficients generated through wavelet transformation is subject to bit-plane development. Zero bit-planes refer to the bit planes where the coefficients forming each bit plane starting from the most significant bit (MSB) of encoded data are all zero. The number of zero bit-planes represents the number of all bits constituting the zero bit-planes involved. Effective bit planes refer to the bit planes other than the zero bit-planes. The number of effective bit-planes represents the number of all bits constituting the effective bit-planes. It is assumed here that bit-plane development is performed per code block.

Figure 30:
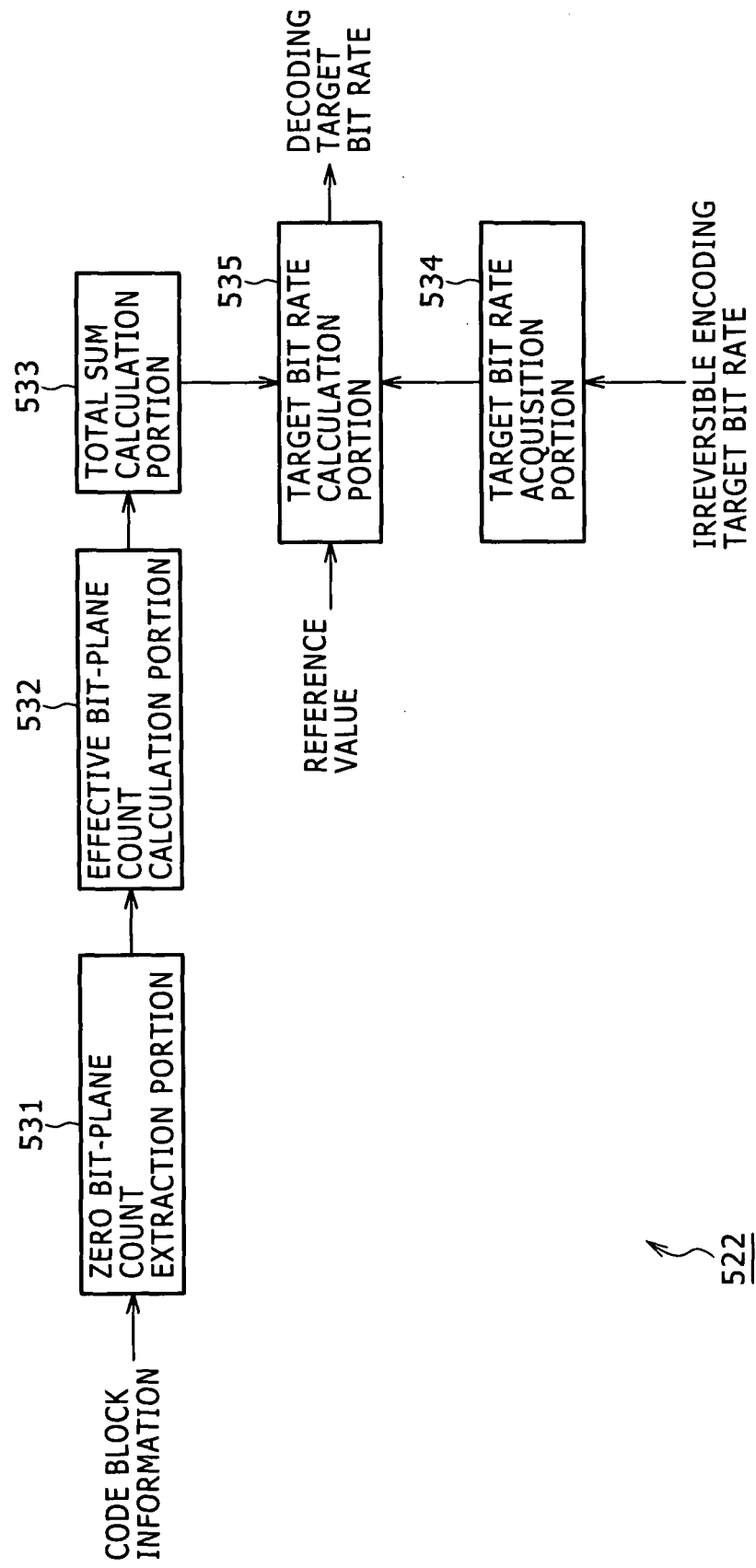
FIG. 30 is a block diagram showing a typical structure of a partial decoding rate control block.

FIG. 30 is a block diagram showing a typical structure of the partial decoding rate control block 522. As shown in FIG. 30, the partial decoding rate control block 522 has a zero bit-plane count extraction portion 531, an effective bit-plane count calculation portion 532, a total sum calculation portion 533, a target bit rate acquisition portion 534, and a target bit rate calculation portion 535.

The zero bit-plane count extraction portion 531 extracts the number of zero bit-planes from the code block information (i.e., encoding parameter per code block) extracted by the code block information extraction block 521 regarding each code block. The information indicative of the number of zero bit-planes is added to the encoded data as the encoding parameter during the reversible encoding process. The zero bit-plane count extraction portion 531 extracts the information indicative of the zero bit-plane count from the code stream acquired as a result of the reversible encoding by the reversible encoding block 101. The zero bit-plane count extraction portion 531 proceeds to supply the extracted number of zero bit-planes to the effective bit-plane count calculation portion 532.

In turn, the effective bit-plane count calculation portion 532 calculates the number of effective bit-planes using the zero bit-plane count extracted by the zero bit-plane count extraction portion 531.

Figure 31:
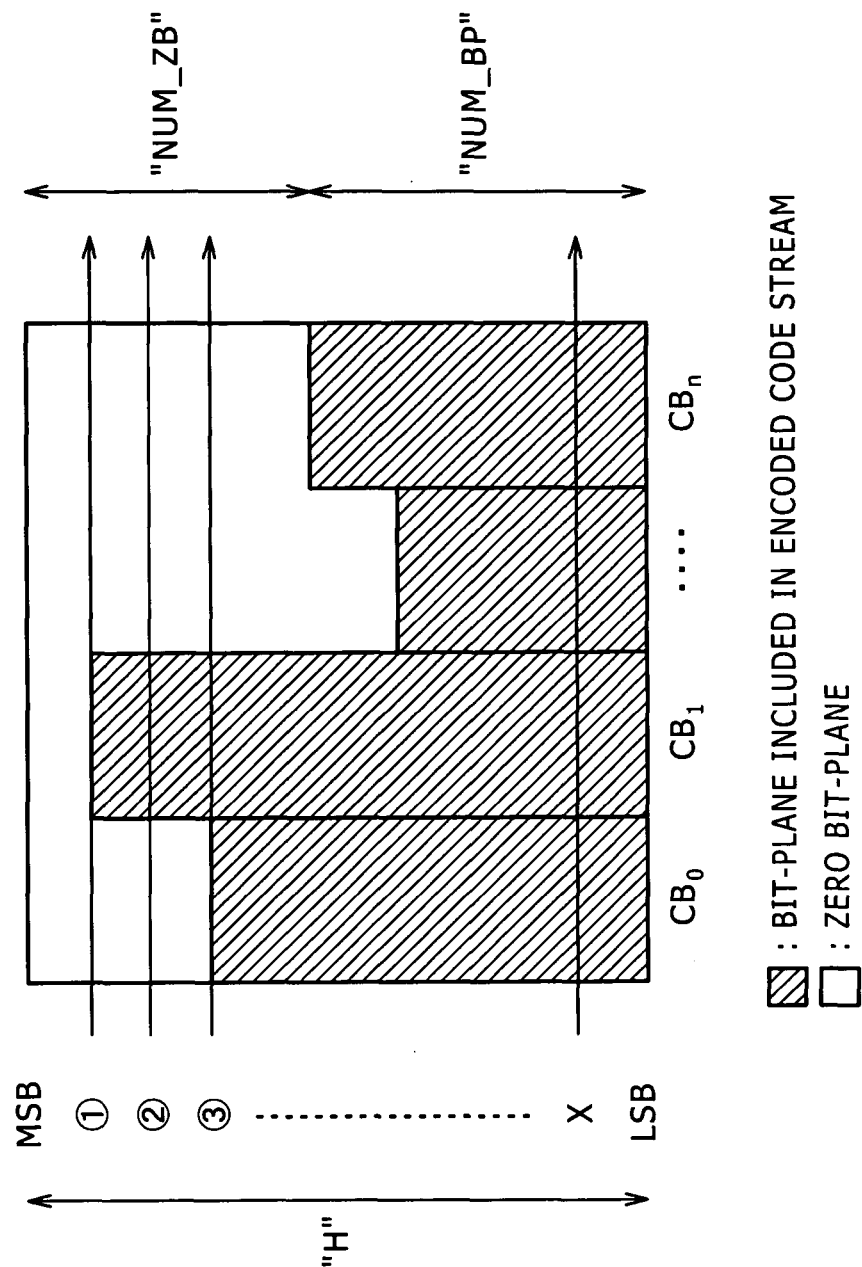
FIG. 31 is a schematic view explanatory of effective bit-planes.

FIG. 31 is a schematic view explanatory of the number of effective bit-planes regarding as many as (n+1) code blocks ($CB_0$, $CB_1$, ..., $CB_n$) having undergone bit-plane development. In the example of FIG. 31, blank areas denote zero bit-planes and shaded areas represent effective bit-planes. Illustratively, the number of zero bit-planes for $CB_0$ is three and the number of zero bit-planes for $CB_1$ is two.

As described above, the number of zero bit-planes (effective bit-plane count) is determined independently for each of the code blocks subject to bit-plane development. That part of encoded data which corresponds to the effective bit-planes of the coefficients involved is included in the code stream, and the encoded data corresponding to zero bit-planes is not included in the code stream as mentioned. It follows that the code quantity of the reversibly encoded code stream depends on the number of effective bit-planes. The larger the number of effective bit-planes in a given code block, the greater the code quantity of that block; the smaller the number of effective bit-planes in a code block, the smaller the code quantity of the block in question. In other words, the encoding apparatus 500 can roughly estimate the degree of difficulty in encoding picture data on the basis of the number of effective bit-planes.

If the depth of bits in encoded data is represented by reference character H as shown in FIG. 31, then the number of effective bit-planes (NUM_BP) indicative of the number of bits of effective bit-planes may be expressed by the following expression (1) using the number of zero bit-planes (NUM_ZB):

$$(\text{NUM\_BP}) = H - \text{NUM\_ZB} \tag{1}$$

The effective bit-plane count calculation portion 532 calculates the number of effective bit-planes for each code block, and supplies the result of the calculation to the total sum calculation portion 533. That is, the effective bit-plane count calculation portion 532 calculates the effective bit-plane count per code block for each of the sub-bands of wavelet coefficients. Although the slice level count for wavelet transformation is not limited to any specific number, it is assumed for the ensuing description that wavelet transformation is performed up to a slice level of 3. That is, the sub-band structure is the same as what is shown in FIG. 4, ranging from $0_{LL}$ to $3_{HH}$.

The effective bit-plane count calculation portion 532 calculates the number of effective bit-planes regarding the structure of each component (e.g., brightness Y and color differences Cb and Cr). Although the component structure is not limited to anything specific, the commonly used components made up of brightness Y and color differences Cb and Cr are explained below.

The total sum calculation portion 533 calculates the total sum (ALL_NUM_BP) per picture of the effective bit-plane counts calculated by the effective bit-plane count calculation portion 532 by use of the following expression (2):

$$\text{ALL\_NUM\_BP} = \Sigma_{(0_{LL}, \ldots, 3_{HH})} \text{NUM\_BP\_Y} + \Sigma_{(0_{LL}, \ldots, 3_{HH})} \text{NUM\_BP\_Cb} + \Sigma_{(0_{LL}, \ldots, 3_{HH})} \text{NUM\_BP\_Cr} \tag{2}$$

where, NUM_BP_Y denotes the number of effective bit-planes for brightness Y; NUM_BP_Cb represents the number of effective bit-planes regarding color difference Cb; and NUM_BP_Cr stands for the number of effective bit-planes with regard to color difference Cr. $\Sigma(0_{LL}, \ldots, 3_{HH})$ indicates the total sum for all sub-bands ($0_{LL}$ through $3_{HH}$) of the numbers of effective bit-planes regarding each of the components (Y, Cb, Cr).

The total sum calculation portion 533 supplies the target bit rate calculation portion 535 with the total sum (ALL_NUM_BP) per picture of the effective bit-plane counts thus calculated.

The target bit rate acquisition portion 534 acquires an irreversible encoding target bit rate (TR) constituting a target bit rate for the encoded data acquired by the irreversible encoding block 112 through irreversible encoding. The target bit rate acquisition portion 534 supplies the irreversible encoding target bit rate (TR) thus acquired to the target bit rate calculation portion 535.

The target bit rate calculation portion 535 acquires the total sum (ALL_NUM_BP) per picture of the numbers of effective bit-planes from the total sum calculation portion 533. The target bit rate calculation portion 535 also acquires an irreversible encoding target bit rate (TR) from the target bit rate acquisition portion 534. Furthermore, the target bit rate calculation portion 535 acquires a reference value (Ref_ALL_NUM_BP) constituted by a predetermined effective bit-plane count. The reference value (Ref_ALL_NUM_BP) may be furnished in advance and may be held by the target bit rate calculation portion 535 in an internal memory or the like, not shown.

The target bit rate calculation portion 535 acquires a decoding target bit rate (Target_Rate) constituting a target bit rate for the picture data acquired through a decoding process by the partial decoding block 111 using the total sum (ALL_NUM_BP) per picture of the numbers of effective bit-planes, irreversible encoding target bit rate (TR), and reference value (Ref_ALL_NUM_BP). The target bit rate calculation portion 535 calculates the decoding target bit rate (Target_Rate) illustratively by use of the following expression (3):

$$\text{Target\_Rate} = TR \times \frac{\text{ALL\_NUM\_BP}}{\text{Ref\_ALL\_NUM\_BP}} \quad (3)$$

With the expression (3) above, the target bit rate calculation portion 535 determines the decoding target bit rate (Target_Rate) in accordance with the relative ratio of the total sum (ALL_NUM_BP) per picture of effective bit-plane counts to the reference value (Ref_ALL_NUM_BP). Specifically, if the total sum (ALL_NUM_BP) of effective bit-plane counts is larger than the reference value (Ref_ALL_NUM_BP), the target bit rate calculation portion 535 sets the decoding target bit rate (Target_Rate) to be higher than the irreversible encoding target bit rate (TR) in order to allow for a large code quantity of the code stream derived from reversible encoding.

Conversely, if the total sum (ALL_NUM_BP) of effective bit-plane counts is smaller than the reference value (Ref_ALL_NUM_BP), then the target bit rate calculation portion 535 sets the decoding target bit rate (Target_Rate) to be lower than the irreversible encoding target bit rate (TR) so as to allow for a small code quantity of the code stream derived from reversible encoding.

When the target bit rate calculation portion 535 determines the decoding target bit rate in accordance with the relative ratio of the total sum of effective bit-plane counts to a predetermined reference value as described, it is possible to determine the decoding target bit rate in an easier and more appropriate manner than before.

The decoding target bit rate may be obtained by any other suitable method. That is, methods, expressions, etc., other than the expression (3) above may be utilized if appropriate.

The target bit rate calculation portion 535 supplies the decoding target bit rate (Target_Rate) thus calculated to the partial decoding block 111. Based on the supplied decoding target bit rate, the partial decoding block 111 calculates the target compression rate at which the baseband picture data generated through decoding is to be compressed relative to the master (original) picture data. The partial decoding block 111 partially decodes the code stream of the reversibly compressed file into baseband picture data.

As described above, the partial decoding block 111 partially decodes (i.e., performs a partial decoding process on) the code stream of the reversibly compressed file in a manner reducing the workload of the decoding process as long as the irreversible encoding block 112 can attain the irreversible encoding target bit rate. In this case, the partial decoding block 111 determines the range of its partial decoding process based on the decoding target bit rate calculated by the target bit rate calculation portion 535, instead of using the target compression rate supplied by the above-mentioned irreversible encoding block 112.

The partial decoding block 111 supplies the generated baseband picture data (i.e., decoded picture data) to the irreversible encoding block 112.

In turn, the irreversible encoding block 112 encodes the baseband picture data at a desired compression rate irreversibly in accordance with the JPEG 2000 standard, and outputs the resulting code stream. In this case, the irreversible encoding block 112 supplies the irreversible encoding target bit rate to the partial decoding rate control block 522, instead of feeding a target compression rate to the partial decoding block 111.

Figure 32:
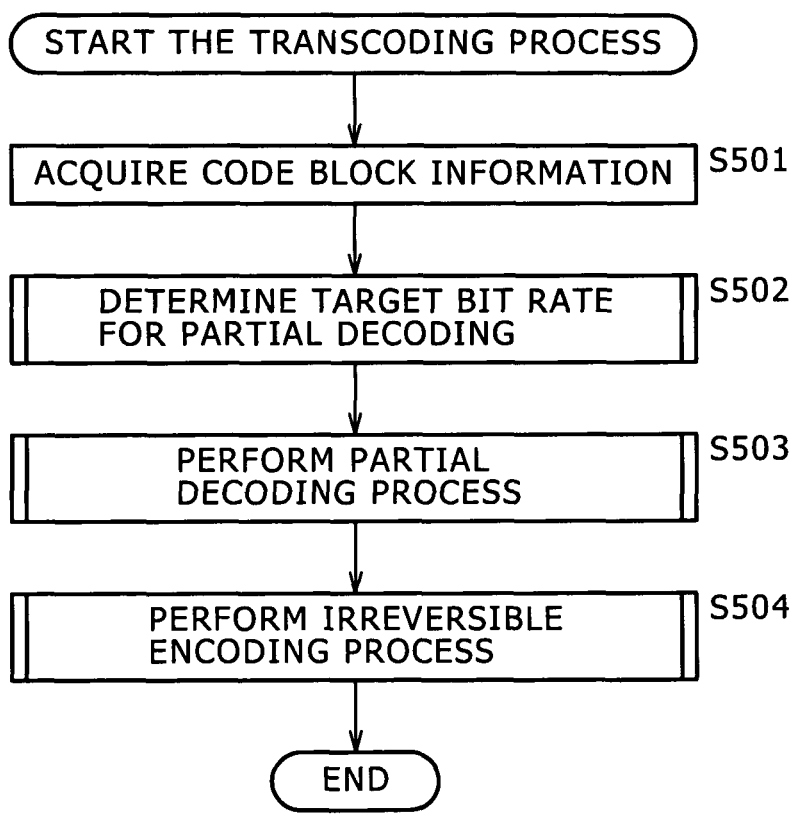
FIG. 32 is a flowchart of steps constituting a transcoding process.

FIG. 32 is a flowchart explanatory of the steps constituting the transcoding process performed by the irreversible transcoding unit 502.

When supplied with picture data from the information processing block 103-1, transmission channels 103-2 or storage block 103-3, the irreversible transcoding unit 502 starts its transcoding process. With the transcoding process started, the code block information extraction block 521 goes to step S501 in FIG. 32 and extracts code block information from the code stream. In step S502, the partial decoding rate control block 522 determines a target bit rate for the partial decoding process (i.e., decoding target bit rate). The process of determining the target bit rate for the partial decoding will be discussed later in detail.

With the decoding target bit rate determined, the partial decoding block 111 goes to step S503. In step S503, the partial decoding block 111 performs a partial decoding process using the calculated decoding target bit rate so as to generate decoded picture data. The partial decoding process is the same as that described above in reference to the flowchart of FIG. 18 and thus will not be discussed further. It should be noted that in step S503, the partial decoding block 111 calculates the target compression rate from the decoding target bit rate and carries out the partial decoding process using the calculated target compression rate.

In step S504, the irreversible encoding block 112 performs an irreversible encoding process. The process of step S504 is the same as that described above in reference to the flowchart of FIG. 19 and thus will not be discussed further. It should be noted that in step S504, the irreversible encoding block 112 feeds the irreversible encoding target bit rate to the partial decoding rate control block 522, instead of having the target compression rate supplied to the partial decoding block 111 as was done in step S308.

Upon completion of step S504, the transcoding process is brought to an end.

The irreversible transcoding unit 502 repeats the transcoding process on each of the pictures involved.

Figure 33:
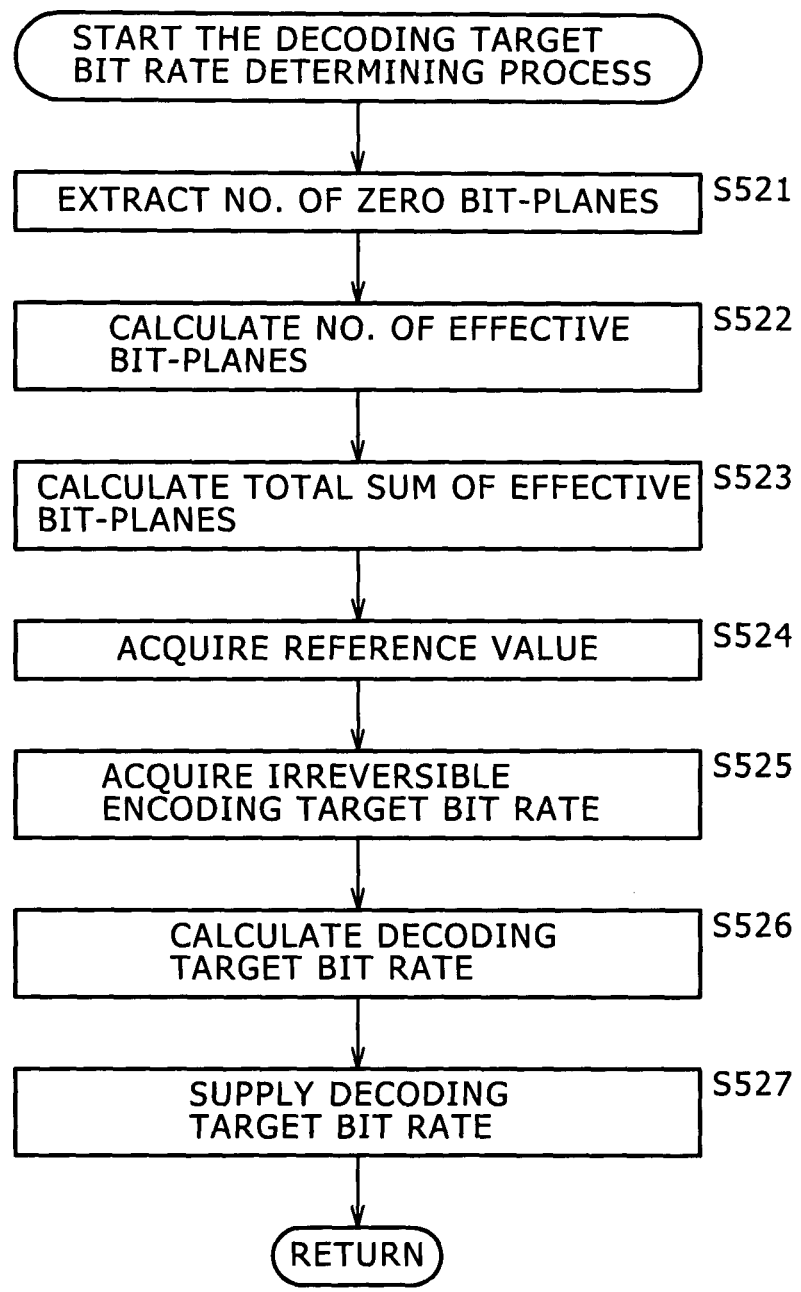
FIG. 33 is a flowchart of steps constituting a decoding target bit rate determining process.

Described below in reference to the flowchart of FIG. 33 is the decoding target bit rate determining process carried out in step S502 of FIG. 32.

When the decoding target bit rate determining process is started, the zero bit-plane count extraction portion 531 in the partial decoding rate control block 522 goes to step S521 and extracts the number of zero bit-planes. In step S522, the effective bit-plane count calculation portion 532 calculates the number of effective bit-planes from the zero bit-plane count. In step S523, the total sum calculation portion 533 calculates the total sum of the numbers of effective bit-planes regarding all code blocks of the picture being processed (i.e., structures of all sub-bands and components). In step S524, the target bit rate calculation portion 535 acquires a reference value. In step S525, the target bit rate acquisition portion 534 acquires an irreversible encoding target bit rate.

In step S526, the target bit rate calculation portion 535 calculates a decoding target bit rate using the total sum of the numbers of effective bit-planes acquired in step S523, the reference value obtained in step S524, and the irreversible encoding target bit rate gained in step S525.

In step S527, the target bit rate calculation portion 535 supplies the decoding target bit rate calculated in step S526 to the partial decoding block 111.

Upon receipt of the decoding target bit rate, the partial decoding rate control block 522 terminates the decoding target bit rate determining process. Control is then returned to step S502 of FIG. 32, and step S503 and subsequent steps are carried out.

As described above, the partial decoding rate control block 522 acquires the decoding target bit rate based on the encoding parameter (number of effective bit-planes) for the reversible encoding performed by the reversible encoding block 101. The partial decoding block 111 performs the decoding process using the decoding target bit rate. That is, the partial decoding block 111 roughly estimates the degree of difficulty in encoding picture data on the basis of the number of effective bit-planes for reversible encoding. The partial decoding block 111 then carries out its decoding process (partial decoding process) using the decoding target bit rate established in keeping with the estimated degree of difficulty. In this manner, the partial decoding block 111 can generate the decoded picture data at a bit rate reflecting the degree of difficulty in encoding picture data. This allows the irreversible encoding block 112 to perform irreversible encoding using the variable bit rate scheme in easier and more appropriate fashion than before. That is, the irreversible transcoding unit 502 can transform the reversibly encoded code stream into an irreversibly encoded code stream more easily and appropriately using the variable bit rate scheme. In other words, the encoding apparatus 500 can encode picture data at diverse compression rates more easily and adequately than usual even if the master picture has a large data size.

In the transcoding process of FIG. 32, steps S501 and S502 may be carried out in parallel. Illustratively, every time the code block information extraction block 521 extracts code block information, the partial decoding rate control block 522 may acquire the number of effective bit-planes regarding the code block in question.

In the foregoing description, the partial decoding rate control block 522 was shown to calculate the bit rate as the target value for the decoding process (i.e., decoding target bit rate). Alternatively, the partial decoding rate control block 522 may calculate some other information equivalent to the bit rate such as a compression rate or a code quantity for use as the target value. In such a case, the partial decoding block 111 need only transform the target value in keeping with the type of information. Basically, the partial decoding process is carried out in the same manner as was discussed above in reference to the flowchart of FIG. 18.

Likewise, the information supplied by the irreversible encoding block 112 to the partial decoding rate control block 522 may be something other than bit rates. Illustratively, a code quantity or a compression rate may be supplied.

In the foregoing description, the total sum calculation portion 533 was shown to calculate the total sum of the effective bit-plane counts regarding all code blocks. Alternatively, the total sum calculation portion 533 may calculate the total sum of the numbers of effective bit-planes with regard to only part of the code blocks (i.e., representative code blocks) within the picture. Based on the total sum thus obtained, the target bit rate calculation portion 535 may calculate the decoding target bit rate.

What follows is a description of another example of the encoding parameter.

The irreversible transcoding unit 502 may determine the decoding target bit rate illustratively based on the number of encoding passes of the picture code stream reversibly encoded by the reversible encoding block 101. In this case, the irreversible transcoding unit 502 utilizes the number of encoding passes as the encoding parameter (code block information).

An encoding pass refers to the method of encoding per code block as explained above in reference to FIG. 8. The encoding passes include the cleanup pass (CP), significant propagation pass (SP), and magnitude refinement pass (MR) as mentioned earlier. During the encoding process on each bit-plane from the most significant bit (MSB) down to the least significant bit (LSB), the above three encoding passes CP, SP and MR are used repeatedly, in that order.

The partial decoding rate control block 522 roughly estimates the degree of difficulty in encoding picture data (i.e., necessary code quantity) on the basis of the number of encoding passes used during the reversible encoding performed by the reversible encoding block 101. It is assumed here that bit-plane development is carried out per code block.

Figure 34:
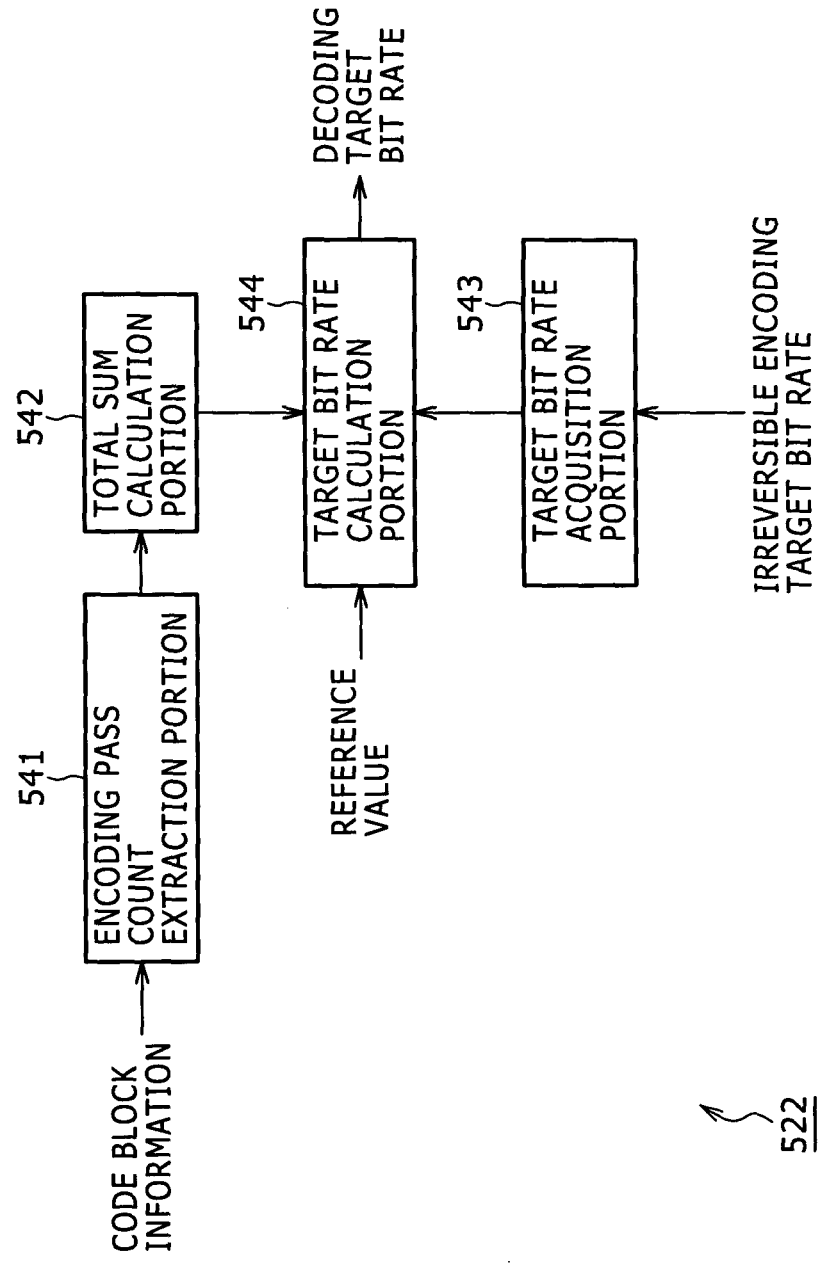
FIG. 34 is a block diagram showing another typical structure of the partial decoding rate control block.

FIG. 34 is a block diagram showing a detailed structure of the partial decoding rate control block 522 for use in this example. As shown in FIG. 34, the partial decoding rate control block 522 is made up of an encoding pass count extraction portion 541, a total sum calculation portion 542, a target bit rate acquisition portion 543, and a target bit rate calculation portion 544.

The encoding pass count extraction portion 541 extracts the number of encoding passes from the code block information extracted per code block (i.e., encoding parameter per code block) by the code block information extraction block 521.

Figure 35:
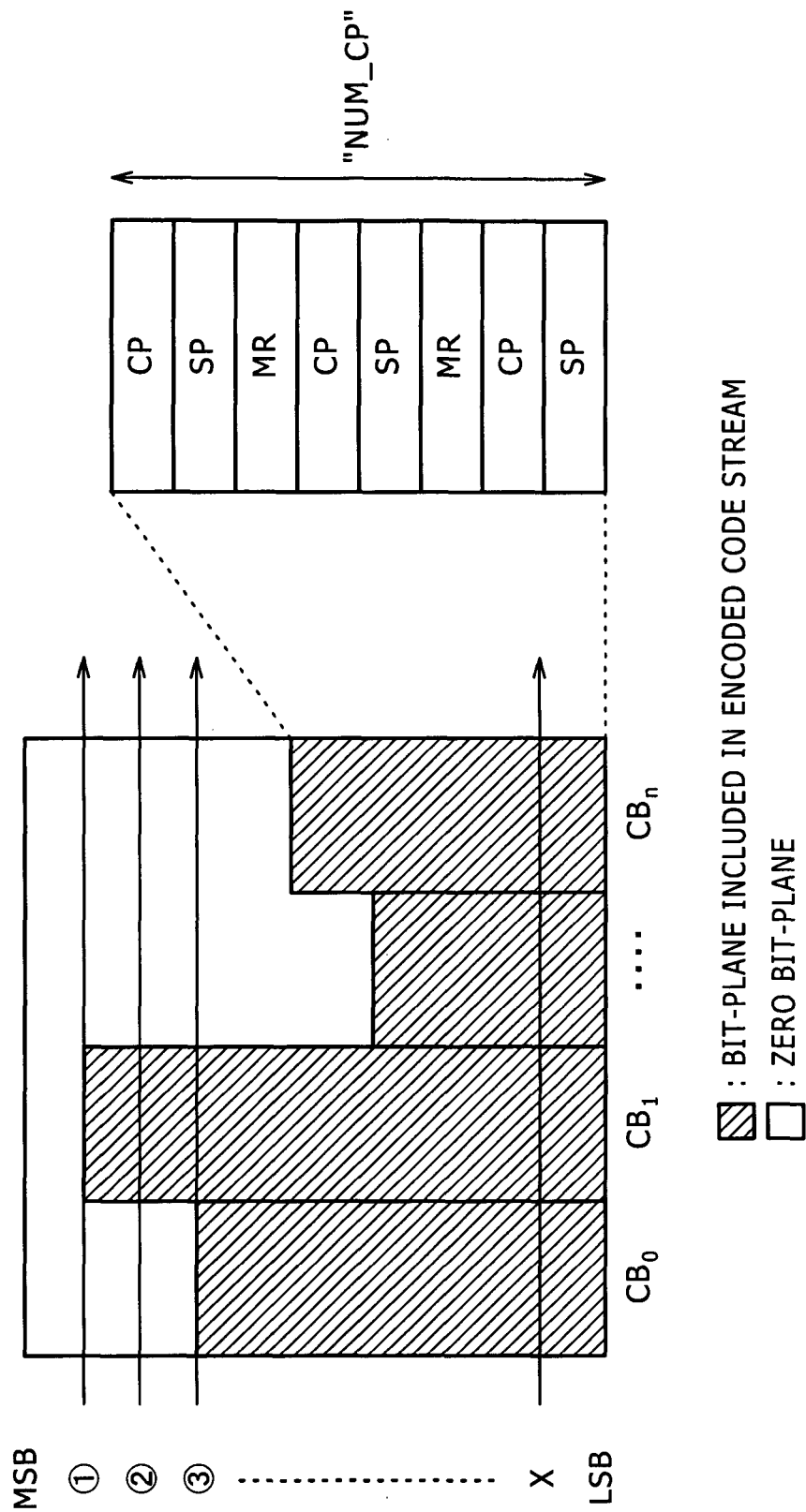
FIG. 35 is a schematic view explanatory of the number of encoding passes.

FIG. 35 is a schematic view explanatory of the number of encoding passes (NUM_CP) regarding as many as (n+1) code blocks ($CB_0$, $CB_1$, . . . , $CB_n$) having undergone bit-plane development. In the example of FIG. 35, blank areas denote zero bit-planes and shaded areas represent effective bit-planes. Each effective bit-plane (shaded) is encoded by a plurality of encoding passes as shown in FIG. 35. In the case of FIG. 35, the encoding passes for encoding of the effective bit-plane of the code block $CB_n$ are CP, SP, MR, CP, SP, MR, CP, and SP, in that order from the MSB down. That means the number of encoding passes (NUM_CP) in this case is eight.

Information indicative of the number of encoding passes (NUM_CP) is written to the packet header of encoded data as the encoding parameter upon reversible encoding. The code block information extraction block 521 then extracts the packet header as code block information. The encoding pass count extraction portion 541 need only reference (i.e., extract) the number of encoding passes written in the extracted packet header information. The encoding pass count extraction portion 541 supplies the extracted encoding pass count (NUM_CP) to the total sum calculation portion 542.

The total sum calculation portion 542 calculates the total sum (ALL_NUM_CP) per picture of the numbers of encoding passes extracted by the encoding pass count extraction portion 541 by use of the following expression (4):

$$\text{ALL\_NUM\_CP} = \Sigma_{(0LL, \ldots, 3HH)} \text{NUM\_CP\_Y} + \Sigma_{(0LL, \ldots, 3HH)} \text{NUM\_CP\_Cb} + \Sigma_{(0LL, \ldots, 3HH)} \text{NUM\_CP\_Cr} \quad (4)$$

where NUM_CP_Y denotes the number of encoding passes for brightness Y, NUM_CP_Cb represents the number of encoding passes for color difference Cb, and NUM_CP_Cr stands for the number of encoding passes for color difference Cr. $\Sigma(0_{LL}, \ldots, 3_{HH})$ indicates the total sum for all sub-bands ($0_{LL}$ through $3_{HH}$) of the numbers of encoding passes regarding each of the components (Y, Cb, Cr). As in the case involving the number of effective bit-planes discussed above, it is assumed that the components of picture data are made up of brightness Y and color differences Cb and Cr and that wavelet transformation upon encoding is performed up to a slice level of 3.

The total sum calculation portion 542 supplies the target bit rate calculation portion 544 with the total sum (ALL_NUM_CP) per picture of the encoding pass counts calculated as described.

Like the target bit rate acquisition portion 534, the target bit rate acquisition portion 543 acquires the irreversible encoding target bit rate (TR) from the irreversible encoding block 112. The target bit rate acquisition portion 543 supplies the acquired irreversible encoding target bit rate (TR) to the target bit rate calculation portion 544.

The target bit rate calculation portion 544 acquires the total sum (ALL_NUM_CP) per picture of the numbers of encoding passes from the total sum calculation portion 542. The target bit rate calculation portion 544 also acquires the irreversible encoding target bit rate (TR) from the target bit rate acquisition portion 543. The target bit rate calculation portion 544 further acquires a predetermined encoding pass count as a reference value (Ref_ALL_NUM_CP). The reference value (Ref_ALL_NUM_CP) may be furnished in advance and may be held by the target bit rate calculation portion 544 in an internal memory or the like, not shown.

The target bit rate calculation portion 544 acquires the decoding target bit rate (Target_Rate) for the partial decoding block 111 using the total sum (ALL_NUM_CP) per picture of the numbers of effective bit-planes, irreversible encoding target bit rate (TR), and reference value (Ref_ALL_NUM_CP). The target bit rate calculation portion 544 calculates the decoding target bit rate (Target_Rate) illustratively by use of the following expression (5):

$$\text{Target\_Rate} = TR \times \frac{\text{ALL\_NUM\_CP}}{\text{Ref\_ALL\_NUM\_CP}} \quad (5)$$

With the expression (5) above, the target bit rate calculation portion 544 determines the decoding target bit rate (Target_Rate) in accordance with the relative ratio of the total sum (ALL_NUM_CP) per picture of encoding pass counts to the reference value (Ref_ALL_NUM_CP). Specifically, if the total sum (ALL_NUM_CP) of encoding pass counts is larger than the reference value (Ref_ALL_NUM_CP), the target bit rate calculation portion 544 sets the decoding target bit rate (Target_Rate) to be higher than the irreversible encoding target bit rate (TR) in order to allow for a large code quantity of the code stream derived from reversible encoding.

Conversely, if the total sum (ALL_NUM_CP) of encoding pass counts is smaller than the reference value (Ref_ALL_NUM_CP), then the target bit rate calculation portion 544 sets the decoding target bit rate (Target_Rate) to be lower than the irreversible encoding target bit rate (TR) so as to allow for a small code quantity of the code stream derived from reversible encoding.

When the target bit rate calculation portion 544 determines the decoding target bit rate in accordance with the relative ratio of the total sum of encoding pass counts to a predetermined reference value as described, it is possible to determine the decoding target bit rate in an easier and more appropriate manner than before.

The decoding target bit rate may be obtained by any other suitable method. That is, methods, expressions, etc., other than the expression (5) above may be utilized if appropriate.

The target bit rate calculation portion 544 supplies the decoding target bit rate (Target_Rate) thus calculated to the partial decoding block 111. Based on the supplied decoding target bit rate, the partial decoding block 111 calculates the target compression rate at which the baseband picture data generated through decoding is to be compressed relative to the master (original) picture data. The partial decoding block 111 partially decodes the code stream of the reversibly compressed file into baseband picture data. The partial decoding block 111 proceeds to supply the generated baseband picture data (decoded picture data) to the irreversible encoding block 112.

The irreversible encoding block 112 encodes the baseband picture data at a desired compression rate irreversibly in accordance with the JPEG 2000 standard, and outputs the resulting code stream. In this case, the irreversible encoding block 112 supplies the irreversible encoding target bit rate to the partial decoding rate control block 522, instead of feeding a target compression rate to the partial decoding block 111.

Figure 36:
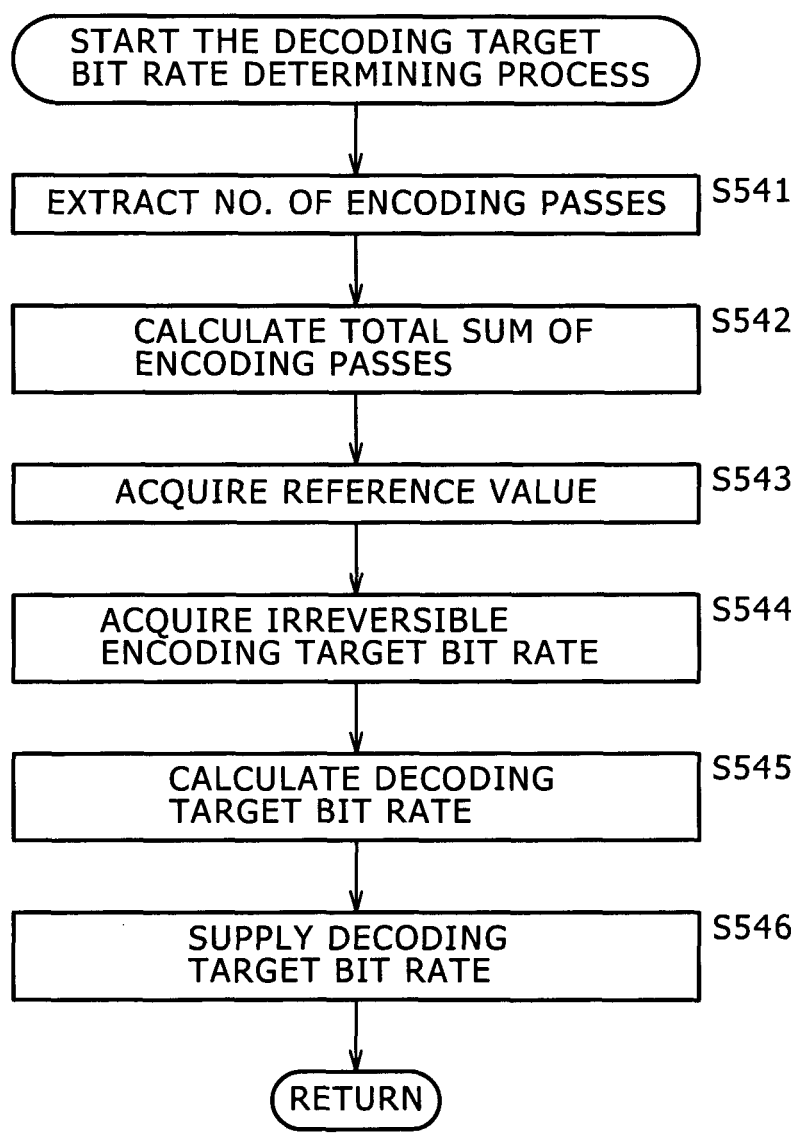
FIG. 36 is a flowchart of steps constituting another decoding target bit rate determining process.

Described below in reference to the flowchart of FIG. 36 is the decoding target bit rate determining process carried out in this case in step S502 of FIG. 32.

When the decoding target bit rate determining process is started, the encoding pass count extraction portion 541 in the partial decoding rate control block 522 goes to step S541 and extracts the number of encoding passes. In step S542, the total sum calculation portion 542 calculates the total sum of the numbers of encoding passes regarding all code blocks of the picture being processed (i.e., structures of all sub-bands and components). In step S543, the target bit rate calculation portion 544 acquires a reference value. In step S544, the target bit rate acquisition portion 543 acquires an irreversible encoding target bit rate.

In step S545, the target bit rate calculation portion 544 calculates a decoding target bit rate using the total sum of the numbers of encoding passes calculated in step S542, the reference value obtained in step S543, and the irreversible encoding target bit rate gained in step S544.

In step S546, the target bit rate calculation portion 544 supplies the decoding target bit rate calculated in step S545 to the partial decoding block 111.

Upon receipt of the decoding target bit rate, the partial decoding rate control block 522 terminates the decoding target bit rate determining process. Control is then returned to step S502 of FIG. 32, and step S503 and subsequent steps are carried out.

As described above, the partial decoding rate control block 522 acquires the decoding target bit rate based on the encoding parameter (number of encoding passes) for the reversible encoding performed by the reversible encoding block 101. The partial decoding block 111 performs the decoding process using the decoding target bit rate. That is, the partial decoding block 111 roughly estimates the degree of difficulty in encoding picture data on the basis of the number of encoding passes for reversible encoding. The partial decoding block 111 then carries out its decoding process (partial decoding process) using the decoding target bit rate established in keeping with the estimated degree of difficulty. In this manner, the partial decoding block 111 can generate the decoded picture data at a bit rate reflecting the degree of difficulty in encoding picture data. This allows the irreversible encoding block 112 to perform irreversible encoding using the variable bit rate scheme in easier and more appropriate fashion than before. That is, the irreversible transcoding unit 502 can transform the reversibly encoded code stream into an irreversibly encoded code stream more easily and appropriately using the variable bit rate scheme. In other words, the encoding apparatus 500 can encode picture data at diverse compression rates more easily and adequately than usual even if the master picture has a large data size.

In the above example, steps S501 and S502 may also be carried out parallelly in the transcoding process of FIG. 32.

In the foregoing description, the partial decoding rate control block 522 was shown to calculate the bit rate as the target value for the decoding process (i.e., decoding target bit rate). Alternatively, the partial decoding rate control block 522 may calculate information equivalent to the bit rate such as a compression rate or a code quantity for use as the target value. Likewise, the information supplied by the irreversible encoding block 112 to the partial decoding rate control block 522 may be information other than bit rates. Illustratively, a code quantity or a compression rate may be supplied.

In the foregoing description, the total sum calculation portion 542 was shown to calculate the total sum of the encoding pass counts regarding all code blocks. Alternatively, the total sum calculation portion 542 may calculate the total sum of the numbers of encoding passes with regard to only part of the code blocks (i.e., representative code blocks) within the picture. Based on the total sum thus obtained, the target bit rate calculation portion 544 may calculate the decoding target bit rate.

What follows is a description of another example of the encoding parameter.

The irreversible transcoding unit 502 may determine the decoding target bit rate illustratively based on the number of non-zero bit-planes of the picture code stream reversibly encoded by the reversible encoding block 101. In this case, the irreversible transcoding unit 502 utilizes the number of non-zero bit-planes as the encoding parameter (code block information).

Non-zero bit-planes refer to the above-mentioned effective bit-planes minus zero-coefficient bit-planes where all coefficients are constituted by zeros. That is, non-zero bit-planes are those effective bit-planes that contain "1" coefficients. The number of non-zero bit-planes thus denotes the number of such non-zero bit-planes (i.e., bit count) regarding each code block. The number of zero-coefficient bit-planes represents the number of zero-coefficient bit planes (bit count) per code block.

The partial decoding rate control block 522 roughly estimates the degree of difficulty in encoding picture data (i.e., necessary code quantity) on the basis of the number of non-zero bit-planes used during the reversible encoding performed by the reversible encoding block 101. It is assumed here that bit-plane development is carried out per code block.

Figure 37:
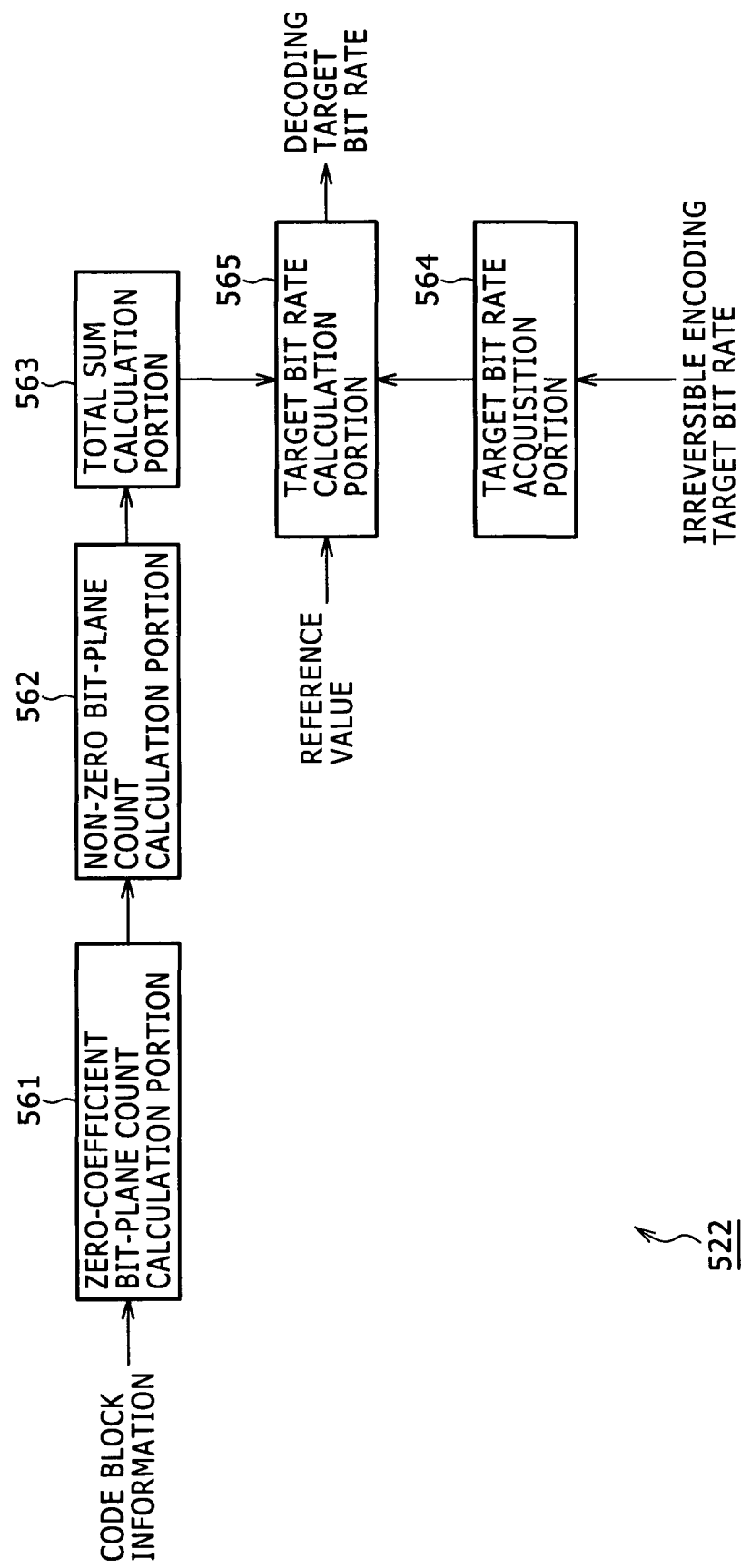
FIG. 37 is a block diagram showing another typical structure of the partial decoding rate control block.

FIG. 37 is a block diagram showing a detailed structure of the partial decoding rate control block 522 for use in this example. As shown in FIG. 37, the partial decoding rate control block 522 is made up of a zero-coefficient bit-plane count calculation portion 561, a non-zero bit-plane count calculation portion 562, a total sum calculation portion 563, a target bit rate acquisition portion 564, and a target bit rate calculation portion 565.

The zero-coefficient bit-plane count calculation portion 561 extracts the number of zero-coefficient bit-planes from the code block information extracted per code block (i.e., encoding parameter per code block) by the code block information extraction block 521. In order to find the number of zero-coefficient bit-planes, there is no other choice but actually to reference encoded data. The code block information extraction block 521 thus references the reversibly encoded data to search for and detect zero-coefficient bit-planes. The zero-coefficient bit-plane count calculation portion 561 calculates the number of zero-coefficient bit-planes per code block by counting the number of times a zero-coefficient bit-plane is detected through the search. The zero-coefficient bit-plane count calculation portion 561 supplies the zero-coefficient bit-plane count thus calculated to the non-zero bit-plane count calculation portion 562.

In turn, the non-zero bit-plane count calculation portion 562 calculates the number of non-zero bit-planes using the number of the zero-coefficient bit-planes calculated by the zero-coefficient bit-plane count calculation portion 561.

Figure 38:
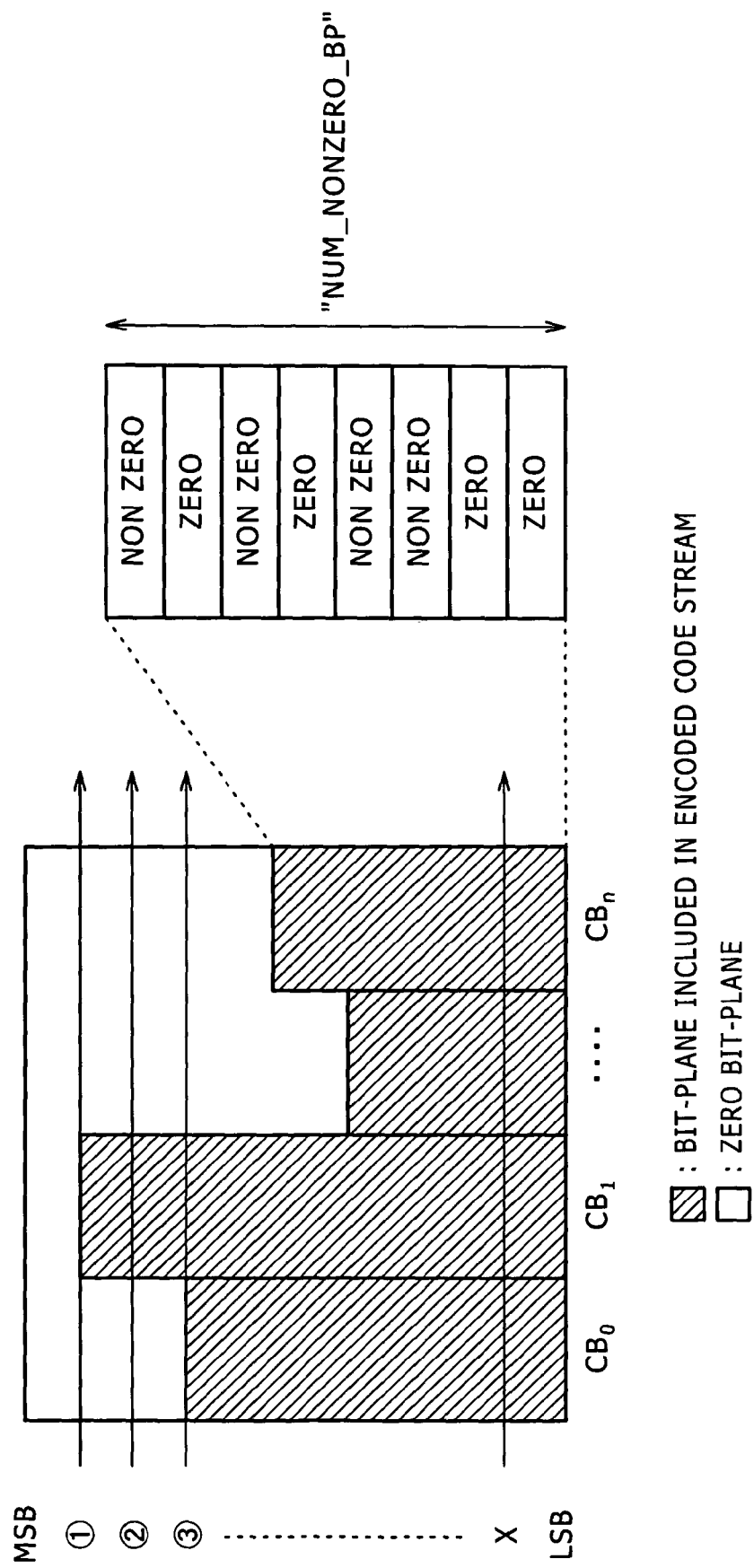
FIG. 38 is a schematic view explanatory of non-zero bit planes.

FIG. 38 is a schematic view explanatory of how effective bit-planes are structured for as many as (n+1) code blocks ($CB_0$, $CB_1$, ..., $CB_n$) having undergone bit-plane development. In the example of FIG. 38, blank areas denote zero bit-planes and shaded areas represent effective bit-planes. Each effective bit-plane (shaded) is constituted by zero-coefficient bit-planes (Zero) and non-zero bit-planes (Non Zero) as shown in FIG. 38. In the case of FIG. 38, the effective bit-planes for the code block $CB_n$ are formed by Non Zero, Zero, Non Zero, Zero, Non Zero, Non Zero, Zero, and Zero, in that order from the MSB down. That means the number of non-zero bit-planes (NUM_NONZERO_BP) is four given as the difference between the number of effective bit-planes (NUM_BP) and the number of zero-coefficient bit-planes (NUM_ZERO_BP).

As described, the number of non-zero bit-planes is determined independently for each code block, i.e., the unit in which bit-plane development is carried out. Removing zero-coefficient bit-planes from effective bit-planes makes it possible to better express the code quantity of the reversibly encoded code stream. That is, based on the number of non-zero bit-planes, the encoding apparatus 500 can roughly estimate (more accurately than when the number of effective bit-planes is used) the degree of difficulty in encoding picture data.

The non-zero bit-plane count calculation portion 562 calculates the number of non-zero bit-planes per code block and supplies the result of the calculation to the total sum calculation portion 563. The non-zero bit-plane count calculation portion 562 thus calculates the non-zero bit-plane count for each of the sub-bands of wavelet coefficients. Although the slice level count for wavelet transformation is not limited to any specific number, it is assumed for the ensuing description that wavelet transformation is performed up to a slice level of 3. That is, the sub-band structure is the same as what is shown in FIG. 4, ranging from $0_{LL}$ to $3_{HH}$.

The non-zero bit-plane count calculation portion 562 calculates the number of non-zero bit-planes regarding the structure of each component (e.g., brightness Y and color differences Cb and Cr). Although the component structure is not limited to anything specific, the commonly used components made up of brightness Y and color differences Cb and Cr are explained below.

The total sum calculation portion 563 calculates the total sum (ALL_NUM_NONZERO_BP) per picture of the effective bit-plane counts calculated by the non-zero bit-plane count calculation portion 562, using the following expression (6):

$$\text{ALL\_NUM\_NONZERO\_BP} = \qquad (6)$$
$$\Sigma_{(0_{LL},\ ...\ ,3_{HH})}\text{NUM\_NONZERO\_BP\_Y} +$$
$$\Sigma_{(0_{LL},\ ...\ ,3_{HH})}\text{NUM\_NONZERO\_BP\_Cb} +$$
$$\Sigma_{(0_{LL},\ ...\ ,3_{HH})}\text{NUM\_NONZERO\_BP\_Cr}$$

where NUM_NONZERO_BP_Y denotes the number of non-zero bit-planes for brightness Y; NUM_NONZERO_BP_Cb represents the number of non-zero bit-planes regarding color difference Cb; and NUM_NONZERO_BP_Cr stands for the number of non-zero bit-planes with regard to color difference Cr. $\Sigma(0_{LL}, \ldots, 3_{HH})$ indicates the total sum for all sub-bands ($0_{LL}$ through $3_{HH}$) of the numbers of non-zero bit-planes regarding each of the components (Y, Cb, Cr).

The total sum calculation portion 563 supplies the target bit rate calculation portion 565 with the total sum (ALL_NUM_NONZERO_BP) per picture of the non-zero bit-plane counts thus calculated.

The target bit rate acquisition portion 564 acquires the irreversible encoding target bit rate (TR) supplied by the irreversible encoding block 112. The target bit rate acquisition portion 564 supplies the acquired irreversible encoding target bit rate (TR) to the target bit rate calculation portion 565.

The target bit rate calculation portion 565 acquires the total sum (ALL_NUM_NONZERO_BP) per picture of the numbers of non-zero bit-planes from the total sum calculation portion 563. The target bit rate calculation portion 565 also acquires the irreversible encoding target bit rate (TR) from the target bit rate acquisition portion 564. The target bit rate calculation portion 565 further acquires a predetermined non-zero bit-plane count for use as a reference value (Ref_ALL_NUM_NONZERO_BP). The reference value (Ref_ALL_NUM_NONZERO_BP) may be furnished in advance and may be held by the target bit rate calculation portion 565 in an internal memory or the like, not shown.

The target bit rate calculation portion 565 acquires the decoding target bit rate (Target_Rate) as the target bit rate for the picture data to be acquired by the partial decoding block 111 through its decoding process, using the total sum (ALL_NUM_NONZERO_BP) per picture of the numbers of non-zero bit-planes, irreversible encoding target bit rate (TR), and reference value (Ref_ALL_NUM_NONZERO_BP). The target bit rate calculation portion 565 calculates the decoding target bit rate (Target_Rate) illustratively by use of the following expression (7):

$$\text{Target\_Rate} = TR \times \frac{\text{ALL\_NUM\_NONZERO\_BP}}{\text{Ref\_ALL\_NUM\_NONZERO\_BP}} \qquad (7)$$

With the expression (7) above, the target bit rate calculation portion 565 determines the decoding target bit rate (Target_Rate) in accordance with the relative ratio of the total sum (ALL_NUM_NONZERO_BP) per picture of non-zero bit-plane counts to the reference value (Ref_ALL_NUM_NONZERO_BP). Specifically, if the total sum (ALL_NUM_NONZERO_BP) of non-zero bit-plane counts is larger than the reference value (Ref_ALL_NUM_NONZERO_BP), the target bit rate calculation portion 565 sets the decoding target bit rate (Target_Rate) to be higher than the irreversible encoding target bit rate (TR) in order to allow for a large code quantity of the code stream derived from reversible encoding.

Conversely, if the total sum (ALL_NUM_NONZERO_BP) of non-zero bit-plane counts is smaller than the reference value (Ref_ALL_NUM_NONZERO_BP), then the target bit rate calculation portion 565 sets the decoding target bit rate (Target_Rate) to be lower than the irreversible encoding target bit rate (TR) so as to allow for a small code quantity of the code stream derived from reversible encoding.

When the target bit rate calculation portion 565 determines the decoding target bit rate in accordance with the relative ratio of the total sum of effective bit-plane counts to a predetermined reference value as described, it is possible to determine the decoding target bit rate in an easier and more appropriate manner than before.

The decoding target bit rate may be obtained by any other suitable method. That is, methods, expressions, etc., other than the expression (7) above may be utilized if appropriate.

The target bit rate calculation portion 565 supplies the decoding target bit rate (Target_Rate) thus calculated to the partial decoding block 111. Based on the supplied decoding target bit rate, the partial decoding block 111 calculates the target compression rate at which the baseband picture data generated through decoding is to be compressed relative to the master (original) picture data. The partial decoding block 111 partially decodes the code stream of the reversibly compressed file into baseband picture data. The partial decoding block 111 proceeds to supply the generated baseband picture data (decoded picture data) to the irreversible encoding block 112.

The irreversible encoding block 112 encodes the baseband picture data at a desired compression rate irreversibly in accordance with the JPEG 2000 standard, and outputs the resulting code stream. In this case, the irreversible encoding block 112 supplies the irreversible encoding target bit rate to the partial decoding rate control block 522, instead of feeding a target compression rate to the partial decoding block 111.

Figure 39:
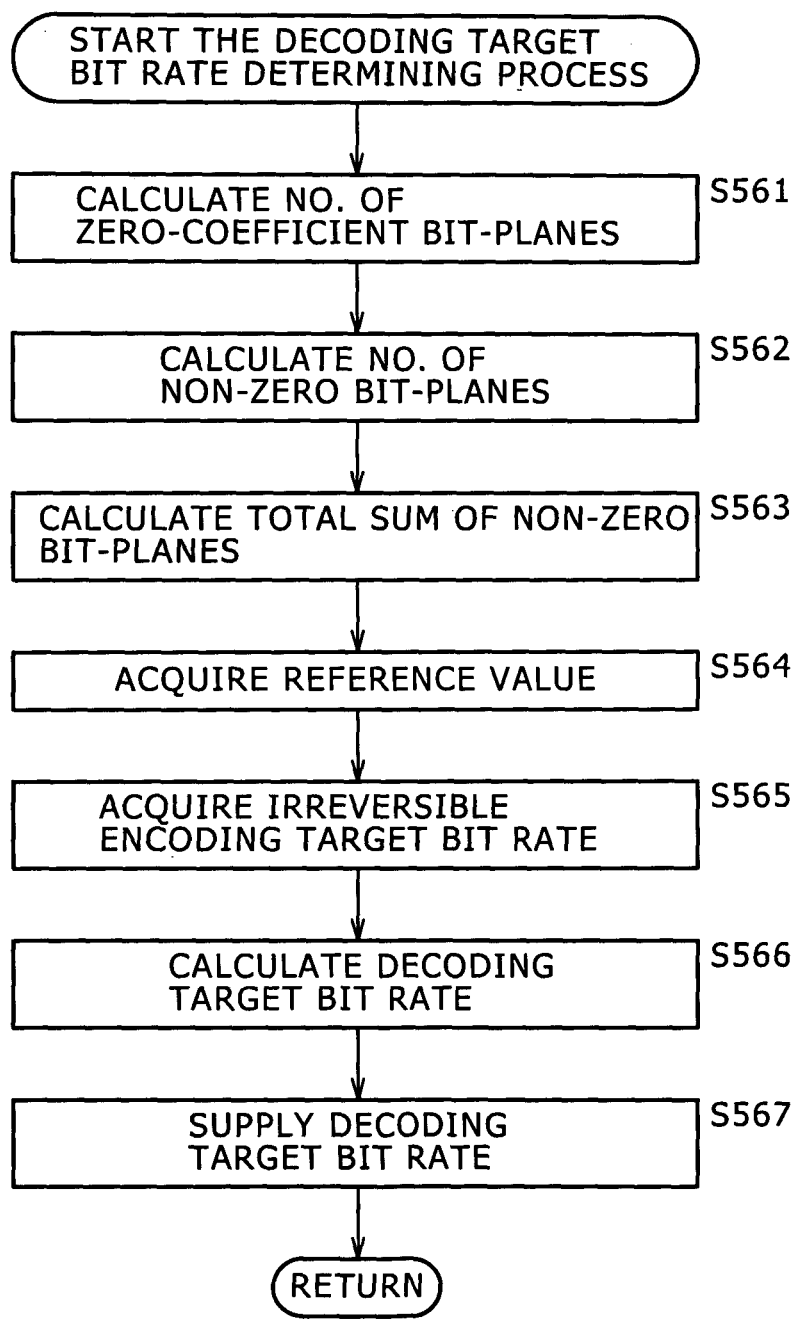
FIG. 39 is a flowchart of steps constituting another decoding target bit rate determining process.

Described below in reference to the flowchart of FIG. 39 is the decoding target bit rate determining process carried out in this case in step S502 of FIG. 32.

When the decoding target bit rate determining process is started, the zero-coefficient bit-plane count calculation portion 561 in the partial decoding rate control block 522 goes to step S561 and calculates the number of zero-coefficient bit-planes. In step S562, the non-zero bit-plane count calculation portion 562 calculates the number of non-zero bit-planes from the zero-coefficient bit-plane count. In step S563, the total sum calculation portion 563 calculates the total sum of the numbers of non-zero bit-planes regarding all code blocks of the picture being processed (i.e., structures of all sub-bands and components). In step S564, the target bit rate calculation portion 565 acquires a reference value. In step S565, the target bit rate acquisition portion 564 acquires an irreversible encoding target bit rate.

In step S566, the target bit rate calculation portion 565 calculates a decoding target bit rate using the total sum of the numbers of non-zero bit-planes acquired in step S563, the reference value obtained in step S564, and the irreversible encoding target bit rate gained in step S565.

In step S567, the target bit rate calculation portion 565 supplies the decoding target bit rate calculated in step S566 to the partial decoding block 111.

Upon receipt of the decoding target bit rate, the partial decoding rate control block 522 terminates the decoding target bit rate determining process. Control is then returned to step S502 of FIG. 32, and step S503 and subsequent steps are carried out.

As described above, the partial decoding rate control block 522 acquires the decoding target bit rate based on the encoding parameter (number of non-zero bit-planes) for the reversible encoding performed by the reversible encoding block 101. The partial decoding block 111 performs the decoding process using the decoding target bit rate. That is, the partial decoding block 111 roughly estimates the degree of difficulty in encoding picture data on the basis of the number of non-zero bit-planes for reversible encoding. The partial decoding block 111 then carries out its decoding process (partial decoding process) using the decoding target bit rate established in keeping with the estimated degree of difficulty. In this manner, the partial decoding block 111 can generate the decoded picture data at a bit rate reflecting the degree of difficulty in encoding picture data. This allows the irreversible encoding block 112 to perform irreversible encoding using the variable bit rate scheme in easier and more appropriate fashion than before. That is, the irreversible transcoding unit 502 can transform the reversibly encoded code stream into an irreversibly encoded code stream more easily and appropriately using the variable bit rate scheme. In other words, the encoding apparatus 500 can encode picture data at diverse compression rates more easily and adequately than usual even if the master picture has a large data size.

In the above example, steps S501 and S502 may also be carried out parallelly in the transcoding process of FIG. 32. During that time, the partial decoding rate control block 522 may calculate some other information equivalent to the bit rate such as a compression rate or a code quantity for use as the target value. Likewise, the information supplied by the irreversible encoding block 112 to the partial decoding rate control block 522 may be something other than bit rates.

In the foregoing description, the total sum calculation portion 563 was shown to calculate the total sum of the non-zero bit-plane counts regarding all code blocks. Alternatively, the total sum calculation portion 563 may calculate the total sum of the numbers of non-zero bit-planes with regard to only part of the code blocks (i.e., representative code blocks) within the picture. Based on the total sum thus obtained, the target bit rate calculation portion 565 may calculate the decoding target bit rate.

Described above were three methods by which to calculate the decoding target bit rate. The first, the second, and the third methods were shown to use the number of effective bit-planes, the number of encoding passes, and the number of non-zero bit-planes, respectively.

Of the above three methods, the second method was shown capable of acquiring the number of encoding passes by simply referencing the packet header. Given that the encoding pass count corresponds to the code quantity, the second method is easier to implement than the other two methods and provides the most appropriate value for use as the encoding target bit rate (i.e., the second method makes it possible to estimate the necessary code quantity more suitably than the other two methods).

By contrast, the first method involves obtaining the number of effective bit-planes simply from the number of zero bit-planes. For that reason, the first method is generally easier to implement than the third method but entails more complicated processing than the second method. Since it does not consider the actual code quantity of effective bit-planes, the first method can only permit acquisition of a more roughly estimated value of the decoding target bit rate than the other two methods (i.e., the first method has the lowest accuracy in estimating the necessary code quantity).

Meanwhile, the third method requires referencing all encoded data, so that it generally entails more complicated processing than the other two methods. Still, given that it considers the code quantity within effective bit-planes (i.e., non-zero bit-plane count), the third method permits acquisition of a more appropriate value of the decoding target bit rate than the first method (i.e., the third method is capable of estimating the necessary code quantity more suitably than the first method).

In practice, an appropriate method should preferably be selected and implemented with diverse conditions taken into account, including hardware throughput and the characteristics of the picture data to be processed. The method for calculating the decoding target bit rate may be determined in advance or may be selected from a plurality of options when the transcoding process is to be executed.

In the foregoing description, the partial decoding rate control block 522 was shown to compare the encoding parameter with the reference value before calculating the decoding target bit rate based on the relative ratio therebetween. Alternatively, the partial decoding rate control block 522 may reference predetermined table information in order to obtain the decoding target bit rate based on the encoding parameter.

Figure 40:
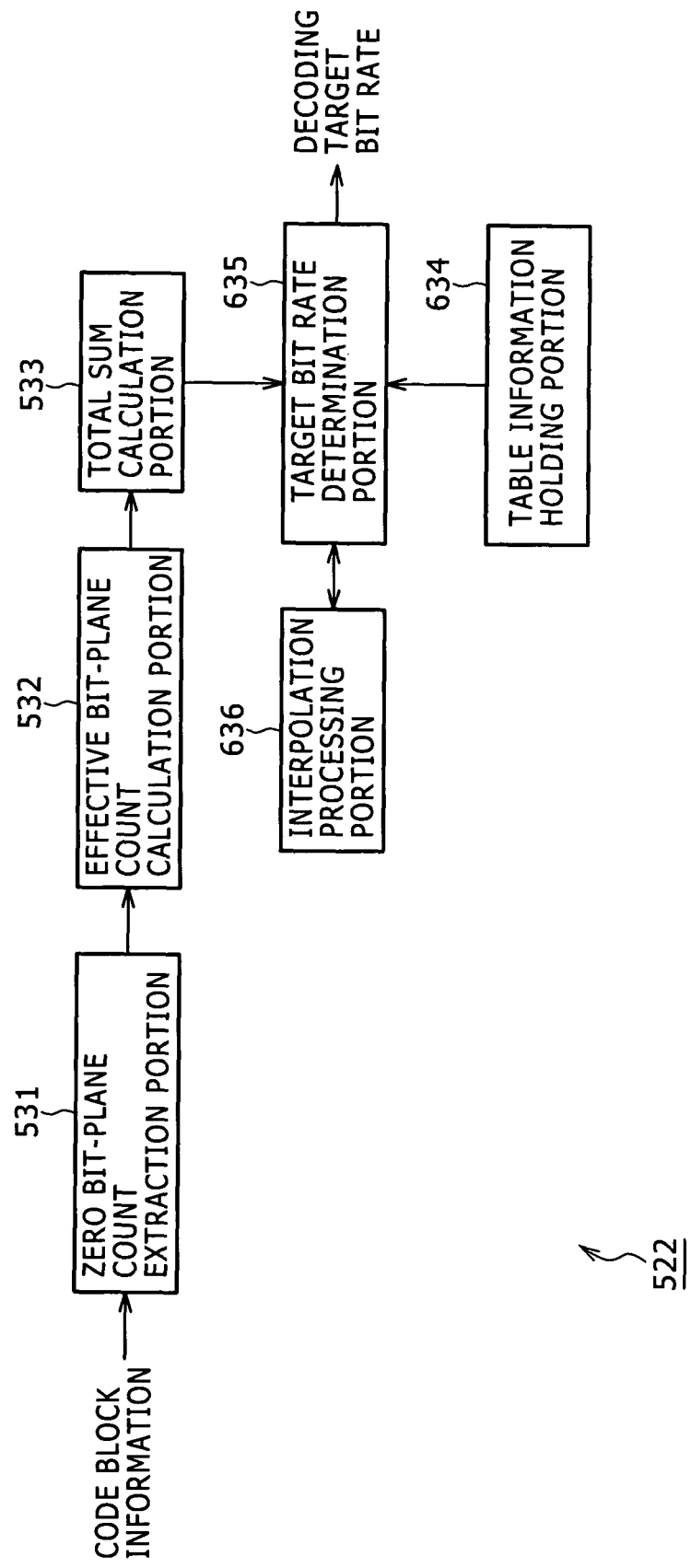
FIG. 40 is a block diagram showing another typical structure of the partial decoding rate control block.

FIG. 40 is a block diagram showing a detailed structure of the partial decoding rate control block 522 in effect when the decoding target bit rate is acquired from the number of effective bit-planes using table information. As shown in FIG. 40, the partial decoding rate control block 522 just like its counterpart in FIG. 30 has a zero bit-plane count extraction portion 531, an effective bit-plane count calculation portion 532, and a total sum calculation portion 533. The partial decoding rate control block 522 of FIG. 40 further includes a table information holding portion 634, a target bit rate determination portion 635, and an interpolation processing portion 636 replacing the target bit rate acquisition portion 534 and target bit rate calculation portion 535 in FIG. 30.

The table information holding portion 634 holds table information that indicates the corresponding relations between the total sum of effective bit-plane counts per picture on the one hand and decoding target bit rates on the other hand. The table information holding portion 634 supplies the table information to the target bit rate determination portion 635 as needed.

FIG. 41 is a schematic view explanatory of typical table information held by the table information holding portion 634. The table information 601 shown in FIG. 41 is a table of information indicative of the correspondence between the total sum of effective bit-plane counts per picture (ALL_NUM_BP) on the one hand and decoding target bit rates (Target_Rate) on the other hand. The table information 601 shows representative values of the total sum of effective bit-plane counts per picture (ALL_NUM_BP) in association with the decoding target bit rates (Target_Rate) corresponding to these representative values.

In the example of FIG. 41, the table information 601 lists "50 or less," "100," "500," "1000," "1500," "1800," and "2000 or higher" as the representative values of the total sum of effective bit-plane counts per picture (ALL_NUM_BP). These representative values are associated respectively with "50 Mbps," "100 MBps," "200 Mbps," "250 Mbps," "275 Mbps," "300 Mbps," and "350 Mbps" given as the corresponding decoding target bit rates (Target_Rate). Whereas the reference value (Ref_ALL_NUM_BP) is not limited to any specific number, the number "1000" is established for the example of FIG. 41.

By referencing the table information 601, the target bit rate determination portion 635 acquires the decoding target bit rate (Target_Rate) corresponding to the representative value of the total sum of effective bit-plane counts for a given picture (ALL_NUM_BP). For example, if the total sum of effective bit-plane counts for the picture of interest (ALL_NUM_BP) is "1000," then the target bit rate determination portion 635 determines the decoding target bit rate (Target_Rate) as "250 Mbps" in reference to the table information 601 of FIG. 41.

Under control of the target bit rate determination portion 635, the interpolation processing portion 636 performs an interpolating process on the table information 601 held by the table information holding portion 634. Illustratively, there may be cases where the total sum of effective bit-plane counts for the picture in question (ALL_NUM_BP) calculated by the total sum calculation portion 533 is something other than the representative values in the table information 601. In such a case, the target bit rate determination portion 635 is unable to acquire an appropriate decoding target bit rate (Target_Rate) by referring to the table information 601. The target bit rate determination portion 635 then causes the interpolation processing portion 636 to interpolate the table information 601 so as to obtain the decoding target bit rate (Target_Rate) corresponding to the total sum of effective bit-plane counts for the picture in question (ALL_NUM_BP).

The interpolating process is not limited to anything specific. Illustratively, the decoding target bit rate (Target_Rate) may be changed in linear fashion. That is, based on the relations between the representative values included in the table information 601 on the one hand and the total sum of effective bit-plane counts for the picture in question (ALL_NUM_BP) calculated by the total sum calculation portion 533 on the other hand, the interpolation processing portion 636 may linearly change the decoding target bit rate (Target_Rate) corresponding to the applicable representative value of the total sum. The interpolating process thus provides the decoding target bit rate (Target_Rate) corresponding to the total sum of effective bit-plane counts for the picture in question (ALL_NUM_BP) calculated by the total sum calculation portion 533.

As another example, the decoding target bit rate (Target_Rate) may be changed in stepped fashion with regard to the representative values. That is, the interpolation processing portion 636 may adopt the decoding target bit rate (Target_Rate) corresponding to the largest of those representative values in the table information 601 which are smaller than the total sum of effective bit-plane counts for the picture of interest (ALL_NUM_BP) calculated by the total sum calculation portion 533. Conversely, the interpolation processing portion 636 may adopt the decoding target bit rate (Target_Rate) corresponding to the smallest of those representative values in the table information 601 which are larger than the total sum of effective bit-plane counts for the picture in question (ALL_NUM_BP) calculated by the total sum calculation portion 533.

The interpolation processing portion 636 supplies the decoding target bit rate (Target_Rate) thus obtained to the target bit rate determination portion 635. In turn, the target bit rate determination portion 635 forwards the supplied decoding target bit rate (Target_Rate) to the partial decoding block 111.

Figure 42:
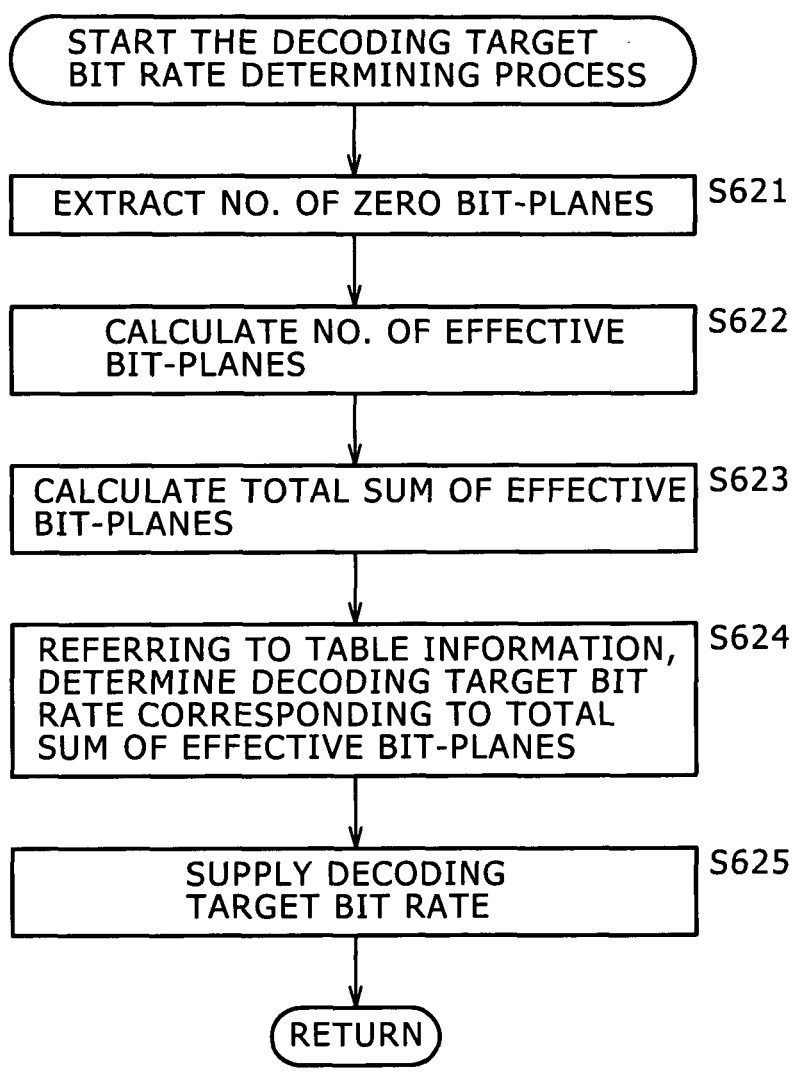
FIG. 42 is a flowchart of steps constituting another decoding target bit rate determining process.

Described below in reference to the flowchart of FIG. 42 is the decoding target bit rate determining process carried out in this case in step S502 of FIG. 32.

When the decoding target bit rate determining process is started, the zero bit-plane count extraction portion 531 in the partial decoding rate control block 522 goes to step S621 and extracts the number of zero bit-planes. In step S622, the effective bit-plane count calculation portion 532 calculates the number of effective bit-planes from the zero bit-plane count. In step S623, the total sum calculation portion 533 calculates the total sum of the numbers of effective bit-planes regarding all code blocks of the picture being processed (i.e., structures of all sub-bands and components).

In step S624, the target bit rate determination portion 635 determines the decoding target bit rate corresponding to the total sum of effective bit-plane counts per picture calculated in step S623 by referencing the table information 601 held by the table information holding portion 634. At this point, the interpolation processing portion 636 interpolates the table information 601 as needed.

In step S625, the target bit rate determination portion 635 supplies the partial decoding block 111 with the decoding target bit rate calculated in step S624.

With the decoding target bit rate supplied, the partial decoding rate control block 522 terminates the decoding target bit rate determining process. Control is then returned to step S502 of FIG. 32, and step S503 and subsequent steps are carried out.

As described above, the partial decoding rate control block 522 readily acquires the decoding target bit rate based on the encoding parameter (number of effective bit-planes) for the reversible encoding performed by the reversible encoding block 101, through the use of the table information 601. The partial decoding block 111 performs the decoding process using the decoding target bit rate thus obtained. That is, the partial decoding block 111 carries out its decoding process (partial decoding process) at the decoding target bit rate reflecting the number of effective bit-planes for reversible encoding. The partial decoding block 111 can then generate decoded picture data at a bit rate commensurate with the degree of difficulty in encoding picture data. This allows the irreversible encoding block 112 to perform irreversible encoding using the variable bit rate scheme in easier and more appropriate fashion than before. That is, the irreversible transcoding unit 502 can transform the reversibly encoded code stream into an irreversibly encoded code stream more easily and appropriately using the variable bit rate scheme. In other words, the encoding apparatus 500 can encode picture data at diverse compression rates more easily and adequately than usual even if the master picture has a large data size.

As an alternative to what was described above, the partial decoding rate control block 522 may calculate information equivalent to the bit rate such as a compression rate or a code quantity for use as the target value. Likewise, the information supplied by the irreversible encoding block 112 to the partial decoding rate control block 522 may be information other than bit rates.

As another alternative, the total sum calculation portion 533 may calculate the total sum of the numbers of effective bit-planes with regard to only part of the code blocks (i.e., representative code blocks) within the picture. Based on the total sum thus obtained, the target bit rate determination portion 635 may calculate the decoding target bit rate.

Where the number of encoding passes is used as the encoding parameter (i.e., code block information), the table information may also be used to determine the decoding target bit rate as in the above-described case involving the number of effective bit-planes.

Figure 43:
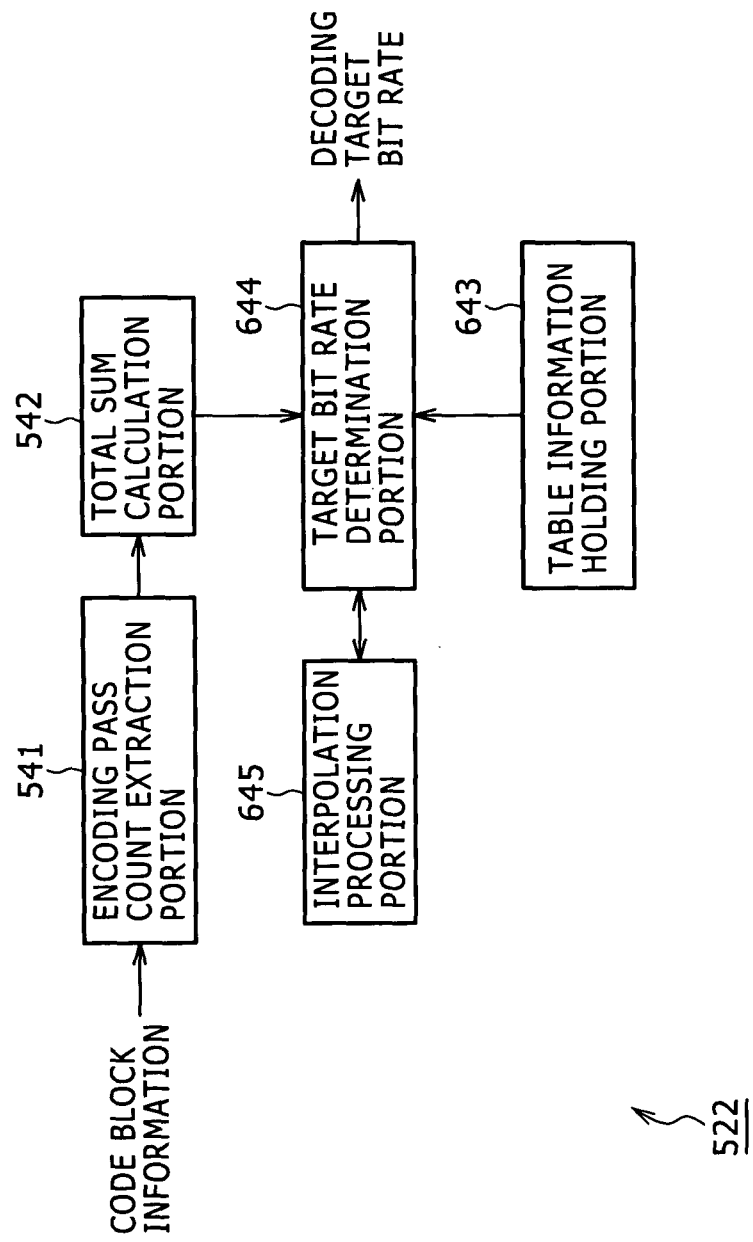
FIG. 43 is a block diagram showing another typical structure of the partial decoding rate control block.

FIG. 43 is a block diagram showing a detailed structure of the partial decoding rate control block 522 in effect when the decoding target bit rate is acquired from the number of encoding passes using table information. As shown in FIG. 43, the partial decoding rate control block 522 just like its counterpart in FIG. 34 has an encoding pass count extraction portion 541 and a total sum calculation portion 542. The partial decoding rate control block 522 of FIG. 43 further includes a table information holding portion 643, a target bit rate determination portion 644, and an interpolation processing portion 645 replacing the target bit rate acquisition portion 543 and target bit rate calculation portion 544 in FIG. 34.

The table information holding portion 643 holds an information table that indicates the corresponding relations between the total sum of encoding pass counts per picture on the one hand and decoding target bit rates on the other hand. The table information holding portion 643 supplies the table information to the target bit rate determination portion 644 as needed. The structure of the table information is basically the same as that of the table information 601 in FIG. 41 involving the numbers of effective bit-planes. As such, the table information is constituted by representative values of the total sum of encoding pass counts per picture (ALL_NUM_CP) in association with the decoding target bit rates (Target_Rate) corresponding to these representative values.

By referencing the table information, the target bit rate determination portion 644 acquires the decoding target bit rate (Target_Rate) corresponding to the representative value of the total sum of encoding pass counts for a given picture (ALL_NUM_CP).

Under control of the target bit rate determination portion 644, the interpolation processing portion 645 performs an interpolating process on the table information held by the table information holding portion 643. As in the above-mentioned case involving the number of effective bit-planes, the interpolating process is not limited to anything specific.

The interpolation processing portion 645 supplies the decoding target bit rate (Target_Rate) thus obtained to the target bit rate determination portion 644. In turn, the target bit rate determination portion 644 forwards the supplied decoding target bit rate (Target_Rate) to the partial decoding block 111.

Figure 44:
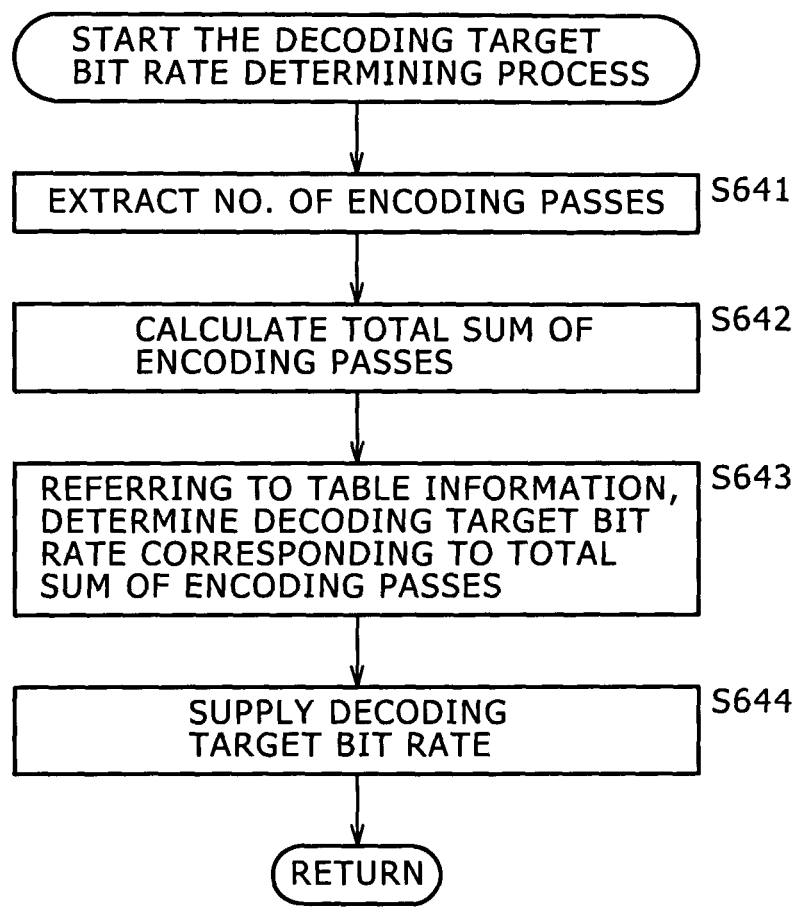
FIG. 44 is a flowchart of steps constituting another decoding target bit rate determining process.

Described below in reference to the flowchart of FIG. 44 is the decoding target bit rate determining process carried out in this case in step S502 of FIG. 32.

When the decoding target bit rate determining process is started, the encoding pass count extraction portion 541 in the partial decoding rate control block 522 goes to step S641 and extracts the number of encoding passes. In step S642, the total sum calculation portion 542 calculates the total sum of the numbers of encoding passes regarding all code blocks of the picture being processed (i.e., structures of all sub-bands and components).

In step S643, the target bit rate determination portion 644 determines the decoding target bit rate corresponding to the total sum of encoding pass counts per picture calculated in step S642 by referencing the table information held by the table information holding portion 643. At this point, the interpolation processing portion 645 interpolates the table information as needed.

In step S644, the target bit rate determination portion 644 supplies the partial decoding block 111 with the decoding target bit rate calculated in step S643.

With the decoding target bit rate supplied, the partial decoding rate control block 522 terminates the decoding target bit rate determining process. Control is then returned to step S502 of FIG. 32, and step S503 and subsequent steps are carried out.

As described above, the partial decoding rate control block 522 readily acquires the decoding target bit rate based on the encoding parameter (number of encoding passes) for the reversible encoding performed by the reversible encoding block 101, through the use of the table information. The partial decoding block 111 performs the decoding process using the decoding target bit rate thus obtained. That is, the partial decoding block 111 carries out its decoding process (partial decoding process) at the decoding target bit rate reflecting the number of encoding passes for reversible encoding. The partial decoding block 111 can then generate decoded picture data at a bit rate commensurate with the degree of difficulty in encoding picture data. This allows the irreversible encoding block 112 to perform irreversible encoding using the variable bit rate scheme in easier and more appropriate fashion than before. That is, the irreversible transcoding unit 502 can transform the reversibly encoded code stream into an irreversibly encoded code stream more easily and appropriately using the variable bit rate scheme. In other words, the encoding apparatus 500 can encode picture data at diverse compression rates more easily and adequately than usual even if the master picture has a large data size.

As an alternative to what was described above, the partial decoding rate control block 522 may calculate information equivalent to the bit rate such as a compression rate or a code quantity for use as the target value. Likewise, the information supplied by the irreversible encoding block 112 to the partial decoding rate control block 522 may be information other than bit rates.

As another alternative, the total sum calculation portion 542 may calculate the total sum of the numbers of encoding passes with regard to only part of the code blocks (i.e., representative code blocks) within the picture. Based on the total sum thus obtained, the target bit rate determination portion 644 may calculate the decoding target bit rate.

Where the number of non-zero bit-planes is used as the encoding parameter (i.e., code block information), the table information may also be used to determine the decoding target bit rate as in the above-described cases involving the number of effective bit-planes and the number of encoding passes.

Figure 45:
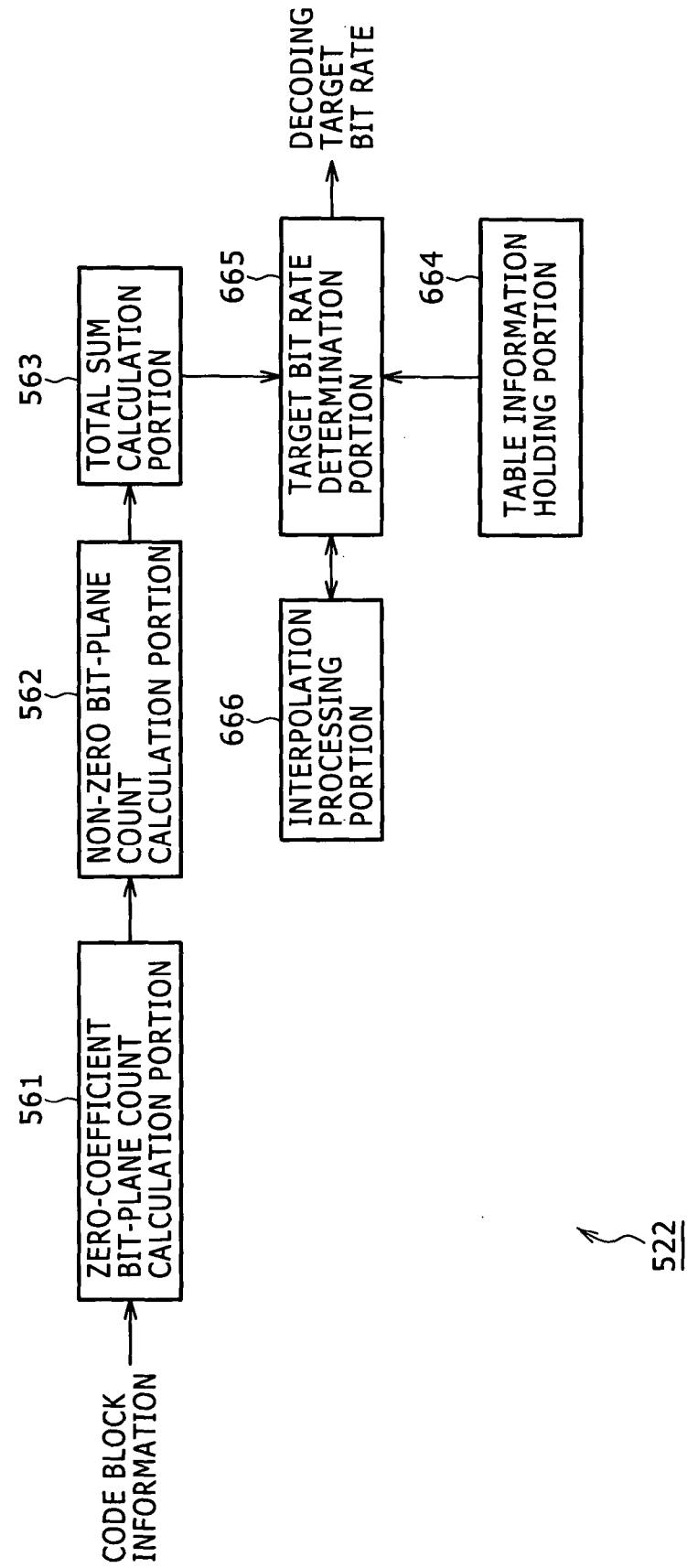
FIG. 45 is a block diagram showing another typical structure of the partial decoding rate control block.

FIG. 45 is a block diagram showing a detailed structure of the partial decoding rate control block 522 in effect when the decoding target bit rate is acquired from the number of non-zero bit-planes using table information. As shown in FIG. 45, the partial decoding rate control block 522 just like its counterpart in FIG. 37 has a zero-coefficient bit-plane count calculation portion 561, a non-zero bit-plane count calculation portion 562, and a total sum calculation portion 563. The partial decoding rate control block 522 of FIG. 45 further includes a table information holding portion 664, a target bit rate determination portion 665, and an interpolation processing portion 666 replacing the target bit rate acquisition portion 564 and target bit rate calculation portion 565 in FIG. 37.

The table information holding portion 664 holds an table information that indicates the corresponding relations between the total sum of effective bit-plane counts per picture on the one hand and decoding target bit rates on the other hand. The table information holding portion 664 supplies the table information to the target bit rate determination portion 665 as needed. The structure of the table information is basically the same as that of the table information 601 in FIG. 41 involving the numbers of effective bit-planes. As such, the table information is constituted by representative values of the total sum of non-zero bit-plane counts per picture (ALL_NUM_NONZERO_BP) in association with the decoding target bit rates (Target_Rate) corresponding to these representative values.

By referencing the table information, the target bit rate determination portion 665 acquires the decoding target bit rate (Target_Rate) corresponding to the representative value of the total sum of non-zero bit-plane counts for a given picture (ALL_NUM_NONZERO_BP).

Under control of the target bit rate determination portion 665, the interpolation processing portion 666 performs an interpolating process on the table information held by the table information holding portion 664. As in the above-mentioned cases involving the number of effective bit-planes and the number of encoding passes, the interpolating process is not limited to anything specific.

The interpolation processing portion 666 supplies the decoding target bit rate (Target_Rate) thus obtained to the target bit rate determination portion 665. In turn, the target bit rate determination portion 665 forwards the supplied decoding target bit rate (Target_Rate) to the partial decoding block 111.

Figure 46:
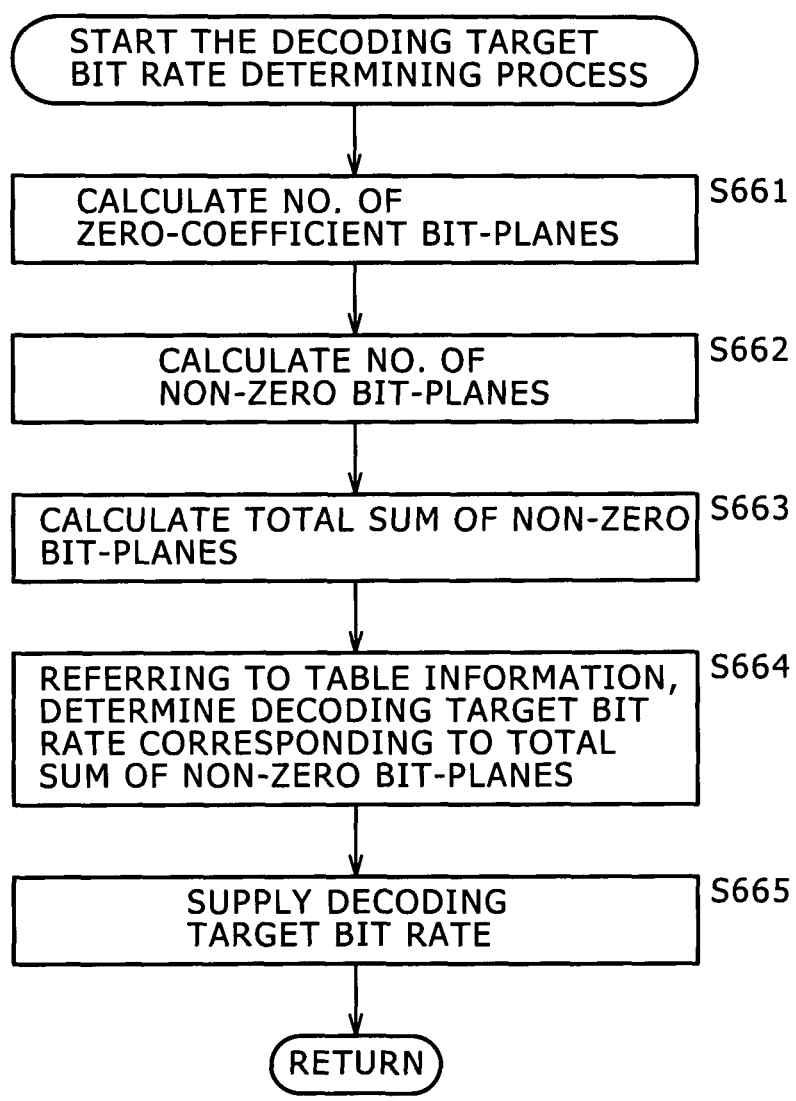
FIG. 46 is a flowchart of steps constituting another decoding target bit rate determining process.

Described below in reference to the flowchart of FIG. 46 is the decoding target bit rate determining process carried out in this case in step S502 of FIG. 32.

When the decoding target bit rate determining process is started, the zero-coefficient bit-plane count calculation portion 561 in the partial decoding rate control block 522 goes to step S661 and calculates the number of zero-coefficient bit-planes. In step S662, the non-zero bit-plane count calculation portion 562 calculates the number of non-zero bit-planes from the zero-coefficient bit-plane count. In step S663, the total sum calculation portion 563 calculates the total sum of the numbers of non-zero bit-planes regarding all code blocks of the picture being processed (i.e., structures of all sub-bands and components).

In step S664, the target bit rate determination portion 665 determines the decoding target bit rate corresponding to the total sum of non-zero bit-plane counts per picture calculated in step S663 by referencing the table information held by the table information holding portion 664. At this point, the interpolation processing portion 666 interpolates the table information as needed.

In step S665, the target bit rate determination portion 665 supplies the partial decoding block 111 with the decoding target bit rate calculated in step S664.

With the decoding target bit rate supplied, the partial decoding rate control block 522 terminates the decoding target bit rate determining process. Control is then returned to step S502 of FIG. 32, and step S503 and subsequent steps are carried out.

As described above, the partial decoding rate control block 522 readily acquires the decoding target bit rate based on the encoding parameter (number of non-zero bit-planes) for the reversible encoding performed by the reversible encoding block 101, through the use of the table information. The partial decoding block 111 performs the decoding process using the decoding target bit rate thus obtained. That is, the partial decoding block 111 carries out its decoding process (partial decoding process) at the decoding target bit rate reflecting the number of non-zero bit-planes for reversible encoding. The partial decoding block 111 can then generate decoded picture data at a bit rate commensurate with the degree of difficulty in encoding picture data. This allows the irreversible encoding block 112 to perform irreversible encoding using the variable bit rate scheme in easier and more appropriate fashion than before. That is, the irreversible transcoding unit 502 can transform the reversibly encoded code stream into an irreversibly encoded code stream more easily and appropriately using the variable bit rate scheme. In other words, the encoding apparatus 500 can encode picture data at diverse compression rates more easily and adequately than usual even if the master picture has a large data size.

As an alternative to what was described above, the partial decoding rate control block 522 may calculate information equivalent to the bit rate such as a compression rate or a code quantity for use as the target value. Likewise, the information supplied by the irreversible encoding block 112 to the partial decoding rate control block 522 may be information other than bit rates.

As another alternative, the total sum calculation portion 563 may calculate the total sum of the numbers of non-zero bit-planes with regard to only part of the code blocks (i.e., representative code blocks) within the picture. Based on the total sum thus obtained, the target bit rate determination portion 665 may determine the decoding target bit rate.

In the foregoing description, the number of effective bit-planes, the number of encoding passes, or the number of non-zero bit-planes was shown to be used as the encoding parameter for reversible encoding. Alternatively, some other suitable encoding parameter may be utilized instead.

In the foregoing description, the irreversible transcoding unit 502 was shown to estimate the degree of difficulty in encoding by use of the encoding parameter for reversible encoding and to determine the decoding target bit rate accordingly. Alternatively, the degree of difficulty in encoding may be estimated (i.e., decoding target bit rate may be determined) on the basis of the result of reversible encoding.

Figure 47:
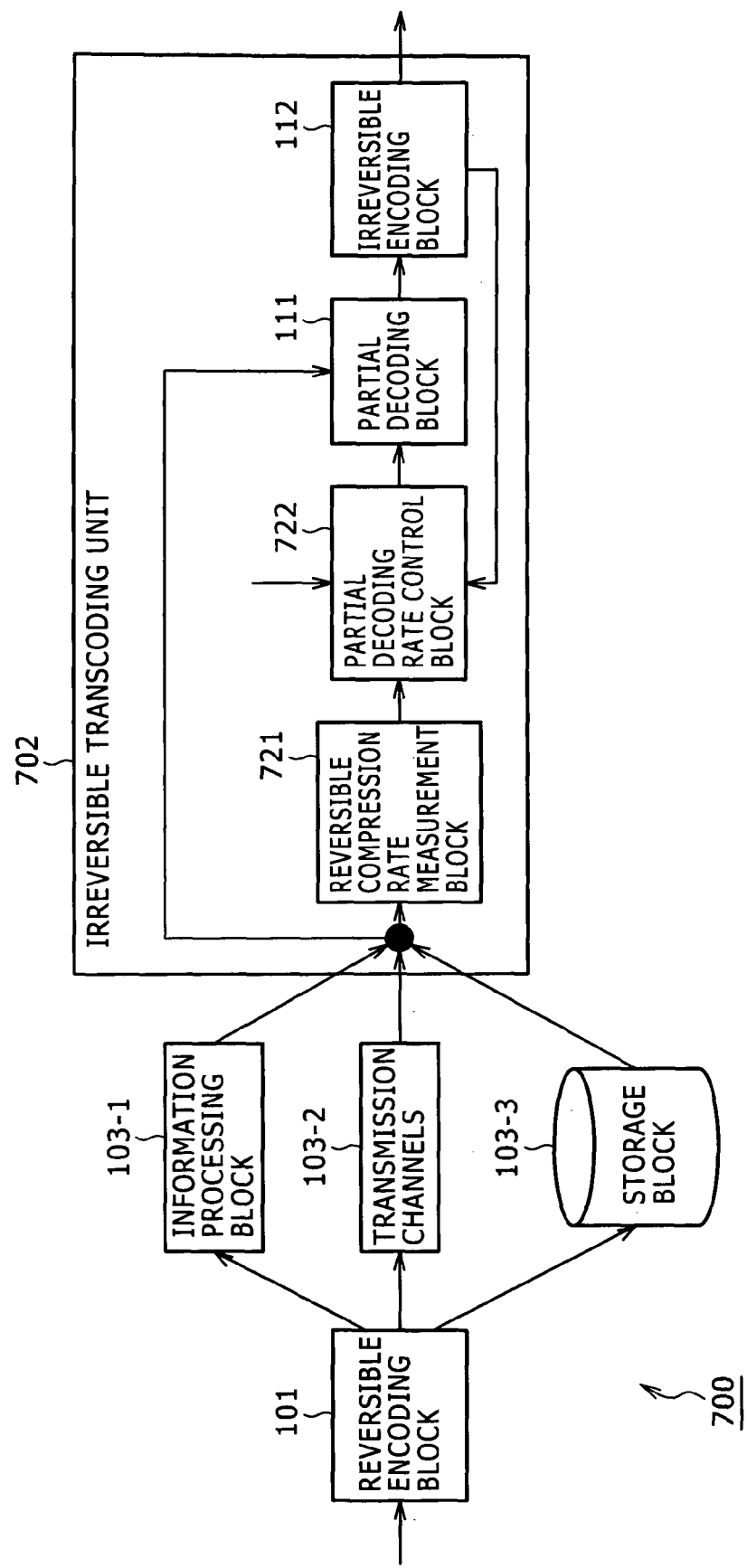
FIG. 47 is a block diagram showing a typical structure of another encoding apparatus embodying the present invention.

FIG. 47 is a block diagram showing a typical structure of another encoding apparatus 700 for use when the degree of difficulty in encoding is estimated based on the result of reversible encoding. As shown in FIG. 47, the encoding apparatus 700 is structured basically the same as the encoding apparatus 500 in FIG. 29, except that an irreversible transcoding unit 702 replaces the irreversible transcoding unit 502. The irreversible transcoding unit 702 has basically the same structure as that of the irreversible transcoding unit 502 in FIG. 29 except that the code block information extraction block 521 is replaced by a reversible compression rate measurement block 721 and the partial decoding rate control block 522 by a partial decoding rate control block 722.

The reversible compression rate measurement block 721 measures the compression rate (i.e., reversible compression rate) of the reversible encoding performed by the reversible encoding block 101, using the code stream which is supplied from the information processing block 103-1, transmission channels 103-2 or storage block 103-3 and which has resulted from the reverse encoding of picture data by the reversible encoding block 101. The reversible compression rate measurement block 721 supplies the reversible compression rate thus measured to the partial decoding rate control block 522.

The partial decoding rate control block 722 acquires the decoding target bit rate (Target_Rate) for the partial decoding block 111 using the reversible compression rate supplied by the reversible compression rate measurement block 721. The partial decoding rate control block 722 supplies the decoding target bit rate thus obtained to the partial decoding block 111. In turn, the partial decoding block 111 carries out the partial decoding process using the received decoding target bit rate.

Figure 48:
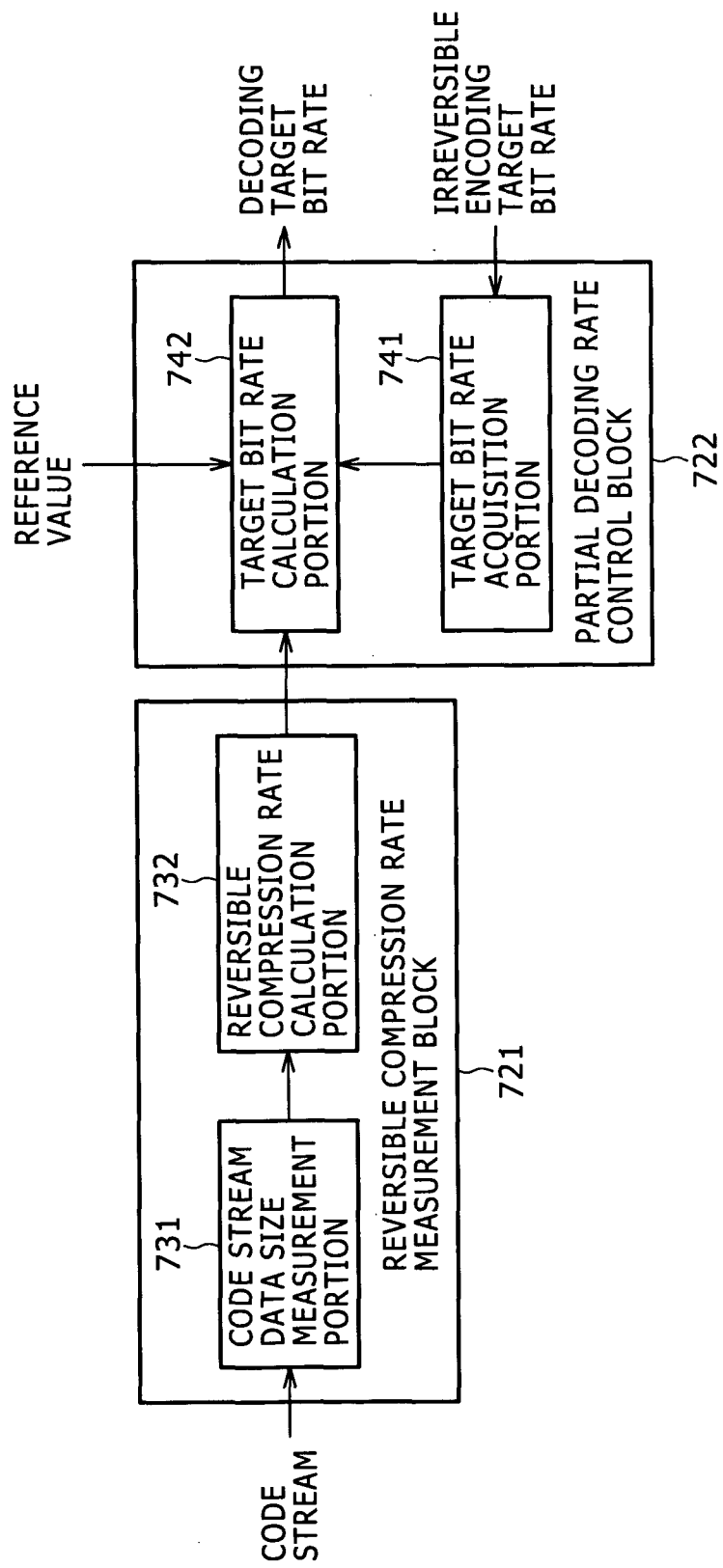
FIG. 48 is a block diagram showing typical structures of a reversible compression rate measurement block and a partial decoding rate control block.

FIG. 48 is a block diagram showing detailed structures of the reversible compression rate measurement block 721 and partial decoding rate control block 722. As shown in FIG. 48, the reversible compression rate measurement block 721 contains a code stream data size measurement portion 731 and a reversible compression rate calculation portion 732.

The code stream data size measurement portion 731 measures the data size (i.e., file size) of the code stream resulting from the reverse encoding of picture data by the reversible encoding block 101. The data size (file size) of the code stream is readily obtained illustratively by referencing file system management information. The code stream data size measurement portion 731 supplies the data size (file size) thus acquired to the reversible compression rate calculation portion 732.

The reversible compression rate calculation portion 732 calculates the reversible compression rate using the data size (file size) of the code stream supplied from the code stream data size measurement portion 731. That is, the reversible compression rate calculation portion 732 calculates the reversible compression rate (RATE_Lossless) representative of the ratio of the code stream data size (file size) to the data size (file size) of the original picture data yet to be reversibly encoded.

The data size (file size) of the original picture data yet to be reversibly encoded is easily obtained by referencing file system management information or by performing simple calculations.

Illustratively, in the case of high-definition pictures, the data size (file size) of the original picture data yet to be reversibly encoded is calculated as follows: 1920 (pixels)× 1080 (pixels)×3 (number of configured components (e.g., RGB))×8 (bit depth)×24 (number of pictures per second)× time (in seconds).

The reversible compression rate calculation portion 732 supplies the reversible compression rate (RATE_Lossless) thus calculated to the partial decoding rate control block 722.

As shown in FIG. 48, the partial decoding rate control block 722 has a target bit rate acquisition portion 741 and a target bit rate calculation portion 742.

The target bit rate acquisition portion 741 acquires the irreversible encoding target bit rate (TR) from the irreversible encoding block 112 and forwards the acquired bit rate to the target bit rate calculation portion 742.

The target bit rate calculation portion 742 acquires the reversible compression rate (RATE_Lossless) from the reversible compression rate measurement block 721. The target bit rate calculation portion 742 also obtains a predetermined reversible compression rate for use as a reference value (Ref_RATE_Lossless). The target bit rate calculation portion 742 further acquires the irreversible encoding target bit rate (TR) from the target bit rate acquisition portion 741.

The target bit rate calculation portion 742 acquires the decoding target bit rate (Target_Rate) for the partial decoding block 111 using the reversible compression rate (RATE_Lossless), irreversible encoding target bit rate (TR), and reference value (Ref_RATE_Lossless) obtained as described. Illustratively, the target bit rate calculation portion 742 calculates the decoding target bit rate (Target_Rate) using the following expression (8):

$$\text{Target\_Rate} = TR \times \frac{\text{REF\_RATE\_Lossless}}{\text{RATE\_Lossless}} \quad (8)$$

With the expression (8) above, the target bit rate calculation portion 742 determines the decoding target bit rate (Target_Rate) in accordance with the inverse of the relative ratio of the reversible compression rate (RATE_Lossless) to the reference value (Ref_RATE_Lossless). Specifically, if the reversible compression rate (RATE_Lossless) is lower than the reference value (Ref_RATE_Lossless), the target bit rate calculation portion 742 sets the decoding target bit rate (Target_Rate) to be higher than the irreversible encoding target bit rate (TR) in order to allow for a large code quantity of the code stream derived from reversible encoding.

Conversely, if the reversible compression rate (RATE_Lossless) is higher than the reference value (Ref_RATE_Lossless), then the target bit rate calculation portion 742 sets the decoding target bit rate (Target_Rate) to be lower than the irreversible encoding target bit rate (TR) so as to allow for a small code quantity of the code stream derived from reversible encoding.

When the target bit rate calculation portion 742 determines the decoding target bit rate in accordance with (the inverse of) the relative ratio of the reversible compression rate to a predetermined reference value as described, it is possible to determine the decoding target bit rate in an easier and more appropriate manner than before.

The decoding target bit rate may be obtained by any other suitable method. That is, methods, expressions, etc., other than the expression (8) above may be utilized if appropriate.

The target bit rate calculation portion 742 supplies the decoding target bit rate (Target_Rate) thus calculated to the partial decoding block 111. Based on the supplied decoding target bit rate, the partial decoding block 111 calculates the target compression rate at which the baseband picture data generated through decoding is to be compressed relative to the master (original) picture data. The partial decoding block 111 partially decodes the code stream of the reversibly compressed file into baseband picture data.

As described above, the partial decoding block 111 partially decodes (i.e., performs a partial decoding process on) the code stream of the reversibly compressed file in a manner reducing the workload of the decoding process as long as the irreversible encoding block 112 can attain the irreversible encoding target bit rate. In this case, the partial decoding block 111 determines the range of its partial decoding process based on the decoding target bit rate calculated by the target bit rate calculation portion 742.

The partial decoding block 111 supplies the generated baseband picture data (i.e., decoded picture data) to the irreversible encoding block 112.

In turn, the irreversible encoding block 112 encodes the baseband picture data at a desired compression rate irreversibly in accordance with the JPEG 2000 standard, and outputs the resulting code stream. In this case, the irreversible encoding block 112 supplies the irreversible encoding target bit rate to the partial decoding rate control block 722.

Figure 49:
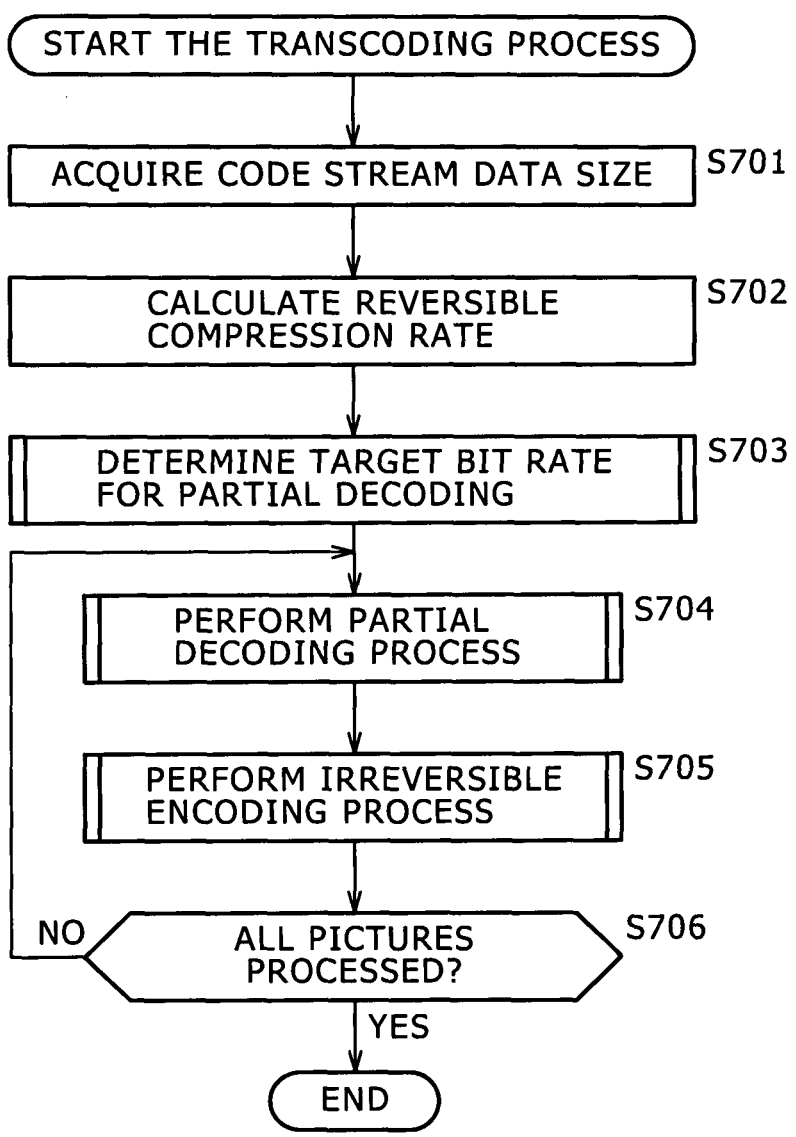
FIG. 49 is a flowchart of steps constituting another transcoding process.

FIG. 49 is a flowchart explanatory of the steps constituting the transcoding process performed by the irreversible transcoding unit 702.

When supplied with picture data from the information processing block 103-1, transmission channels 103-2 or storage block 103-3, the irreversible transcoding unit 702 starts its transcoding process. With the transcoding process started, the code stream data size measurement portion 731 goes to step S701 in FIG. 49 and acquires the data size of the code stream illustratively by referencing file system management information. In step S702, the reversible compression rate calculation portion 732 calculates the reversible compression rate (RATE_Lossless) using the code stream data size obtained in step S701.

In step S703, the partial decoding rate control block 522 determines a target bit rate for the partial decoding process (i.e., decoding target bit rate). The process of determining the target bit rate for the partial decoding will be discussed later in detail.

With the decoding target bit rate determined, the partial decoding block 111 goes to step S704. In step S704, the partial decoding block 111 performs a partial decoding process using the decoding target bit rate calculated in step S703 so as to generate decoded picture data. The partial decoding process is the same as that described above in reference to the flowchart of FIG. 18 and thus will not be discussed further. It should be noted that in step S704, the partial decoding block 111 calculates the target compression rate from the decoding target bit rate and carries out the partial decoding process using the calculated target compression rate.

In step S705, the irreversible encoding block 112 performs an irreversible encoding process. The process of step S705 is the same as that described above in reference to the flowchart of FIG. 19 and thus will not be discussed further. It should be noted that in step S705, the irreversible encoding block 112 feeds the irreversible encoding target bit rate to the partial decoding rate control block 722, instead of having the target compression rate supplied to the partial decoding block 111 as was done in step S308.

In step S706, the irreversible transcoding unit 702 checks to determine whether all pictures of the picture data have been processed. If any picture is found unprocessed in step S706, control is returned to step S704 and the subsequent processing is repeated. If in step S706 all pictures are found to have been processed, then the transcoding process is brought to an end.

In that case, the decoding target bit rate is calculated only once for the picture data. This is because the reversible compression rate calculated from the data size (file size) of the code stream is used to calculate the decoding target bit rate.

Alternatively, the reversible compression rate measurement block 721 may calculate the reversible compression rate for each of other appropriate units of picture data (e.g., in pictures). In such a case, however, the processing involved will be more complicated than what was discussed above because of the need to obtain the data size of the code stream for each of these data units (e.g., for each picture).

Figure 50:
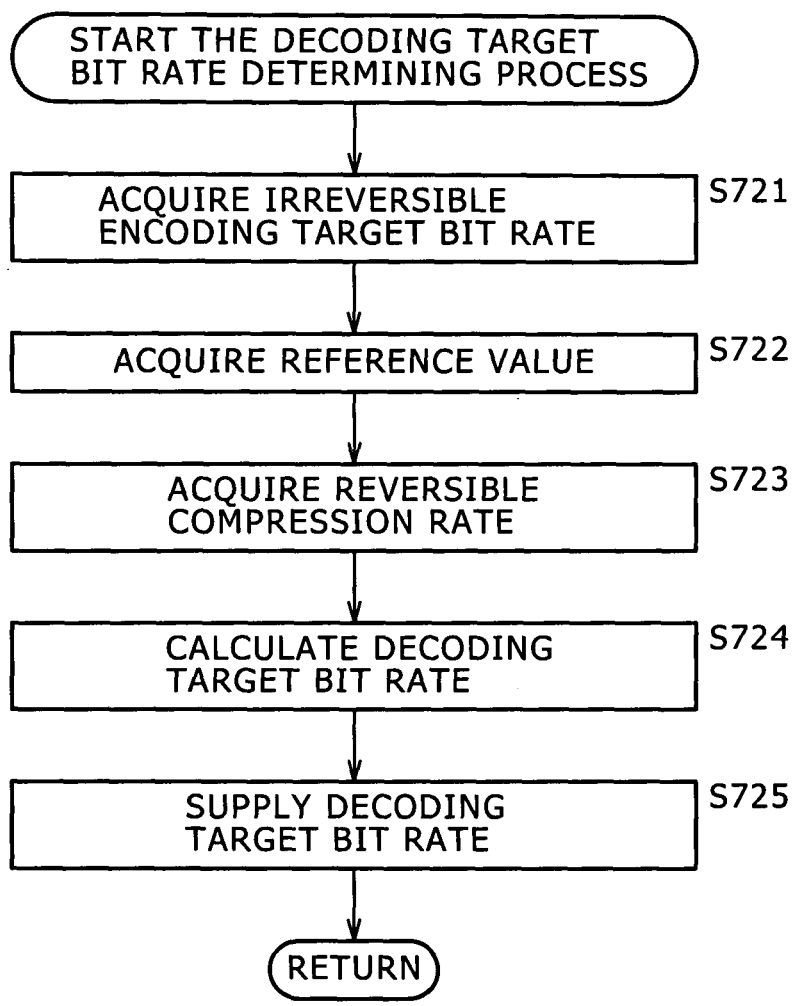
FIG. 50 is a flowchart of steps constituting another decoding target bit rate determining process.

Described below in reference to the flowchart of FIG. 50 is the decoding target bit rate determining process carried out in step S703 of FIG. 49.

When the decoding target bit rate determining process is started, the target bit rate acquisition portion 741 in the partial decoding rate control block 722 goes to step S721 and acquires an irreversible encoding target bit rate. In step S722, the target bit rate calculation portion 742 acquires a reference value. In step S723, the target bit rate calculation portion 742 acquires a reversible compression rate. In step S724, the target bit rate calculation portion 742 calculates the decoding target bit rate using the irreversible encoding target bit rate acquired in step S721, the reference value obtained in step S722, and the reversible compression rate gained in step S723.

In step S725, the target bit rate calculation portion 742 supplies the partial decoding block 111 with the decoding target bit rate calculated in step S724.

With the target bit rate supplied, the partial decoding rate control block 722 terminates the decoding target bit rate determining process. Control is then returned to step S703 of FIG. 49, and step S704 and subsequent steps are carried out.

As described above, the partial decoding rate control block 722 acquires the decoding target bit rate based on the reversible compression rate for the reversible encoding performed by the reversible encoding block 101. The partial decoding block 111 carries out its decoding process using the decoding target bit rate thus obtained. That is, the partial decoding block 111 roughly estimates the degree of difficulty in encoding picture data on the basis of the reversible compression rate, and performs the decoding process (i.e., partial decoding process) using the decoding target bit rate established in keeping with the estimated degree of difficulty in encoding.

The reversible compression rate in this case is calculated by simply referencing file system management information or the like as described above. This eliminates the need for such processes as parsing of code block information. Furthermore, there is no need to understand coding/decoding syntax. In this manner, the partial decoding rate control block 722 can further lower the workload of the process for acquiring the decoding target bit rate.

As described above, the partial decoding block 111 can easily generate decoded picture data at a bit rate commensurate with the degree of difficulty in encoding picture data. This allows the irreversible encoding block 112 to perform irreversible encoding using the variable bit rate scheme in easier and more appropriate fashion than before. That is, the irreversible transcoding unit 702 can transform the reversibly encoded code stream into an irreversibly encoded code stream more easily and appropriately using the variable bit rate scheme. In other words, the encoding apparatus 700 can encode picture data at diverse compression rates more easily and adequately than usual even if the master picture has a large data size.

In the foregoing description, the partial decoding rate control block 722 was shown to calculate the bit rate (decoding target bit rate) for use as the target value for the decoding process. Alternatively, the partial decoding rate control block 722 may calculate information equivalent to the bit rate such as a compression rate or a code quantity for use as the target value. In such cases, the partial decoding block 111 need only transform the target value into something appropriate in keeping with the type of the information in question. The partial decoding process may be carried out in basically the same manner as was discussed above in reference to the flowchart of FIG. 18.

Likewise, the information supplied by the irreversible encoding block 112 to the partial decoding rate control block 722 may be information other than bit rates. For example, the information may be composed of a code quantity or a compression rate.

The degree of difficulty in encoding may be estimated (i.e., decoding target bit rate may be determined) based on system parameters resulting from the reversible encoding process. For example, the partial decoding rate control block may estimate the degree of difficulty in encoding using the system parameter indicative of the processing time (i.e., clock pulse count or cycle count) of the reversible encoding process performed by the reversible encoding block 101.

Figure 51:
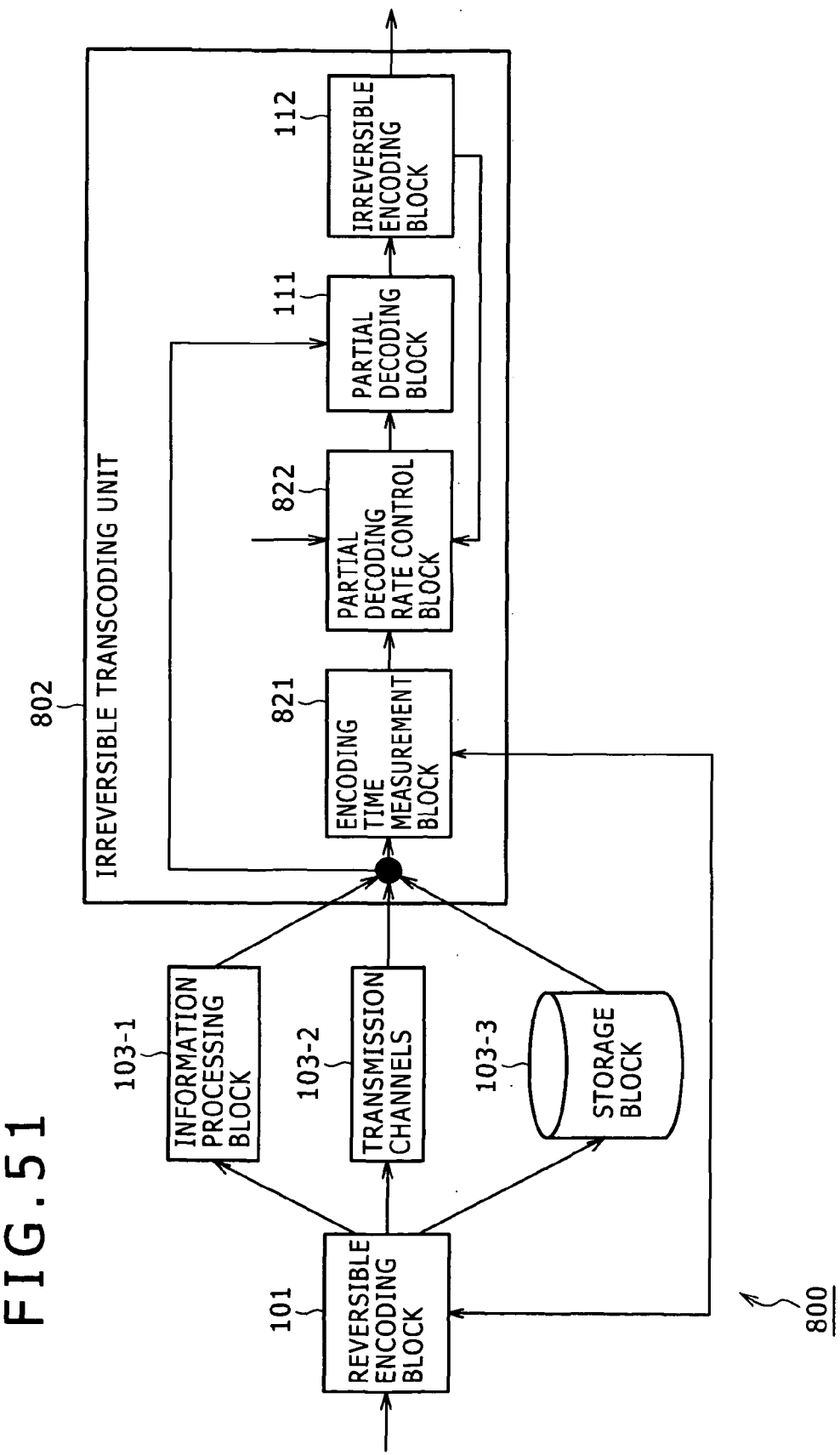
FIG. 51 is a block diagram showing a typical structure of another encoding apparatus embodying the present invention.

FIG. 51 is a block diagram showing a typical structure of another encoding apparatus 800 for use in the above case. As shown in FIG. 51, the encoding apparatus 800 has basically the same structure as that of the encoding apparatus 500 in FIG. 29 except that the irreversible transcoding unit 502 is replaced by an irreversible transcoding unit 802. The irreversible transcoding unit 802 in FIG. 51 is structured basically the same as the irreversible transcoding unit 502 in FIG. 29 except that the code block information extraction block 521 is replaced by an encoding time measurement block 821 and the partial decoding rate control block 522 by a partial decoding rate control block 822.

The encoding time measurement block 821 monitors the reversible encoding process performed by the reversible encoding block 101 to measure the processing time involved (i.e., reversible encoding time). Based on the result of the measurement, the encoding time measurement block 821 calculates the (reversible) compression rate for the reversible encoding process carried out by the reversible encoding block 101.

After monitoring the reversible encoding process performed by the reversible encoding block 101 and measuring the processing time involved (i.e., reversible encoding time), the encoding time measurement block 821 holds the result of the measurement. By way of the information processing block 103-1, transmission channels 103-2 or storage block 103-3, the encoding time measurement block 821 acquires the code stream resulting from the reversible encoding of picture data performed by the reversible encoding block 101. The encoding time measurement block 821 then calculates the reversible compression rate based on the reversible encoding time of the reversible encoding process for generating the code stream thus acquired. The encoding time measurement block 821 supplies the calculated reversible compression rate to the partial decoding rate control block 822.

The partial decoding rate control block 822 acquires the decoding target bit rate (Target_Rate) for the partial decoding block 111 using the reversible compression rate supplied by the encoding time measurement block 821. The partial decoding rate control block 822 supplies the decoding target bit rate thus obtained to the partial decoding block 111. In turn, the partial decoding block 111 performs the partial decoding process using the supplied decoding target bit rate.

Figure 52:
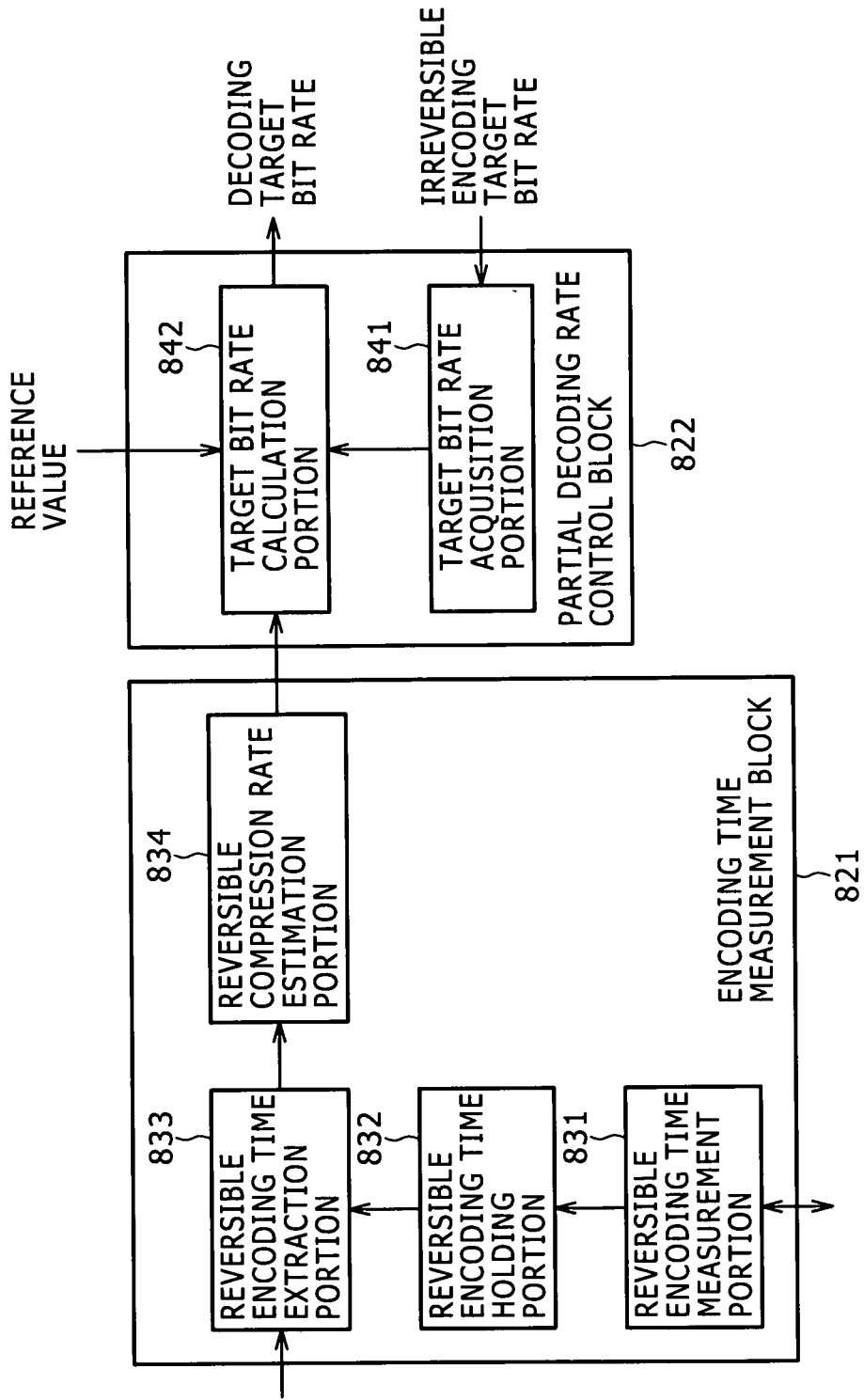
FIG. 52 is a block diagram showing typical structures of an encoding time measurement block and a partial decoding rate control block.

FIG. 52 is a block diagram showing typical structures of the encoding time measurement block 821 and partial decoding rate control block 822. As shown in FIG. 52, the encoding time measurement block 821 has a reversible encoding time measurement portion 831, a reversible encoding time holding portion 832, a reversible encoding time extraction portion 833, and a reversible compression rate estimation portion 834.

The reversible encoding time measurement portion 831 monitors the reversible encoding process performed by the reversible encoding block 101 to measure the processing time involved (i.e., reversible encoding time). Illustratively, the reversible encoding time measurement portion 831 measures the time period that elapses from the time the reversible encoding process is started until that process is terminated. Alternatively, the reversible encoding time measurement portion 831 may count the number of clock pulses given from the time the reversible encoding process is started until that process is terminated. As another alternative, the reversible encoding time measurement portion 831 may count the number of cycles given from the time the reversible encoding process is started until that process is terminated.

The reversible encoding time holding portion 832 holds the reversible encoding time (e.g., clock pulse count or cycle count) measured by the reversible encoding time measurement portion 831. At this point, the reversible encoding time holding portion 832 holds the reversible encoding time in association with identification information identifying the reversibly encoded picture data (e.g., with a data name).

By way of the information processing block 103-1, transmission channels 103-2 or storage block 103-3, the reversible encoding time extraction portion 833 acquires the code stream (i.e., result of the reversible encoding) supplied by the reversible encoding block 101. The reversible encoding time extraction portion 833 then extracts and acquires the reversible encoding time corresponding to the code stream from a group of reversible encoding times held by the reversible encoding time holding portion 832. The reversible encoding time extraction portion 833 supplies the reversible encoding time thus obtained to the reversible compression rate estimation portion 834.

The reversible compression rate estimation portion 834 estimates the reversible compression rate based on the supplied reversible encoding time. Generally, the longer the reversible encoding time, the higher the degree of difficulty in encoding and the larger the resulting code quantity. In that case, the reversible compression rate estimation portion 834 estimates the reversible compression rate to be low. Conversely, where the reversible encoding time is shorter, the degree of difficulty in encoding is generally lower and the resulting code quantity smaller. In this case, the reversible compression rate estimation portion 834 estimates the reversible compression rate to be high.

Taking the above-mentioned tendency of reversible compression rates into account, the reversible compression rate estimation portion 834 estimates the value of the reversible compression rate from the length of the reversible encoding time (i.e., magnitude of the clock pulse count or cycle count). This makes it easy for the reversible compression rate estimation portion 834 to estimate the reversible compression rate. The reversible compression rate estimation portion 834 supplies the reversible compression rate (RATE_Lossless) thus estimated to the partial decoding rate control block 822.

The partial decoding rate control block 822 has a target bit rate acquisition portion 841 and a target bit rate calculation portion 842 as shown in FIG. 52.

The target bit rate acquisition portion 841 acquires the irreversible encoding target bit rate (TR) from the irreversible encoding block 112 and supplies the acquired bit rate to the target bit rate calculation portion 842.

The target bit rate calculation portion 842 acquires the reversible compression rate (RATE_Lossless) from the encoding time measurement block 821. The target bit rate calculation portion 842 also acquires a predetermined reversible compression rate for use as the reference value (Ref_RATE_Lossless). The target bit rate calculation portion 842 further obtains the irreversible encoding target bit rate (TR) from the target bit rate acquisition portion 841.

The target bit rate calculation portion 842 like the above-described target bit rate calculation portion 742 calculates the decoding target bit rate (Target_Rate) for the partial decoding block 111 by use of the reversible compression rate (RATE_Lossless), irreversible encoding target bit rate (TR), and reference value (Ref_RATE_Lossless) acquired earlier.

The target bit rate calculation portion 842 supplies the decoding target bit rate (Target_Rate) thus obtained to the partial decoding block 111. Based on the supplied decoding target bit rate, the partial decoding block 111 calculates the target compression rate at which the baseband picture data generated through decoding is to be compressed relative to the master (original) picture data. The partial decoding block 111 partially decodes the code stream of the reversibly compressed file into baseband picture data.

As described above, the partial decoding block 111 partially decodes (i.e., performs a partial decoding process on) the code stream of the reversibly compressed file in a manner reducing the workload of the decoding process as long as the irreversible encoding block 112 can attain the irreversible encoding target bit rate. In this case, the partial decoding block 111 determines the range of its partial decoding process based on the decoding target bit rate calculated by the target bit rate calculation portion 842.

The partial decoding block 111 supplies the generated baseband picture data (i.e., decoded picture data) to the irreversible encoding block 112.

In turn, the irreversible encoding block 112 encodes the baseband picture data at a desired compression rate irreversibly in accordance with the JPEG 2000 standard, and outputs the resulting code stream. In this case, the irreversible encoding block 112 supplies the irreversible encoding target bit rate to the partial decoding rate control block 822.

Figure 53:
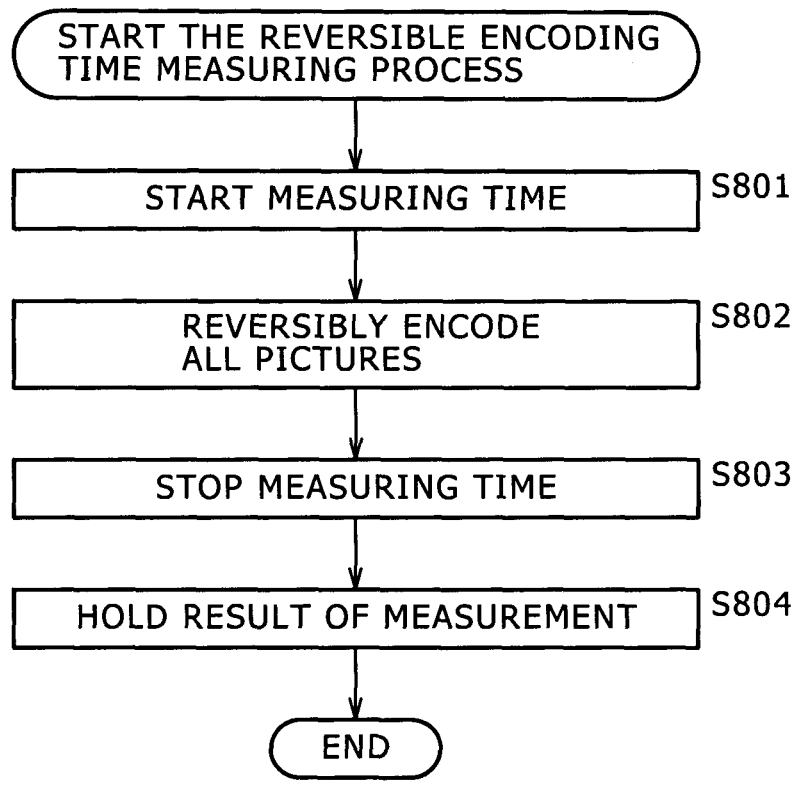
FIG. 53 is a flowchart of steps constituting a reversible encoding time measuring process.

FIG. 53 is a flowchart of steps constituting the reversible encoding time measuring process performed by the encoding time measurement block 821.

When the reversible encoding block 101 starts its reversible encoding process, the encoding time measurement block 821 starts the reversible encoding time measuring process. With the measuring process started, the reversible encoding time measurement portion 831 goes to step S801 and starts measuring the reversible encoding time. In step S802, the reversible encoding block 101 reversibly encodes all pictures of the picture data. When the reversible encoding is terminated, the reversible encoding time measurement portion 831 goes to step S803 and stops measuring the reversible encoding time. When the measurement is stopped, step S804 is reached and the reversible encoding time holding portion 832 holds the result of the measurement (i.e., reversible encoding time) measured in steps S801 through S803. The reversible encoding time measuring process is then brought to an end.

Described below in reference to the flowchart of FIG. 54 is the transcoding process performed in this case by the irreversible transcoding unit 802.

When supplied with picture data from the information processing block 103-1, transmission channels 103-2 or storage block 103-3, the irreversible transcoding unit 802 starts its transcoding process. With the transcoding process started, the reversible encoding time extraction portion 833 goes to step S821 and acquires the reversible encoding time corresponding to the code stream from the reversible encoding time holding portion 832.

In step S822, the reversible compression rate estimation portion 834 estimates the reversible compression rate (RATE_Lossless) from the reversible encoding time acquired in step S821. In step S823, the partial decoding rate control block 822 determines the decoding target bit rate for the partial decoding performed by the partial decoding block 111. The decoding target bit rate determining process is performed in the same manner as was described above in reference to the flowchart of FIG. 50 and thus will not be discussed further.

With the decoding target bit rate determined, the partial decoding block 111 goes to step S824 and generates decoded picture data by carrying out the partial decoding process using the decoding target bit rate calculated in step S823. The partial decoding process is performed in the same manner as was described above in reference to the flowchart of FIG. 18 and thus will not be discussed further. It should be noted that in step S824, the partial decoding block 111 calculates the target compression rate from the decoding target bit rate and performs the partial decoding process using the target compression rate thus calculated.

In step S825, the irreversible encoding block 112 performs the irreversible encoding process. The irreversible encoding process is carried out in the same manner as was described above in reference to the flowchart of FIG. 19 and thus will not be discussed further. It should be noted that in step S825, the irreversible encoding block 112 supplies the irreversible encoding target bit rate to the partial decoding rate control block 822, instead of getting the target compression rate supplied to the partial decoding block 111 as was done in step S308.

In step S826, the irreversible transcoding unit 802 checks to determine whether all pictures of the picture data have been processed. If any picture is found unprocessed in step S826, control is returned to step S824 and the subsequent processing is repeated. If in step S826 all pictures are found to have been processed, then the transcoding process is brought to an end.

In that case, the decoding target bit rate is calculated only once for the picture data. This is because the reversible compression rate calculated from the processing time of the reversible encoding process is used to calculate the decoding target bit rate.

Alternatively, the reversible compression rate estimation portion 834 may calculate the reversible compression rate for each of other appropriate units of picture data (e.g., in pictures). In such a case, however, the processing involved will be more complicated than what was discussed above because of the need for the reversible encoding time measurement portion 831 to obtain the reversible encoding time for each of these data units (e.g., for each picture).

As described above, the partial decoding block 111 can easily generate decoded picture data at a bit rate commensurate with the degree of difficulty in encoding picture data. This allows the irreversible encoding block 112 to perform irreversible encoding using the variable bit rate scheme in easier and more appropriate fashion than before. That is, the irreversible transcoding unit 802 can transform the reversibly encoded code stream into an irreversibly encoded code stream more easily and appropriately using the variable bit rate scheme. In other words, the encoding apparatus 800 can encode picture data at diverse compression rates more easily and adequately than usual even if the master picture has a large data size.

In the foregoing description, the partial decoding rate control block 822 was shown to calculate the bit rate (decoding target bit rate) for use as the target value for the decoding process. Alternatively, the partial decoding rate control block 822 may calculate information equivalent to the bit rate such as a compression rate or a code quantity for use as the target value. In such cases, the partial decoding block 111 need only transform the target value into something appropriate in keeping with the type of the information in question. The partial decoding process may then be carried out in basically the same manner as was discussed above in reference to the flowchart of FIG. 18.

Likewise, the information supplied by the irreversible encoding block 112 to the partial decoding rate control block 822 may be information other than bit rates. For example, the information may be composed of a code quantity or a compression rate.

In the foregoing description, the embodiments of the present invention was shown applied to the encoding apparatus. Alternatively, the invention may be applied to varieties of apparatuses. For example, each of the processing blocks shown in each drawing may be treated as an independent apparatus. Whereas the data compression and expansion methods discussed above are based on the JPEG 2000 standard, this is not limitative of the present invention. Any other suitable techniques or methods for data compression and expansion may be adopted in implementing the invention.

The series of steps or processes described above may be executed either by hardware or by software. In such cases, a personal computer such as one shown in FIG. 55 may be used to carry out the processing.

In FIG. 55, a personal computer 900 has a CPU (central processing unit) 901 that performs various processes in accordance with the programs held in a ROM (read only memory) 902 or in keeping with the programs loaded from a storage device 913 into a RAM (random access memory) 903. The RAM 903 also accommodates data needed by the CPU 901 in executing the processes.

The CPU 901, ROM 902, and RAM 903 are interconnected via a bus 904. An input/output interface 910 is also connected to the bus 904.

The input/output interface 910 is connected with an input device 911, an output device 912, the storage device 913, and a communication device 914. The input device 911 is typically made up of a keyboard and a mouse. The output device 912 is generally composed of a display such as a CRT (cathode ray tube) or LCD (liquid crystal display), as well as speakers. The storage device 913 and communication device 914 are usually constituted by a hard disk drive and a modem, respectively. The communication device 914 conducts communications over networks including the Internet.

A drive 915 may be connected to the input/output interface 910 as needed. Pieces of removable media 921 such as magnetic disks, optical disks, magneto-optical disks or semiconductor memories may be loaded into the drive 915. Computer programs retrieved from the loaded removable medium may be installed as needed into the storage device 913.

Where the above-described series of steps or processes are to be carried out by software, the programs constituting the software are installed illustratively over networks or from a suitable recording medium.

As shown in FIG. 55, the recording medium is offered to users not only as the removable media 921 apart from the users' computers and constituted by magnetic disks (including flexible disks), optical disks (including CD-ROM (Compact Disc-Read Only Memory) and DVD (Digital Versatile Disc)), magneto-optical disks (including MD (Mini-disc)), or semiconductor memories, each medium carrying the necessary programs; but also in the form of the ROM 902 or the hard disk drive included in the storage device 913, each medium accommodating the programs and incorporated beforehand in the computer.

In this specification, the steps describing the programs stored on the recording medium represent not only the processes that are to be carried out in the depicted sequence (i.e., on a time series basis) but also processes that may be performed parallelly or individually and not chronologically.

In this specification, the term "system" refers to an entire configuration made up of a plurality of component devices (apparatuses).

Although the description above contains many specificities, these should not be construed as limiting the scope of the invention but as merely providing illustrations of some of the presently preferred embodiments of this invention. It is to be understood that changes and variations may be made without departing from the spirit or scope of the claims that follow. For example, the structure discussed above as a single apparatus may be divided into a plurality of devices. Conversely, a plurality of devices may be integrated into a single apparatus. Each device or apparatus may be supplemented with some structure that was not described above. As long as the system configuration remains the same in structural and operational terms, part of a component or components of the system may be included in some other component or components. Thus the scope of the invention should be determined by the appended claims and their legal equivalents, rather than by the examples given.

The present application contains subject matter related to that disclosed in Japanese Priority Patent Applications JP 2009-009566 filed in the Japan Patent Office on Jan. 20, 2009, and JP 2008-068812 filed in the Japan Patent Office on Mar. 18, 2008, the entire contents of which are hereby incorporated by reference.

What is claimed is:

1. An information processing apparatus comprising:
    determination means for determining a decoding target bit rate constituting a target bit rate for picture data to be generated through a partial decoding process for partially decoding a reversibly encoded picture code stream using an encoding parameter acquired during the reversible encoding, said determination means determining said decoding target bit rate in accordance with the relative ratio of said encoding parameter to a predetermined reference value;
    partial decoding means for generating said picture data by performing said partial decoding process on the code stream using said decoding target bit rate determined by said determination means; and
    irreversible encoding means for irreversibly encoding said picture data generated by said partial decoding means.

2. The information processing apparatus according to claim 1, wherein said determination means calculates a total sum of effective bit-planes per picture as said encoding parameter and calculates said decoding target bit rate in accordance with the relative ratio of the calculated total sum to said reference value.

3. The information processing apparatus according to claim 2, wherein said determination means calculates said decoding target bit rate by multiplying by said relative ratio an irreversible encoding target bit rate constituting a target bit rate for the encoded data to be generated through the irreversible encoding by said irreversible encoding means.

4. The information processing apparatus according to claim 1, wherein said determination means calculates a total sum of encoding passes per picture as said encoding parameter and calculates said decoding target bit rate in accordance with the relative ratio of the calculated total sum to said reference value.

5. The information processing apparatus according to claim 4, wherein said determination means calculates said decoding target bit rate by multiplying by said relative ratio an irreversible encoding target bit rate constituting a target bit rate for the encoded data to be generated through the irreversible encoding by said irreversible encoding means.

6. The information processing apparatus according to claim 1, wherein said determination means calculates a total sum of non-zero bit-planes per picture as said encoding parameter and calculates said decoding target bit rate in accordance with the relative ratio of the calculated total sum to said reference value.

7. The information processing apparatus according to claim 6, wherein said determination means calculates said decoding target bit rate by multiplying by said relative ratio an irreversible encoding target bit rate constituting a target bit rate for the encoded data to be generated through the irreversible encoding by said irreversible encoding means.

8. The information processing apparatus according to claim 1, wherein said determination means calculates a total sum of effective bit-planes per picture as said encoding parameter and acquires said decoding target bit rate from said total sum in reference to table information indicating relations of correspondence between said total sum and said decoding target bit rate.

9. The information processing apparatus according to claim 1, wherein said determination means calculates a total sum of encoding passes per picture as said encoding parameter and acquires said decoding target bit rate from said total sum in reference to table information indicating relations of correspondence between said total sum and said decoding target bit rate.

10. The information processing apparatus according to claim 1, wherein said determination means calculates a total sum of non-zero bit-planes per picture as said encoding parameter and acquires said decoding target bit rate from said total sum in reference to table information indicating relations of correspondence between said total sum and said decoding target bit rate.

11. An information processing method comprising the steps of:

determining, performed by determination means, a decoding target bit rate constituting a target bit rate for picture data to be generated by a partial decoding process for partially decoding a reversibly encoded picture code stream using an encoding parameter acquired during the reversible encoding, said decoding target bit rate being determined in accordance with the relative ratio of said encoding parameter to a predetermined reference value;

generating, performed by partial decoding means, said picture data by performing said partial decoding process on the code stream using the determined decoding target bit rate; and irreversibly encoding, performed by irreversible encoding means, the generated picture data.

12. An information processing apparatus comprising:

a determination portion configured to determine a decoding target bit rate constituting a target bit rate for picture data to be generated through a partial decoding process for partially decoding a reversibly encoded picture code stream using an encoding parameter acquired during the reversible encoding, said determination portion determining said decoding target bit rate in accordance with the relative ratio of said encoding parameter to a predetermined reference value;

a partial decoding block configured to generate said picture data by performing said partial decoding process on the code stream using said decoding target bit rate determined by said determination portion; and an irreversible encoding block configured to irreversibly encode said picture data generated by said partial decoding block.

* * * * *